(12) United States Patent
Roy

(10) Patent No.: US 6,859,448 B1
(45) Date of Patent: Feb. 22, 2005

(54) H.323 MOBILITY PROTOCOL FOR TERMINAL, USER AND SERVICE MOBILITY

(75) Inventor: Radhika R. Roy, Howell, NJ (US)

(73) Assignee: AT&T Corp., New York, NY (US)

( * ) Notice: Subject to any disclaimer, the term of this patent is extended or adjusted under 35 U.S.C. 154(b) by 805 days.

(21) Appl. No.: 09/642,279

(22) Filed: Aug. 18, 2000

Related U.S. Application Data

(60) Provisional application No. 60/154,212, filed on Sep. 16, 1999.

(51) Int. Cl.[7] .......................... H04L 12/28; H04L 12/66; G06F 15/16
(52) U.S. Cl. ........................ 370/338; 370/401; 455/433; 455/445; 709/249
(58) Field of Search ................................ 370/260, 312, 370/328, 329, 338, 349, 351, 352, 389, 390, 400, 401, 432, 465, 466, 467; 455/416, 422, 432, 433, 435, 445, 448, 449; 709/230, 238, 249, 204

(56) References Cited

U.S. PATENT DOCUMENTS

| | | | |
|---|---|---|---|
| 5,793,762 A | 8/1998 | Penners et al. | 370/389 |
| 6,195,705 B1 * | 2/2001 | Leung | 709/245 |
| 6,360,265 B1 * | 3/2002 | Falck et al. | 709/227 |
| 6,426,945 B1 * | 7/2002 | Sengodan | 370/238 |
| 6,539,237 B1 * | 3/2003 | Sayers et al. | 455/555 |
| 6,604,142 B1 * | 8/2003 | Bertrand et al. | 709/227 |

FOREIGN PATENT DOCUMENTS

| | | |
|---|---|---|
| WO | WO 98/59467 | 12/1998 |
| WO | WO 00/33523 | 6/2000 |
| WO | WO 00/79814 | 12/2000 |
| WO | WO 00/79825 | 12/2000 |

OTHER PUBLICATIONS

European Search Report.
Wanjiun Liao, "Mobile Internet Telephony: Mobile extensions to H.323", IEEE, 1999, pp. 12–19.
Olle Granberg, "GSM On The Net", Ericsson Review No. 4, 1998, pp. 184–191.

* cited by examiner

*Primary Examiner*—Alpus H. Hsu

(57) ABSTRACT

The H.323 standard is extended to support mobility in a multimedia communication system with services over packet-based networks. Such mobility is supported in a transport independent way. New H.323 messages and/or message elements have been created, and extensions to existing messages provided to accommodate mobility. Messages are provided to facilitate mobility binding as the mobile entity moves from one place to another. The mobile entity periodically registers with different gatekeepers to obtain support for an H.323 communication that includes at least one of audio, video and data.

11 Claims, 25 Drawing Sheets

BSC=BASE STATION CONTROLLER
MSC=MOBILE SWITCHING CENTER (e.g., router, switch)
BS=BASE STATION R/Sw=ROUTER/SWITCH
LAN=LOCAL AREA NETWORK (e.g., ETHERNET, TOKEN RING, ATM LAN/HUB)

FIG. 4

402 where the Mobile Terminal/Node/Entity becomes mobile and initiates an H.323 communication that includes at least one of: audio, video and data, by the Mobile Terminal/Node/Entity, with respect to notification, one of: providing, by at least one of a plurality of available H.323 Home/Foreign Mobility Gatekeepers, notification of H.323 mobility servers availability by periodically broadcasting/multicasting/unicasting a Mobility Gatekeeper Advertisement with a multicast address/unicast; and where the Mobile Terminal/Node/Entity lacks notification of H.323 mobility servers availability, broadcast/multicasting/unicasting/sending, by the Mobile Terminal/Node/Entity, a message to the Home Gatekeeper/Home Location Database, which notifies H.323 Home/Foreign Mobility Gatekeepers in a preselected area local to the Mobile Terminal/Node/Entity that the Mobile Terminal/Node/Entity needs H.323 mobility services and notifying, by the H.323 Home/Foreign Mobility Gatekeepers, the Mobile Terminal/Node/Entity of available H.323 Home/Foreign Mobility Gatekeepers

↓ 404 registering, by the Mobile Terminal/Node/Entity, with a H.323 Home/Foreign Mobility Gatekeeper of the available H.323 Home/Foreign Mobility Gaterkeepers that support H.323 mobility serves in a Location Area/cell/zone of the Mobile Terminal/Mode/Entity (706)

↓ 406 providing, for the Mobile Terminal/Node/Entity by the H.323 Home/Foreign Mobility Gatekeeper with which the Mobile Terminal/Node/Entity is registered, support for the H.323 communication that includes at least one of audio, video and data

FIG. 7

> 702
>
> Computer-readable medium with computer-executable steps:
>
> where the Mobile Terminal/Node/Entity becomes mobile and initiates an H.323 communication that includes at least one of: audio, video and data by the Mobile Terminal/Node/Entity, with respect to notification, one of: providing, by at least one of a plurality of available H.323 Home/Foreign Mobility Gatekeepers, notification of H.323 mobility servers availability by periodically broadcasting/multicasting/unicasting a Mobility Gatekeeper Advertisement with a multicast address; and where the Mobile Terminal/Node/Entity lacks notification of H.323 mobility services availability, broadcasting/multicasting/unicasting/sending, by the Mobile Terminal/Node/Entity, a message to the Home Gatekeeper/Home Location Database, which notifies H.323 Home/Foreign Mobility Gatekeeper in a preselected area local to Mobile Terminal/Node/Entity that the Mobile Terminal/Node/Entity needs H.323 mobility services and notifying, by the H.323 Home/Foreign Mobility Gatekeepers, the Mobile Terminal/Node/Entity of available H.323 Home/Foreign Mobility gatekeepers (704)
>
> registering, by the Mobile Terminal/Node/Entity, with a H.323 Home/Foreign Mobility Gatekeeper of the available H.323 Home/Foreign Mobility Gatekeepers that support H.323 mobility services in a Location Area/cell/zone of the Mobile Terminal/Node/Entity (706)
>
> providing, for the Mobile Terminal/Node/Entity by the H.323 Home/Foreign Mobility Gatekeeper with which the Mobile Terminal/Node/Entity is registered, support for the H.323 communication that includes at least one of: audio, video and data (708)

1. MGA
2. RRQ
3. RCF/RRJ

EVENTS:
1. RRQ
2. BuRQ
3. BuCF/BuRJ
4. RCF/RRJ
5. UbRQ
6. UbCF/UbRJ

H.323 MOBILITY PROTOCOL FOR TERMINAL, USER AND SERVICE MOBILITY

RELATED FILINGS

This application claims the benefit of U.S. Provisional Application No. 60/154,212, filed Sep. 16, 1999, which is hereby entirely incorporated herein by reference and two concurrently filed applications "H.323 Mobility Architecture for Terminal User and Service Mobility" and "Intelligent Signaling Scheme for Computer-Readable Medium for H.323 Mobility Architecture", both of which were invented by Radhika R. Roy.

FIELD OF THE INVENTION

The present invention relates generally to the H.323 standard for transmitting audio and video data streams, and more particularly to extending the H.323 standard to support mobility in a multimedia communication system with services over packet-based networks.

BACKGROUND OF THE INVENTION

Originally, the International telecommunications Union (ITU) developed H.323 as an adaptation of .H.320, which addresses videoconferencing over ISDN and other circuit-switched networks and services. H.320 was ratified in 1990, and corporations expanded their networks to include Local Area Networks (LANs) and LAN gateways to the Wide Area Network (WAN). Then, H.323 was expanded beyond being an extension of H.320 so that H.323 now covers the corporate intranets and packet-switched networks in general. The ITU published a set of standards for multimedia communication over packet-based networks (PBNs) under the H.323 designation, which includes standards for data channels, monitoring channels, and control channels. It includes provision of real-time audio, video and/or data communications. The H.323 components defined by the standard include: terminals, gateways, gatekeepers and multipoint control units (MCUs). The terminals provide real-time communications, must support audio/voice communications and optionally support data and video. The most common H.323 terminals are the applications that run on a personal computer (PC). H.323 gateways provide services to H.323 clients and allow communication with non-H.323 entities, such as communication between H.323 terminals and telephone in a circuit-switched network. Gatekeepers provide call control services for H.323 endpoints, e.g., address translation and bandwidth management. Gatekeepers are optional in the H.323 standard, but, if they are present, the endpoints must use the services of the gatekeepers. The H.323 standard specifies certain mandatory services that gatekeepers, if utilized, must provide. The multipoint control units provide support for conferences of three or more endpoints by managing conference resources, manage negotiations between the endpoints to specify which audio or video codec(s) to use and may manage the media stream. The H.323 standard defines how audio and video conferencing systems communicate over packet-switched networks defines call control and management practices for point-to-point and broadcast/multicast/unicast multipoint conferences, addresses QoS issues with a centralized gatekeeper that LAN administrators use to manage media traffic, bandwidth and user participation, and describes functionality that allows calls to connect from the LAN to the Public Switched Telephone Network (PST) as well as to other H.32x standards-based terminals.

In version 2 of the H.323 standard, video and audio data streams are compressed and packetized in accordance with a real-time transport protocol (RTP/RTCP) standard from the Internet Engineering Task Force (IETF) and are used to support video conferencing and other communications over the Internet. Packets include data and header information which facilitates detection of packet loss, detection of packet status and synchronization of the packets. The video data streams may use H.261, H.262, or H.263 protocols. Audio data streams may use G.711, G.722, G.723.1 G.728 or G.729 protocols. Generally, the H.323 standard supports teleconferencing in networks that utilize TCP/IP, such as, for example, the Internet.

The H.323 system supports interoperability and assumes that users, terminals, and services are fixed. If an H.323 terminal is moved form one network to another, its point of attachment or network address changes. In this situation, the address of the mobile terminal needs to be resolved to set up a new call or continue a same call. Thus, there is a need for an H.323 mobility architecture that provides for terminal, user and service mobility.

SUMMARY OF THE INVENTION

The present invention provides an H.323-based mobility protocol for real-time mobile multimedia communications and conferencing over packet-based networks wherein a plurality of H.323 mobility gatekeepers provide notification of H.323 mobility services availability by periodically multicast, broadcasting, and/or unicast a Mobility Gatekeeper Advertisement with a multicast/unicast address as appropriate. If needed, the mobile Terminal/Node/Entity can also multicast, broadcast, and/or unicast a discovery message seeking a gatekeeper that provides the mobility services. The protocol includes the steps of detecting, by a Mobile Terminal/Node/Entity, whether it has changed its location in a given zone or domain where zone and (administrative) domain have been defined in accordance to ITU-T Recommendations H.323 and H.225.0. The abstraction of zone is such that it is managed by a gatekeeper while a domain consists of one or more zones. A domain may be administered by an administration (e.g., an Internet Service Provider (ISP), a corporation, a carrier network, etc.). The communications between the domains are via border elements (BEs). However, the border elements can communicate with the gatekeeper.

The present invention provides an H.323-based mobility protocol for real-time mobile multimedia communications and conferencing over packet-based networks by a Mobile Terminal or Node or Entity having a Home Gatekeeper or Home Database. When a Mobile Terminal or Node or Entity becomes mobile and initiates an H.323 communication that includes at least one of: audio, video and data, the protocol includes, with respect to notification, one of: providing, by at least one of a plurality of available H.323 Home/Foreign Mobility Gatekeeper and notification of H.323 mobility services availability by periodically broadcasting/multicasting/unicasting a Mobility Gatekeeper Advertisement with a multicast address. Where the Mobile Terminal/Node/Entity lacks notification of H.323 mobility services availability, the protocol includes broadcasting/multicasting/unicasting/sending, by the Mobile Terminal/Node/Entity, a message to the Home Gatekeeper/Home Location Database, which notifies H.323 Home/Foreign Mobility Gatekeepers in a preselected area local to the Mobile Terminal/Node/Entity that the Mobile Terminal/Node/Entity needs H.323 mobility services and notifying, by the H.323 Home/Foreign Mobility Gatekeepers, the Mobile Terminal/Node/Entity of available H.323 Home/Foreign Mobility Gatekeepers.

Then the Mobile Terminal/Node/Entity registers with a H.323 Home/Foreign Mobility Gatekeeper of the available H.323 Home/Foreign Mobility Gatekeepers that support H.323 mobility services in a Location Area/Cell/Zone of the Mobile Terminal, Node or Entity. Next, the H.323 Home/ Foreign Mobility Gatekeeper with which the Mobile Terminal/Node/Entity is registered provides the Mobile Terminal, Node or Entity with support for the H.323 communication that includes at least one of: audio, video and data.

Registering with the H.323 Home/Foreign Mobility Gatekeeper may include sending registration information for the Mobile Terminal/Node/Entity using a Base Station to Base Station Controller to Mobile Switching Center to H.323 Home/Foreign Gatekeeper system in the case of the cellular wireless networking environment. In wireless/wire-line LAN/wire-line environment, the H.323 mobile entity can register with the H.323 Home/Foreign Mobility GK via the wireless/wire-line LAN/wire-line where the GK may be connected to the packet network including the wireless/wire-line network. Registering with the at least one H.323 Home/ Foreign Mobility Gatekeeper may include sending registration information for the Mobile Terminal/Node/Entity using a wireless/wire-line Local Area Network to Router/Switch to H.323 Home/Foreign Gatekeeper system. Where desired, registering may include the steps of: broadcasting, multicasting, unicasting or sending, by the Home Gatekeeper, a Mobility Gatekeeper Advertisement (MGA) message periodically; broadcasting, multicasting, unicasting or sending a registration request message (RRQ) to the Home Gatekeeper by the Mobile Terminal/Node/Entity; and sending, by the Home Gatekeeper, a registration confirmation/registration rejection (RCF/RRJ) to the Mobile Terminal/Node/Entity.

Registering may also include the steps of: upon determining, by the Mobile Terminal, Node or Entity, that a network point of attachment has changed/a foreign zone has been entered, broadcasting, multicasting, unicasting or sending, by the Mobile Terminal, Node or Entity, a registration request message (RRQ) to a Foreign/Visiting Gatekeeper; broadcasting, multicasting, unicasting or sending, by the Foreign/Visiting Gatekeeper, a binding update message (BuRQ) to the Home Gatekeeper; broadcasting, multicasting, unicasting or sending, by the Home Gatekeeper, a binding update confirmation or rejection (BuCF/BuRJ) to the Foreign/Visiting Gatekeeper; broadcasting, multicasting, unicasting or sending, by the Foreign/Visiting Gatekeeper, the binding update confirmation/rejection to the Mobile Terminal or Node/ Entity.

Where the Mobile Terminal/Node/Entity has already visited another foreign zone regulated by a Visited Gatekeeper, registering may include: broadcasting, multicasting, unicasting or sending, by the Home Gatekeeper, a mobility unbinding message (UbRQ) to the Visited Gatekeeper; and broadcasting, multicasting, unicasting or sending, by the Visited Gatekeeper, a mobility unbinding confirmation/ rejection (UbCF/UbRJ) to the Home Gatekeeper. Where the Mobile Terminal/Node/Entity has already visited another foreign zone regulated by a Visited Gatekeeper, registering may include: broadcasting, multicasting, unicasting or sending, by the Mobile Terminal/Node/Entity, a registration request message (RRQ) to a Foreign/Visiting Gatekeeper; broadcasting, multicasting, unicasting or sending, by the Foreign/Visiting Gatekeeper, a mobility unbinding update message (UbRQ) to the Visited Gatekeeper; broadcasting, multicasting, unicasting or sending, by the Visited Gatekeeper, a mobility unbinding confirmation/rejection (UbCF/UbRJ) to the Foreign/Visiting Gatekeeper; broadcasting, multicasting, unicasting or sending, by the Foreign/Visiting Gatekeeper, a provisional registration confirmation to the Mobile Terminal, Node, or Terminal and broadcasting, multicasting, unicasting or sending, by the Foreign/Visiting Gatekeeper, a binding update message (BuRQ) to the Home Gatekeeper; and broadcasting, multicasting, unicasting or sending, by the Home Gatekeeper, a binding update confirmation or rejection (BuCF/BuRJ) to the Foreign/Visiting Gatekeeper.

Where the Mobile Terminal/Node/Entity has already visited another foreign zone regulated by a Visited Gatekeeper, registering may include: broadcasting, multicasting, unicasting or sending, by the Mobile Terminal, Node or Entity, a registration request message (RRQ) to a Foreign/Visiting Gatekeeper; broadcasting, multicasting, unicasting or sending, by the Visited Gatekeeper, a mobility unbinding confirmation or rejection (UbCF/UbRJ) to the Foreign/ Visiting Gatekeeper; broadcasting, multicasting, unicasting or sending, by the Foreign/Visiting Gatekeeper, a provisional registration confirmation to the Mobile Terminal or Node/Terminal and broadcasting, multicasting, unicasting or sending, by the Foreign/Visiting Gatekeeper, a binding update message (BuRQ) to the Home Gatekeeper; broadcasting, multicasting, unicasting or sending, by the Home Gatekeeper, a binding update confirmation or rejection (BuCF/BuRJ) to the Foreign/Visiting Gatekeeper; broadcasting, multicasting, unicasting or sending, by the Home Gatekeeper, a mobility unbinding update message (UbRQ) to the Visited Gatekeeper; and broadcasting, multicasting, unicasting or sending, by the Visited Gatekeeper, a mobility unbinding confirmation/rejection (UbCF/UbRJ) to the Home Gatekeeper.

Where desired, at least one Home or Foreign Gatekeeper may utilize a combined Home/Visitor Location Database. Also, where desired, a plurality of Home/Foreign Gatekeepers may each utilize an individual Visitor Location Database and share a Home Location Database.

Where the Mobile Terminal/Node/Entity is originally located in a First Administrative Domain and is moving in a Second Administrative Domain, registering may include: broadcasting, multicasting, unicasting or sending a registration request message (RRQ), by the Mobile Terminal/Node/ Entity to the Foreign/Visiting Gatekeeper; broadcasting, multicasting, unicasting or sending, by the Foreign/Visiting Gatekeeper, a mobility unbinding (UbRQ) message to a Visited Gatekeeper; broadcasting, multicasting, unicasting or sending, by the Visited Gatekeeper, an unbinding confirmation or rejection (UbCF/UbRJ) to the Visiting/Foreign Gatekeeper; broadcasting, multicasting, unicasting or sending, by the Visiting Gatekeeper, a provisional registration message to the Mobile Terminal/Node/Entity; broadcasting, multicasting, unicasting or sending, by the Foreign/Visiting Gatekeeper, a mobility binding message (BuRQ) to a Border Element of the Second Administrative Domain, which forwards the message to a Border Element of the First Administrative Domain which then forwards the message to the Home Gatekeeper; broadcasting, multicasting, unicasting or sending, by the Home Gatekeeper, a mobility binding confirmation or rejection (BuCF/BuRJ) message to the Border Element of the First Administrative Domain, which forwards the message to the Border Element of the Second Administrative Domain, which forwards the message to the Visiting Gatekeeper.

BRIEF DESCRIPTION OF THE DRAWINGS

FIG. 4 is a flow chart of one embodiment of an H.323-based mobility protocol for real-time mobile multimedia communications and conferencing over packet-based networks in accordance with the present invention.

FIG. 7 is a block diagram showing one embodiment of a computer-readable medium having computer-executable steps for implementing, by a Mobile Terminal Node/Entity, an H.323-based mobility protocol for real-time mobile multimedia communications and conferencing over packet-based networks in accordance with the present invention.

DETAILED DESCRIPTION OF THE PREFERRED EMBODIMENTS

Figure 1:
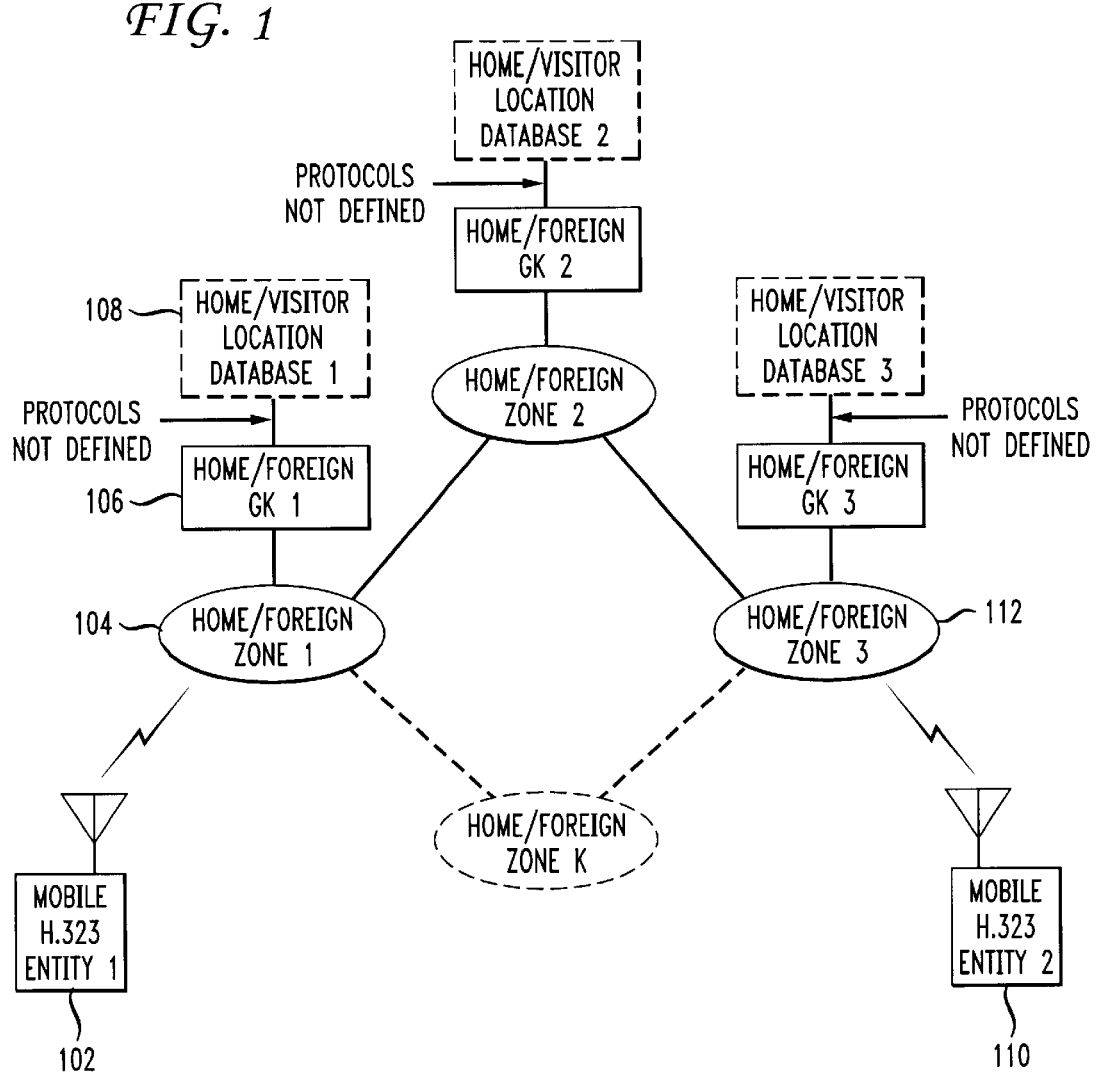
FIG. 1 is a block diagram of one embodiment of an exemplary generic H.323 mobility architecture in accordance with the present invention.

The present invention provides for extending the H.323 standard to support mobility in a multimedia communication system with services over packet-based networks. The present H.323 standard is known to those skilled in the art and is hereby incorporated by reference. The invention supports extending H.323 to support mobility in a transport independent way, create new H.323 messages and/or message elements that needed to support mobility, and facilitate interoperability for implementation of H.323 mobility over specific networking environments such as wireless/PSTN-IP. The invention provides for extension to existing H.225.0 (H.323) messages to accommodate mobility. Messages are provided to facilitate mobility binding as the mobile entity moves form one place to another. H.323 mobility service varies from traditional services such as cellular wireless/PSTN, and mobile IP, mobility services in that the IETF's mobile protocol may be modified to include an interworking function (IWF) to provide interoperability between the mobile H.323 system and the wireless-PSTN mobile network.

When a mobile unit implementing H.323 uses a packet-based network, e.g., the IP subnet, together with an H.323-based point of attachment (e.g., network point of attachment, zone, domain), the mobility information is managed via a gatekeeper. There may be a gatekeeper at the transmitting end and at the receiving end also. If necessary, the gatekeeper can also perform bandwidth management, address translation, maps LAN aliases to IP addresses, and sets up a real-time transport control protocol (RTCP) for exchanging status information between the transmitting end and the receiving end. A H.245 control channel is set up to provide control functions such as, for example, opening and closing data channels.

The functional requirements of H.323 mobility are primarily descried at the H.323 application level as:

Terminal Mobility: A fixed or mobile H.323 terminal must be able to reach an H.323 mobile user and vice versa. Conversations are provided even when the mobile terminal moves from one place to another with a different point of attachment or network address. Where desired, communications are also provided among the H.323 mobile users. Intra-zone, inter-zone (intra-domain) and/or inter-domain handoff is supported. Handoff between intra-zone, inter-zone (intra-domain) and or inter-domain users is supported.

User Mobility: An H.323 user maintains the same identity and may receive the same or, where desired, different services even when the user moves. Service providers may be switched with the user maintaining the same identity.

Mobility Management: The H.323 mobility management is supported to provide registration, call establishment, roaming and handoff.

QoS Support: QoS service is maintained during intra-zone, inter-zone (intra-domain) and/or inter-domain roaming for the H.323 user.

Authentication and Security: Authentication and security mechanisms are provided in support of H.323 mobility.

Typically, a gatekeeper (GK) manages a zone. A zone is generally a collection of H.323 entities such as terminals, gateways (GWs) or interworking functions (IWFs), multiple controllers (MCs). Each H.323 entity has a unique network point of attachment or address, and each zone may contain many network points of attachment, subnets, or addresses under the management of a GK. For example, a zone many have multiple networks in the case of an IP, ATM, or other network. If a user or terminal moves within a zone, its network attachment or subnetwork address may also change.

A domain may consist of a single or of multiple zones. Thus, H.323 mobility is addressed in terms of zones and domains as well. If an H.323 user, entity or terminal crosses a zone boundary, such a change may be termed as a change of H.323 point of attachment because an H.323 gatekeeper manages the registration of all H.323 entities in a given zone. In addition, H.323 services are ensured during the call and between calls while users or terminals move from place to place.

Other terminology used herein is:

User mobility: the ability for a user to maintain the same user identity on different terminals or terminal types.

Terminal mobility: the ability for a terminal to changes location, network point of attachment, and H.323 point of attachment and still be able to communicate.

Discrete terminal mobility or roaming: the ability for a terminal to make discrete changes of physical location, i.e., to change location while no media streams are active.

Continuous terminal mobility or handover: the ability for a terminal to change location while media streams are active. Such a change may be seamless, i.e., without loss of data, or alternatively, may not be seamless, i.e., wherein some media stream data is lost.

Service mobility: the ability for a user to obtain a particular service independent of user and terminal mobility, i.e., wherein a foreign network has the means to obtain the parameters required for the service.

Network Point of Attachment: the attachment or address, e.g., an IP address, of an H.323 entity, e.g., terminals, MCUs, MCs, and/or GWs, to a network. Similarly, the network point of attachment for ATM and other network can also be defined. Each H.323 entity has at least one network address which uniquely identifies the H.323 entity on the network. The address is specific to the network environment in which the endpoint is located. Different network environments may have different network address formats. H.323 permits an endpoint to use different network addresses for different channels within the same call.

H.323 Point of Attachment: the gatekeeper with which an H.323 terminal, GW (IWF), MC, or MCU is Databased.

Mobile Entity: the H.323 entity that changes its point of attachment (network and/or H.323 point of attachment) from one attachment to another. A mobile entity can continue to communicate with other H.323 entities at any location as it moves from place-to place.

Home GK: a gatekeeper in the mobile entity's home zone which performs the necessary management functions for departed mobile entities and maintains current location information for each. Any H.323 GK that provides the support for H.323 mobile entities can act as a home GK.

Home Network: the network in the mobile entity's home network and the network which has been declared by the mobile entity as its home network, e.g., an IP subnetwork in the home zone declared as a home network by a mobile entity.

Home Network Address: the address of the network point of attachment in the home network of a mobile entity, e.g., IP address (RAS transport address) in a home IP subnetwork. If the transport address contains the network address in addition to the TSAP, the home transport address will also contain the home network address.

Foreign GK: a gatekeeper on a mobile entity's visited- or visiting-zone which cooperates with the home GK to have the information related to the mobile entity while it is away from its home zone. Any H.323 GK that provides the support for H.323 mobile entities can act as a foreign GK.

Foreign Network: the network in the mobile entity's foreign zone where the said network has been declared by the mobile entity as its foreign network, e.g., an IP subnetwork in a foreign zone of a mobile entity.

Care-of Network Address: the address of the network point of attachment in a foreign network of a mobile entity, e.g., IP address (RAS transport address) in a foreign IP subnetwork. If the transport address contains the network address in addition to the TSAP, the care-of transport address will also contain the care-of network address.

Visiting GK: a foreign GK that the mobile entity is presently visiting, i.e., the mobile entity is currently residing within a foreign zone that is managed by a foreign GK.

Visited GK: the foreign GK that had been visited by the mobile entity previously.

Target GK: the foreign GK that the mobile entity intends to visit.

Target Network: the target network that the mobile entity intends to visit.

Mobile GK: either a home GK or a foreign GK.

Home Zone: a zone that is managed by a home GK of a mobile entity.

Foreign Zone: a zone managed by a foreign GK.

Visiting Zone: a zone other than a mobile entity's home zone in which the mobile entity is currently residing, i.e., a foreign zone in which the mobile entity is presently visiting.

Visited Zone: a zone other than a mobile entity's home zone that the mobile entity has visited previously, i.e., the foreign zone which had been visited by the mobile entity previously.

Target Zone: a zone other than a mobile entity's home zone that the mobile entity intends to visit.

Visiting Entity: a mobile entity that is residing in a visiting zone managed by a visiting GK.

Visiting Terminal: a mobile H.323 terminal that is residing in a visiting zone managed by a visiting GK.

Visiting User: a mobile H.323 terminal that is residing in a visiting zone managed by a visiting GK.

Visitor List: the list of mobile entities currently visiting a foreign zone.

GK Advertisement for Mobility Services: foreign gatekeepers advertise their presence by using a special message to provide services for mobile entities.

Care-of Address: the terminal address of the point of attachment; e.g., care-of network address of mobile entity or care-of address of a foreign GK where a mobile entity is residing. There are two different types of care-of address: a foreign GK care-of address with which a mobile entity is Databased; a care-of network address which the mobile entity has associated with one of its own network interfaces, e.g., a temporary IP address of the visitor may be acquired dynamically using the Dynamic Host Configuration Protocol (DHCP).

Location Area: a location area may constitute a cell or a certain group of cells in a given geographical area that resides within a zone.

Administrative Domain: An administrative domain is a collection of H.323 entities administered by one administrative entity and may contain one or more gatekeepers (that is one or more zones). It may also contain one or more border elements for communications between the domains. Like zone, an administrative domain can also be termed as home or foreign (visited, visiting, or target) domain.

Mobile H.323 (Mobile H.323 Protocol): the extended and existing H.323/H.225.0/H.245 messages that are used to support mobility in H.323 are termed as mobile H.323 protocol or simply as mobile H.323.

Clearly, H.323 mobility provides two kinds of changes in point of attachment: changing Network Point of Attachment in H.323 to H.323 calls (it can also be termed as a part of change in H.323 point of attachment), and changing H.323. Point of Attachment (e.g., change in zone or domain). Broadly speaking, both kinds of change in attachment can be termed as change in H.323 point of attachment. The change of attachment can also occur during calls, i.e., handover, and between calls, e.g., roaming. A change in point of attachment, e.g., a change in IP address or a change in zone/domain boundary, may result in handover during the call.

FIG. 1 shows a generic configuration of H.323 mobility architecture. It shows that H.323 mobile entity 1102 resides within a zone 1 (home/foreign) 104 where zone 1 is controlled by gatekeeper 1 (home/foreign) 106. For an H.323 mobile entity that has designated this zone as its designated home zone, the gatekeeper of this zone will also be its home gatekeeper. An H.323 mobile entity Gatekeeper 1 may keep the information related to mobile entities that have designated this gatekeeper (and thereby the zone) as their home gatekeeper 1 (and thereby the home zone) to a database known as home location database 1108. However, if the H.323 mobile entity is a visitor from another zone or domain, then is this gatekeeper and zone will be its foreign gatekeeper and foreign zone. Again, as defined earlier, a foreign gatekeeper/zone can also be visited, visiting, or target gatekeeper/zone depending on the criteria whether or not the mobile entity visited, visiting, or target to visit the gatekeeper/zone. If it is so, gatekeeper 1 designated as the foreign gatekeeper may keep the information related to the foreign mobile entity to a database known visitor location database 1. It may be noted that home or visitor location database can be implemented combining both functions together or they can be two independent entities depending on the implementation. A foreign gatekeeper may have to contact foreign mobile entity's home gatekeeper and/or home location database to know the detail about the mobile entity (e.g., authentication, authorization, profile verification, service criteria, etc.), and a protocol is needed for communications between the foreign GK/visitor location database and the home GK/home location database. Similar is the case for mobile entity 2 110 which is in home/foreign zone 3 112. Each zone has to deal with each mobile entity in accordance to the criteria as describe earlier. It is interesting to note that there can be a single or multiple home/visitor location databases depending on the need of the design criteria.

Figure 2:
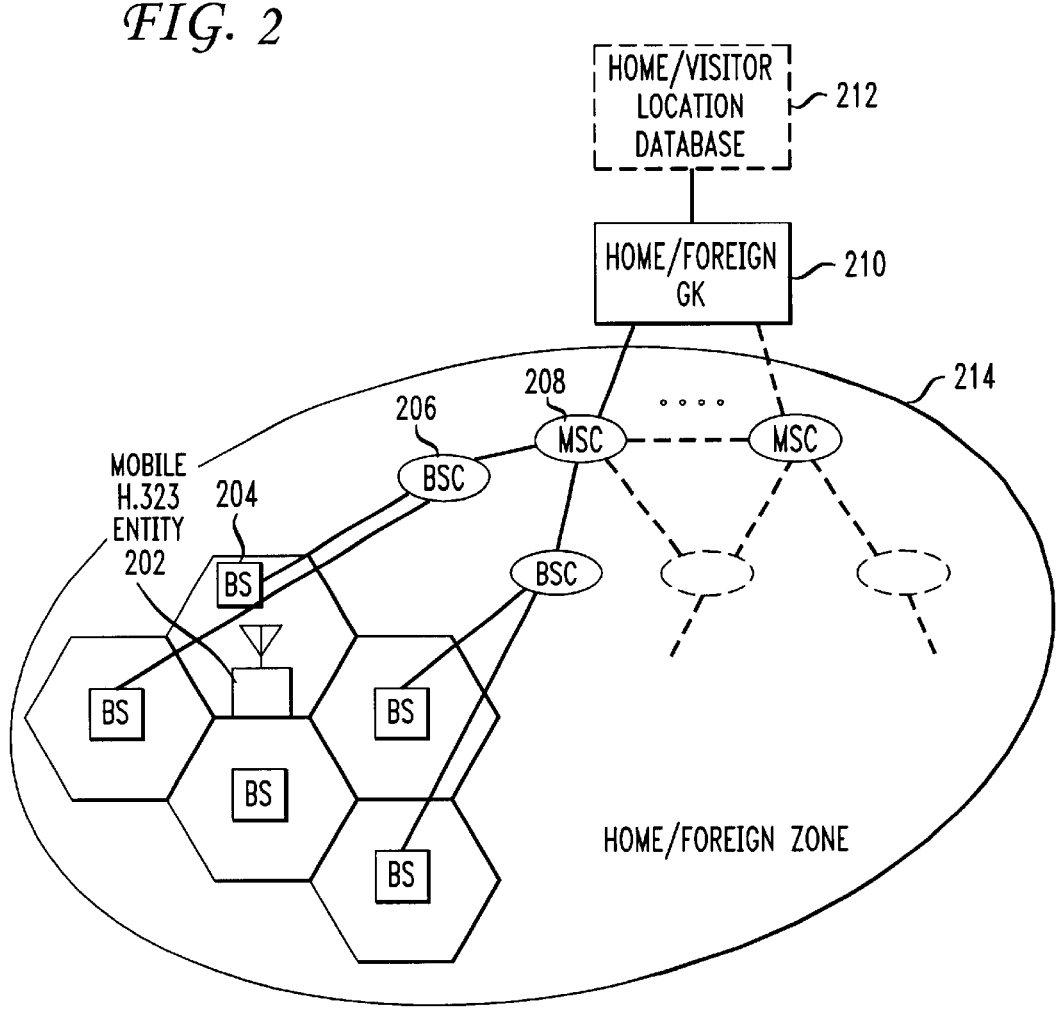
FIG. 2 is a schematic showing an exemplary architecture of a zone containing cells in a wireless environment in accordance with the present invention.

In FIG. 2, it is shown that a zone may also contain cells in wireless networking environment. A cell may vary in size depending on networking design criteria. For example, the cell size of the existing cellular network can be termed as macro-cell, whereas the smaller cells, especially in the indoor environment, can be termed as micro- or pico-cell. Within a cell, there can base station (BS), base station controller (BSC), and/or mobile switching center (MSC)). An MSC may contain router (e.g., IP router) or switch (e.g., ATM switch, FR switch, etc.). An H.323 mobile entity residing in a cell will be communicating with a base station (BS) using the wireless link. In turn, the base station will be communicating to a base station controller, and a base station to an mobile switching center. A gatekeeper may be connected to an MSC while a gatekeeper (home/foreign) will communicate with the home/visitor location database as appropriate as described in FIG. 1. FIG. 2 is a block diagram showing one embodiment of a mobile H.323 entity 202 operating in a home/foreign zone 214 and communicating using a local Base Station (BS) 204 that communicates with a Base Station Controller (BSC) 206 in accordance with the present invention. The BSC 206 is one of a plurality of BSCs operating in the home/foreign zone 214, and the BSC 206 forwards the communication from the mobile H.323 entity to a Mobile Switching Center (MSC) 208 in the home/foreign zone 214. There may be a plurality of MSCs in the home/foreign zone 214. The MSC 208 then forwards the mobile H.323 entity's communication to the home/foreign GK 210 with which the mobile H.323 entity 202 is registered. Typically, the home/foreign GK 210 has a home/visitor location database 212 for storing location information for mobile H.323 entities which are registered for the home/foreign zone 214.

Figure 3:
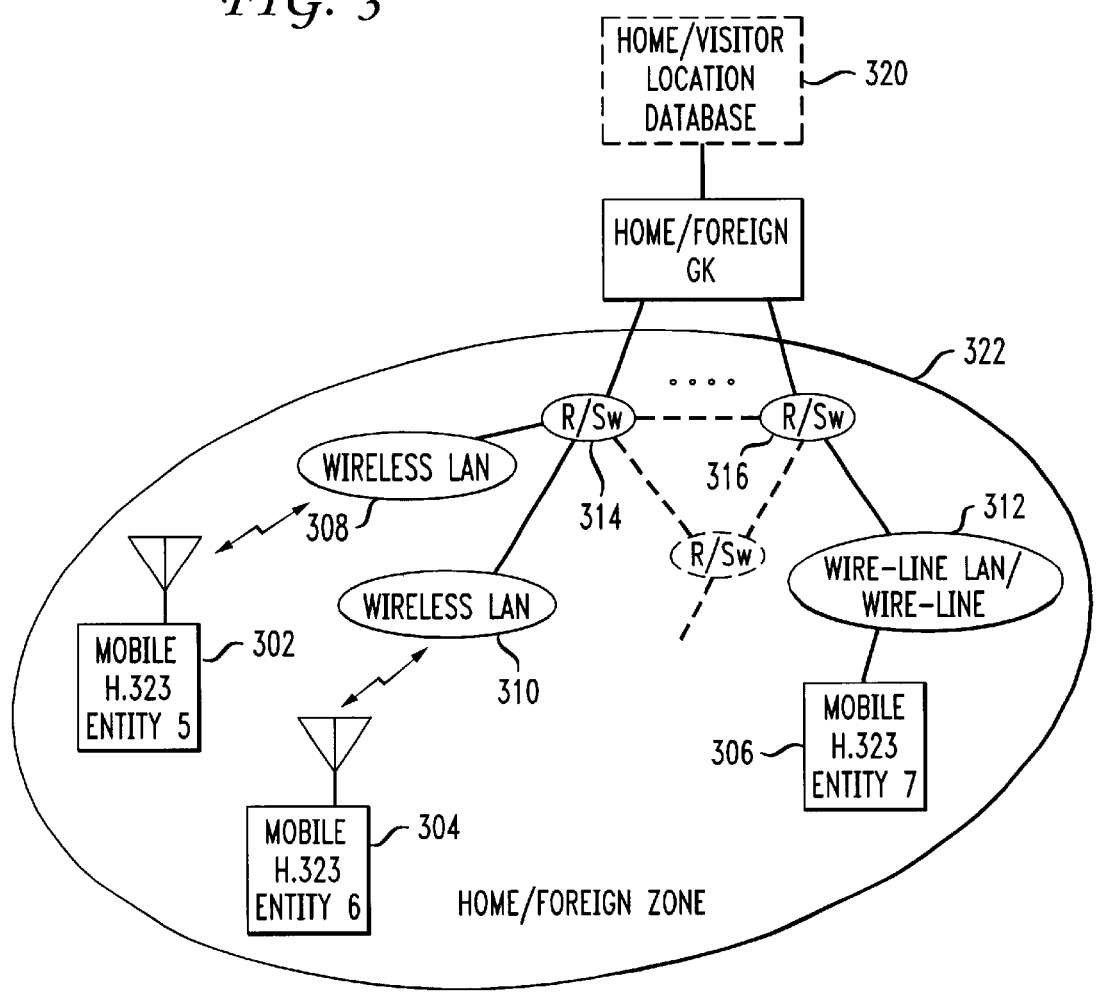
FIG. 3 is a schematic diagram showing an exemplary architecture of a zone containing wireless LANs and wire-line LAN or wire-line in accordance with the present invention.

In FIG. 3, another architecture of a zone is shown where a zone contains wireless LANs, wire-line LANs, wire-lines, etc. In the case of wireless LANs (e.g., Ethernet, Token Ring, ATM, LAN/Hub, etc.), the mobile entity may be directly communicating to a router or switch via wireless devices connected to the LAN. In the case of end-to-end wire-line network, the mobile entity is directly connected to the network via wire. Like FIG. 2, the gatekeeper (home/foreign) can communicate to the home/visitor location database as appropriate as described in FIGS. 1 and 2.

FIG. 3 is a block diagram showing one embodiment of mobile H.323 entities 302, 304 arranged to communicate with a wireless LAN 308, 310 and a mobile H.323 entity 306 that is coupled to a wire-line LAN 312 in accordance with the present invention. The wireless LANs 308, 310 and the wire-line LAN 312 are coupled to their respective Router/Switches (R/Sws) 314, 316, which communicate with the home/foreign GK 318 for the home/foreign zone 322 that encompasses the mobile region for the mobile entities.

FIGS. 1, 2, and 3 show clearly that a zone/domain may have a variety of architectures and architectural entities over which H.323 mobility protocol can be applied transparently. However, if an H.323 mobile entity moves, the network point of attachment also changes that also may cause to change in zone and/or domain. For example, changing a network point of attachment in H.323 to H.323 cells may be done during a call, i.e., a handover, and may be intra-zone, inter-zone, or inter-domain; changing a network point of attachment in H.323 to H.323 cells may also be accomplished between calls, e.g., roaming, and may also be intra-zone, inter-zone, or inter-domain. Changing an H.323 point of attachment may occur during a call, i.e., handover, and may be intra-zone, inter-zone, or inter-domain; similarly, changing an H.323 point of attachment may occur between calls, e.g., roaming, and may also be intra-zone, inter-zone, or inter-domain.

Mobile H.323 solves the mobility problems at the middleware/application layer. Thus, solutions for the mobile H.323 complement the mobility solutions provided in the lower packet-based transport network, e.g., mobile IP developed by the IETF for the IP transport network and an interworking scheme is defined between the packet-based mobile H.323 system and the existing circuit-switched-based wireless-PSTN networks, e.g., ANSI-41 and GSM MAP of Public Land Mobile Network (PLMN) using the interworking function (IWF) or gateway (GW).

Roaming and handover handling, which are not provided form by the current version of H.323, are important mechanisms to support mobility. In order to support mobility, H.323 requires extension for integration of roaming and handover operations along with registration (pre-call setup), location update, call establishment, and call teardown. During handover, a continuity of each medium stream needs to be provided while a terminal changes its location. For example, in a wireless LAN or cellular network, an H.323 mobile entity may be available in more than one link at a time (i.e., within wireless transmitter range of network devices on more than one separate link), and simultaneous connections may co-exist for a brief period of time until the handover is completed. The resources to the new location will be allocated, and the resources to the old location will be released.

In using H.323, an H.323 entity registers to a Gatekeeper for admission to the H.323 system using the registration, admission, and status (RAS) signaling messages. The Gatekeeper, which is optional in an H.323 system, provides call control services to the H.323 endpoints. More than one Gatekeeper may be present and communicate with each other in an unspecified fashion. The Gatekeeper is logically separate from the endpoints; however, its physical implementation may coexist with a terminal MCU, GW or IWF, MC, or other non-H.323 network device.

When present in a system, a Gatekeeper provides many services: Address Translation, Admission Control, Bandwidth Control, and Zone Management. The Gatekeeper may also perform other optional functions such as: Call Control Signaling, Call Authorization, Bandwidth Management, Call Management, Bandwidth reservation for terminals not capable of their own bandwidth reservation, Directory Services and the like. Thus, a Gatekeeper becomes the functional entity to manage mobility in H.323 that will enable mobile H.323-based multimedia telephony over the packet-based networks for both connectionless and connection-oriented networking environment.

A zone may have many subnetworks controlled by a single gatekeeper. If a terminal or user moves within a zone, its network point of attachment, e.g., IP subnetwork (RAS transport address), may change, although it will remain under the control of the same Gatekeeper. The mobile entity needs to register with the Gatekeeper to update its new network point of attachment. Accordingly, the new resources may also need to be allocated considering the new network point of attachment while the resources allocated, if any, to the old attachment, need to be released.

However, communications between the Gatekeepers will be required particularly to update the mobile's location when a terminal or user crosses the zone boundary, involving inter-zone communications between the desired functional entities. If needed, resources may also need to be allocated to the new point of attachment of the mobile entity, and the resources to the old point of attachment may be required to be taken off. In order to facilitate such changes, the terminology home GK, foreign GK, home zone, foreign zone, etc. is utilized. A home GK is a gatekeeper with whom an H.323 entity registers and designates as its home GK. A home zone is a zone which is managed by an H.323 entity's home GK. A foreign GK is a gatekeeper with whom an H.323 entity registers after moving from its home zone. A foreign zone is a zone which an H.323 entity's home GK does not manage.

A foreign zone in which an H.323 entity is residing presently may also be termed as a visiting zone and, the foreign GK may also be termed a visiting GK. A foreign zone in which an H.323 mobile entity had been residing previously may also be termed a visited zone and the foreign GK may also be termed as the visited GK. A terminal or user may be termed a visiting terminal or user when the H.323 entity remains in the foreign zone.

An H.323 mobile entity needs to register with a mobile GK that will serve as its home GK. The home GK becomes the controlling entity as the mobile entity moves from place to place. If needed, the mobile entity may also determine which GK will become its home GK. Once the mobile entity determines which GK will become its home GK, the mobile entity then registers with the selected GK.

A mobile GK typically advertises periodically its availability to provide mobility services for the visiting mobile entities in its zone. The visiting mobile entities will register with the mobile (foreign) GK upon receiving the advertisement message. While in a foreign zone, the mobile entity may also seek a foreign GK using a gatekeeper discovery message. In any case, the mobile terminal registers with the foreign GK upon crossing the home zone boundary. The foreign GK then communicates with the H.323's home GK for registration and location update information.

An H.323 mobile entity designates a GK as its home GK through registration. The home GK is the central functional entity that manages mobility and authentication for the mobile entity. The home transport address (RAS, Call Signaling) of the home subnetwork of the home zone of the mobile entity is provided to the home GK during registration. As the mobile entity moves form one place to another, the registration of the mobile entity's current information is exchanged with its home GK. Registration is required before any call is attempted.

An option, similar to the mobile IP protocol, may be provided to keep the home transport address fixed for a mobile entity. That is, an H.323 entity may always send a call to another a mobile entity's fixed home transport address in the home zone managed by the mobile entity's home GK, and the home GK then establishes the call to the mobile entity's present care-of address (i.e., a home GK-routed call). In this way, a mobile entity's care-of address will not be known to the calling party or entity, and a mobile entity can hide its location. However, a call may be established directly to the care-of transport address of the mobile entity if mobile entity's address is known. This can be done if the mobile entity's address is priori known to the calling entity or if the policy is such that the home gatekeeper is allowed to let the address of the called mobile entity be known to the calling entity. In this way the home gatekeeper will let the calling entity know the care-of address of the called mobile entity, and the calling entity can then directly establish the call to mobile's care-of address.

A mobile GK advertises its availability for mobility services, and a mobile entity may solicit the availability of the mobile GK as the mobile GK moves from one zone to another.

When needed, a paging message may be sent for the location discovery of a mobile entity. During location updating after receiving the paging message, where a mobile entity has not yet been registered, it goes through a registration process.

A gatekeeper manages the H.323 mobile entities. Each mobile H.323 belongs to a home GK where it registers for subscription of mobility services. The home GK needs to keep track of a mobile H.323 entity's location along with other information (e.g., user profiles, accounting information, etc.) a it moves from one place to another. A user profile may contain call-related information (such as call forwarding, call barring, and the like), close user group (CUG) information, roaming restrictions, supplementary services, subscription categories, etc. A gatekeeper may contain one or more subnetworks that constitute a zone. In some instances, each subnetwork may be an access network or location area/Cell/Zone (e.g., wireless LAN, wireless access unit of the cellular network, etc.), and each zone may contain one or many access networks or location areas/Cell/Zone. A foreign GK keeps track of visiting H.323 entities that are operating in the specific foreign GK's serving zone. Originally, the location of an H.323 entity is known to its home GK and the foreign GK must communicate with the visiting entity's home GK. The foreign GK must inform the visiting entity's home GK when the visiting H.323 entity registers with it, and the home GK updates its records to reflect that the mobile subscriber is now located a the new location.

An H.323 mobile entity may also move from one foreign zone to another foreign zone. During the communication process, the home GK may also need to communicate with the visited GK about the mobile H.323 entity or subscriber in addition to the visiting GK because the home GK keeps complete information about its mobile subscribers. The home GK and the foreign GK may also exchange security information (e.g., H.235) to provide authentication, privacy, and integrity. If needed, the H.235 security mechanisms may be extended to include special features for the mobile environment. Such features may include random numbers used for authentication (e.g., RAND), ciphering a key sequence number (e.g., CKSN), and security parameters in response to an authentication request (e.g., SRES). In addition, a home GK may keep the equipment identity register (EIR) that contains information the H.323 mobile subscriber equipment. The EIR may contain the identification of the manufacturer of the mobile subscriber equipment (e.g., the International Mobile Equipment Identity IMEI)), conformance testing information, and the identifier of the factory that assembled the H.323 mobile equipment. Moreover, the International Mobile Subscriber Identity (IMSI) and the Temporary Mobile Subscriber Identity (TMSI) may also be used by the H.323 mobile subscribers as appropriate. These special mobile subscriber identities may also be stored in a home GK at the time of registration by the mobile users. A mobile subscriber determines whether to use the IMSI or TMSI. The IMEI, IMSI, and TMSI numbers may be considered as another kind of H.323 alias addresses. However, the IMEI is primarily helpful for the terminal mobility, while the IMSI and TMSI are utilized more in describing the user mobility.

H.323 mobility services may be described with respect to the higher middleware/application layer in a transport independent manner. At present, H.323 provides mechanisms to discover a GK by an H.323 entity using Gatekeeper Request (GRQ), Gatekeeper Confirmation (GCF), and Gatekeeper Reject (GRJ) messages. These messages are extended in the present invention to manage the mobile environment.

If an H.323 mobile entity desires to receive mobility services, such a mobile entity must first determine its home GK of its home zone that will act as the central entity to manage its mobility. The GRQ/GCF/RJ message may be extended to determine the home GK. Once the home GK is known, the mobile entity may then use registration messages to register with the home GK. Again, the registration messages of H.323 as it presently exists may be extended to the mobile environment. Upon crossing a home zone boundary, the mobile H.323 entity must re-register with the foreign GK. A H.323 gatekeeper that provides mobility services advertises its availability using a Mobility Gatekeeper Advertisement (MGA) message periodically with a multicast address. Upon receiving the MGA message, the mobile entity may detect a mobile GK that can support services related to mobility. If necessary, the mobile entity may also send the extended GRQ message to determine the mobile GK in the foreign zone. However, it is preferable to determine the mobile GK with the help of the MGA message. An H.323 mobile entity may use the extended registration messages to register with the mobile GK when it determines the mobile GK with which it needs to register in a foreign zone. A mobile entity can detect that it has crossed a zone boundary into a foreign zone through examining MGA messages.

Typically, the MGA message informs the mobile entities about the special features of the advertisement and typically includes the following fields:

RequestSeqNum: a monotonically increasing number unique to the sender. It is returned by the receiver in any messages associated with a specific message.

AdvertisedTimeToLive: duration of the validity of the registration with the mobile GK, typically in seconds. After this time elapses, the gatekeeper may consider the registration no longer current.

NeedToRegisterWithGK: set to TRUE to indicate that the mobile entity must register with this foreign gatekeeper before sending other RAS requests.

BusyForeignGK: set to TRUE to indicate that the foreign gatekeeper is busy.

HomeGKIdentifier: is an OPTIONAL field that is included to identify the home gatekeeper. If it is supplied, it is included in future RAS messages sent to the home gatekeeper. This gatekeeper acts as the central entity to manage the mobility of the mobile entity that will designate this gatekeeper as its home gatekeeper.

ForeignGK: an OPTIONAL field that is used to indicate the gatekeeper that works as a foreign gatekeeper when the mobile entity enters into the zone controlled by this gatekeeper. The structure of the foreign gatekeeper includes:

ForeignRASAddress: the transport address used for RAS signaling. This address is used as the care-of gatekeeper address for the mobile entity.

ForeignGKIdentifier: optionally included to identify the foreign gatekeeper. If it is supplied, it is included in future RAS messages sent to the foreign gatekeeper.

ZoneRange: a list of subnetworks covered by a mobile (home/foreign) GK in a given zone.

NonStandardData: carries information not defined (for example, proprietary data).

A GK may act as both a home GK and a foreign GK for mobile users. The same GK will also act as a "normal" GK for fixed users that are not designated as mobile users. In such a situation, typically both the home GK and the foreign GK will have the same gatekeeper identifier and the same RAS address. The ZoneRange is the same for both the home GK and the foreign GK because there is only one GK in a given zone. Home GKs do not have to advertise the care-of address, but still must broadcast, multicast, or unicast MGA advertisements so that mobile entities will know when they have returned to their home zone. The mobile entity updates its location to its home GK when it returns to its home zone. It should be noted that a foreign GK may not indicate that it is busy unless it declares that it is a foreign GK. Also, it should be noted that a foreign GK must continue sending advertisements out, even though it is too busy to provide service to new mobile entities. Otherwise, the foreign GK's current customers may think that the foreign GK has crashed, and move away unnecessarily. The mobile GK will generally increment the sequence number by one for each successive advertisement.

Extensions to the GRQ messages allow an alternative means to discover the mobile GK (home or foreign) by a mobile entity. If the MGA message is not received within a certain period of time, the mobile entity may prefer to use these extended messages to discover the mobile GK. There may be other reasons such as use of the same method for discovering the GK for both fixed and mobile entities, to use the GRQ messages to discover the mobile GK.

A mobile entity can find the mobile GK that will serve as its home GK in its home/zone in one of two ways: Manually or Dynamically using the GK discovery messages (GRQ/GCF/GRJ). Similarly, a mobile entity may also seek to discover dynamically which GK it needs to register with once it determines that it is in a foreign zone, assuming that it has not received the MGA message from the mobile GK. The GRQ/GCF/GRJ messages have been extended to cover the mobile user as described below.

The main purpose of the GRQ message is to discover a GK for a fixed or mobile entity. Thus, the information related to the visited or target GK is not required. However, new OPTIONAL alias addresses like IMEI, IMSI, and TMSI need to be included. The GRQ message needs to be extended as follows:

HomeZone: set to TRUE to indicate that a mobile entity is seeking a registration in a home zone.

ForeignZone: set to TRUE to indicate that a mobile entity is seeking a registration in a foreign zone.

HomeGK: an OPTIONAL field to indicate the gatekeeper that acts as the mobile entity's home gatekeeper when the mobile entity enters into a foreign zone. The information related to the HomeGK is provided if the ForeignZone field is set to TRUE.

The structure of the home GK contains:

HomeRASAddress: the transport address used for RAS signaling. This address is used as the home RAS transport address for the mobile entity in its home zone.

HomeCallSignalAddress: the transport address used for call signaling. This address is used as the home call signaling transport address for the mobile entity in its home zone.

HomeGKIdentifier: an OPTIONAL field that identifies the home gatekeeper. If it is supplied, it is included in future RAS messages sent to the home gatekeeper.

EndpointAlias: additional OPTIONAL International Mobile Equipment Identify (IMEI), International Mobile Subscriber Identity (IMSI) and Temporary Mobile Subscriber Identity (TMSI) alias addresses are included herein.

It is important to note that if the HomeZone is set to TRUE, the ForeignZone may not be set to TRUE and vice versa. If both the HomeZone and the ForeignZone are set to FALSE, or none of these extended message fields are used, it is the fixed H.323 entity that is seeking to discover the GK. If the HomeZone is set to TRUE, no information related to the HomeGK field is supplied. Thus, with respect to the present H.323 system, the RASAddress field of the GRQ message becomes the home RAS transport address (HomeRASAddress) of the mobile entity. Similarly, the gatekeeperIdentifier field, if used to identify the gatekeeper, becomes the home gatekeeper (HomeGKIdentifier) of the mobile entity. The transport address provided in the alternateEndpoints field of the present H.323 becomes the alternate home transport address (EndpointAlias) of the mobile entity.

If the ForeignZone is set to TRUE, the information related to the HomeGK field may also be supplied. The information related to the home GK may be used to serve many purposes. For example, the serving mobile GK (visiting GK) may be able to differentiate services based on the information of the home GK, if needed. It can be seen that the RASAddress of the GRQ message supplied by the mobile entity becomes its care-of transport address once it indicates that it is in a foreign zone. However, it is important to note that the mobile entity must acquire the care-of transport address before seeking a care-of (foreign). GK using the GRQ message after moving to the foreign zone (e.g., a temporary IP address of the visitor (mobile entity in a foreign zone) may be acquired dynamically by such means as the DHCP in the respective subnet. Similarly, the OPTIONAL gatekeeperIdentifier field, if known prior to the mobile entity, also provides the indication as mobile entity's care-of gatekeeper in the foreign zone. The transport address provided in the OPTIONAL alternateEndpoints field becomes the alternate care-of transport address of the mobile entity in the foreign zone. Moreover, additional information about the homeRASAddress and the homeCallSignalingAddress transport address will be supplied by the mobile entity for indicating to its mobile GK that these addresses are in its home zone. The mobile entity will supply its home gatekeeper identification in the homeGKIdentifier field.

The GCF message is extended as follows:

HomeZone: set to TRUE to indicate that a mobile entity is seeking a registration in a home zone.

ForeignZone: set to TRUE to indicate that a mobile entity is seeking a registration in a foreign zone.

AdvertisedTimeToLive: an OPTIONAL field. However, if the ForeignZone field is set to TRUE, this field shall be used. This field provide s the duration of the validity of the registration with the mobile GK, typically in seconds. After this time, the gatekeeper may consider that the registration is no longer current.

If HomeZone is set to TRUE, ForeignZone cannot be set to TRUE and vice versa. If both HomeZone and ForeignZone are set to FALSE or none of the extended message fields are used, it is the fixed H.323 entity's GK that has been confirmed.

If the HomeZone field of the GCF message is set to TRUE, the RASAddress field of the GCF message becomes the transport address of the home GK of the mobile entity. Similarly, the gatekeeperIdentifier field, if used to identify the gatekeeper, becomes the identity of the home GK of the mobile entity. The transport address and gatekeeper identifier provided in the alternateGatekeeper field becomes the transport address and gatekeeper identifier of the alternate home GK of the mobile entity. If the ForeignZone field is set to TRUE, the RASAddress field of the GCF message becomes the care-of transport address of the foreign GK of the foreign GK of t he mobile entity. Similarly the gatekeeperIdentifier field, if used to identify the gatekeeper, becomes the identify of the foreign G of the mobile entity. The transport address and gatekeeper identifier provided in the alternateGatekeeper field becomes the alternate transport address and gatekeeper identifier of the alternate care-of foreign GK of the mobile entity.

The GRJ message is extended as follows:

Home Zone: set to TRUE to indicate that a mobile entity is seeking a registration in a home zone.

ForeignZone:set to TRUE to indicate that a mobile entity is seeking a registration in a foreign zone.

HomeGKNotServe: this optional field can be used if the foreign field is set to TRUE. The foreign GK with which a mobile entity is trying to register with may deny registration if it does not want to serve visitors (mobile entities) of that particular zone. If the HomeZone field is set to true, the ForeignZone cannot be set to true and vice versa. If both the HomeZone and ForeignZone fields are set to FALSE, or none of these extended message fields are used, it is the fixed H.323 entity's request for seeking a GK that has been rejected. If the HomeZone field is set to TRUE, the gatekeeperIdentifier field of the GRJ message, if used to identify the gatekeeper, indicates the GK that the mobile entity wanted to register with as its foreign GK. The information provided in the optional altGKinfo field indicates the mobile entity needs to try an alternative GK provided in the list to serve as its foreign GK.

FIG. 4 is a flow chart of one embodiment of an H.323-based mobility protocol for real-time mobile multimedia communications and conferencing over packet-based networks in accordance with the present invention. A plurality of H.323 mobility gatekeepers provide notification of H.323 mobility services availability by periodically broadcasting/multicasting/unicasting a Mobility Gatekeeper Advertisement with a multicast/unicast address. The protocol typically includes the steps of: upon becoming mobile and initiating an H.323 communication that includes at least one of: audio, video and data, by the Mobile Terminal/Node/Entity, with respect to notification 402, one of: providing, by at least one of a plurality of available H.323 Home/Foreign Mobility Gatekeepers, notification of H.323 mobility services availability by periodically broadcasting/multicasting/unicasting a Mobility Gatekeeper Advertisement with a multicast/unicast address; and where the Mobile Terminal/Node/Entity lacks notification of H.323 mobility services availability, broadcasting/multicasting/unicasting sending, by the Mobile Terminal/Node/Entity, a message to the Home Gatekeeper/Home Location Database, which notifies H.323 Home/Foreign Mobility Gatekeepers in a preselected area local to the Mobile Terminal/Node/Entity that the Mobile Terminal/Node/Entity needs H.323 mobility services and notifying, by the H.323 Home/Foreign Mobility Gatekeepers, the Mobile Terminal/Node/Entity of available H.323 Home/Foreign Mobility Gatekeepers; registering 404, by the Mobile Terminal/Node/Entity, with a H.323 Home/Foreign Mobility Gatekeeper of the available H.323 Home/Foreign Mobility Gatekeepers that support H.323 mobility services in a Location Area/Cell/Zone of the Mobile Terminal/Node/Entity; and providing 406, for the Mobile Terminal/Node/Entity by the H.323 Home/Foreign Mobility Gatekeeper with which the Mobile Terminal/Node/Entity is registered, support for the H.323 communication that includes at least one of: audio, video and data.

Registering with the H.323 Home/Foreign Mobility Gatekeeper may include sending registration information for the Mobile Terminal/Node/Entity using a Base. Station to Base Station Controller to Mobile Switching Center to H.323 Home/Foreign Gatekeeper system. Alternatively, registering with the at least one H.323 Home/Foreign Mobility Gatekeeper may include sending registration information for the Mobile Terminal/Node/Entity using a wireless/wire-line Local Area Network to Router/Switch to H.323 Home/Foreign Gatekeeper system.

Figure 5:
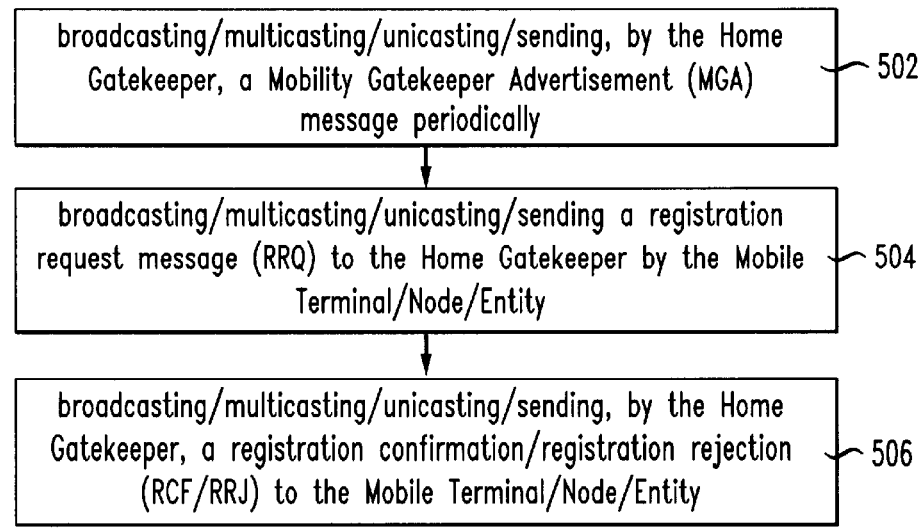
FIG. 5 is a flow chart showing one embodiment of steps for Databasing locally in accordance with the present invention.

As shown in FIG. 5, in one embodiment, registering may include the steps of: broadcasting/multicasting/unicasting sending 502, by the Home Gatekeeper, a Mobility Gatekeeper Advertisement (MGA) message periodically; broadcasting/multicasting/unicasting/sending 504 a registration request message (RRQ) to the Home Gatekeeper by the Mobile Terminal/Node/Entity; and broadcasting/multicasting/unicasting sending 506, by the Home Gatekeeper, a registration confirmation/registration rejection (RCF/RRJ) to the Mobile Terminal/Node/Entity.

Figure 6:
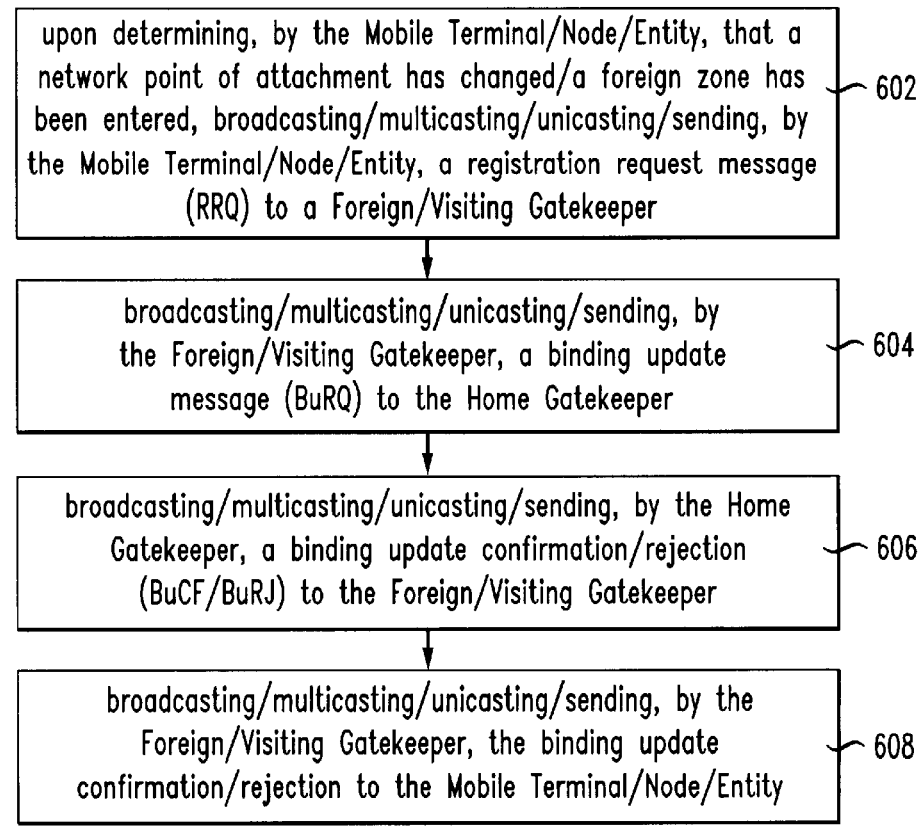
FIG. 6 is a flow chart showing one embodiment of steps for setting up a mobile H.323-based call in accordance with the present invention.

As shown in FIG. 6, in another embodiment, registering may include the steps of:

upon determining, by the Mobile Terminal/Node/Entity, that a network point of attachment has changed/a foreign zone has been entered, broadcasting/multicasting/unicasting/sending 602, by the Mobile Terminal/Node/Entity, a registration request message (RRQ) to a Foreign/Visiting Gatekeeper; broadcasting/multicasting/unicasting/sending 604, by the Foreign/Visiting Gatekeeper, a binding update message (BuRQ) to the Home Gatekeeper; broadcasting/multicasting/unicasting/sending 606, by the Home Gatekeeper, a binding update confirmation/rejection (BuCF/BuRJ) to the Foreign/Visiting Gatekeeper; broadcasting/multicasting/unicasting/sending 608, by the Foreign/Visiting Gatekeeper, the binding update confirmation/rejection to the Mobile Terminal/Node/Entity.

Where the Mobile Terminal/Node/Entity has already visited another foreign zone regulated by a Visited Gatekeeper, registering may include:

broadcasting/multicasting/unicasting/sending, by the Home Gatekeeper, a mobility unbinding message (UbRQ) to the Visited Gatekeeper; and broadcasting/multicasting/unicasting/sending, by the Visited Gatekeeper, a mobility unbinding confirmation/rejection (UbCF/UbRJ) to the Home Gatekeeper.

Where the Mobile Terminal/Node/Entity has already visited another foreign zone regulated by a Visited Gatekeeper, registering may include:

broadcasting/multicasting/unicasting/sending, by the Mobile Terminal/Node/Entity, a registration request message (RRQ) to a Foreign/Visiting Gatekeeper;

broadcasting/multicasting/unicasting/sending, by the Foreign/Visiting Gatekeeper, a mobility unbinding update message (UbRQ) to the Visited Gatekeeper;

broadcasting/multicasting/unicasting/sending, by the Visited Gatekeeper, a mobility unbinding confirmation/rejection (UbCF/UbRJ) to the Foreign/Visiting Gatekeeper;

broadcasting/multicasting/unicasting/sending, by the Foreign/Visiting Gatekeeper, a provisional registration confirmation to the Mobile Terminal/Node/Terminal and broadcasting/multicasting/unicasting/sending, by the Foreign/Visiting Gatekeeper, a binding update message (BuRQ) to the Home Gatekeeper; and broadcasting/multicasting/unicasting/sending, by the Home Gatekeeper, a binding update confirmation/rejection (BuCF/BuRJ) to the Foreign/Visiting Gatekeeper.

Where the Mobile Terminal/Node/Entity has already visited another foreign zone regulated by a Visited Gatekeeper, registering may include:

broadcasting/multicasting/unicasting/sending, by the Mobile Terminal/Node/Entity, a registration request message (RRQ) to a Foreign/Visiting Gatekeeper;

broadcasting/multicasting/unicasting/sending, by the Visited Gatekeeper, a mobility unbinding confirmation/rejection (UbCF/UbRJ) to the Foreign/Visiting Gatekeeper;

broadcasting/multicasting/unicasting/sending, by the Foreign/Visiting Gatekeeper, a provisional registration confirmation to the Mobile Terminal/Node/Terminal and broadcasting/multicasting/unicasting/sending, by the Foreign/Visiting Gatekeeper, a binding update message (BuRQ) to the Home Gatekeeper;

broadcasting/multicasting/unicasting/sending, by the Home Gatekeeper, a binding update confirmation/rejection (BuCF/BuRJ) to the Foreign/Visiting Gatekeeper;

broadcasting/multicasting/unicasting/sending, by the Home Gatekeeper, a mobility unbinding update message (UbRQ) to the Visited Gatekeeper; and broadcasting/multicasting/unicasting/sending, by the Visited Gatekeeper, a mobility unbinding confirmation/rejection (UbCF/UbRJ) to the Home Gatekeeper.

In one embodiment, at least one Home/Foreign Gatekeeper utilizes a combined Home/Visitor Location Database. In another embodiment, a plurality of Home/Foreign Gatekeepers each utilize an individual Visitor Location Database and share a Home Location Database.

Where the Mobile Terminal/Node/Entity is originally located in a First Administrative Domain and is moving in a Second Administrative Domain, registering may include:

broadcasting/multicasting/unicasting/sending a registration request message (RRQ), by the Mobile Terminal/Node/Entity to the Foreign/Visiting Gatekeeper;

broadcasting/multicasting/unicasting/sending, by the Foreign/Visiting Gatekeeper, a mobility unbinding (UbRQ) message to a Visited Gatekeeper; broadcasting/multicasting/unicasting/sending, by the Visited Gatekeeper, an unbinding confirmation/rejection (UbCF/UbRJ) to the Visiting/Foreign Gatekeeper;

broadcasting/multicasting/unicasting/sending, by the Visiting Gatekeeper, a provisional registration message to the Mobile Terminal/Node/Entity; broadcasting/multicasting/unicasting/sending, by the Foreign/Visiting Gatekeeper, a mobility binding message (BuRQ) to a Border Element of the Second Administrative Domain, which forwards the message to a Border Element of the First Administrative Domain which then forwards the message to the Home. Gatekeeper;

broadcasting/multicasting/unicasting/sending, by the Home Gatekeeper, a mobility binding confirmation/rejection (BuCF/BuRJ) message to the Border Element of the First Administrative Domain, which forwards the message to the Border. Element of the Second Administrative Domain, which forwards the message to the Visiting Gatekeeper.

Where desired, an H.323 mobility gatekeeper may provide for authentication of the mobile entities/users. Typical H.323 mobility services may include address translation, admissions control, bandwidth control, and/or zone management.

A mobile entity needs to send (Registration ReQuest, Registration ConFirmation, and Registration Reject (RRQ/RCF/RRJ) messages to its home or foreign mobile GateKeeper (GK) for registration when the mobile GK has been determined either by receiving the MGA message from the mobile GK or by sending extended GRQ messages. The following describes how a mobile entity registers with the home or foreign GK while the entity is in a home/foreign zone.

In H.323, there are three kinds of registration messages: RRQ, RCF and RRJ. Since mobility introduces additional requirements, the registration messages are extended to satisfy all the additional requirements. The registration messages allow mobile entities to register with either a home or a foreign GK. The extended registration request message allows the mobile entity to inform its home GK of its current care-of address in a foreign zone, set forth how long the mobile entity desires to use the care-of address, and indicate special features that may be available from the foreign agent using the mobility binding update messages (BuRQ/BuCF, BuRJ). The foreign GK is considered a passive GK in the registration procedure, and may agree to pass the request to the home GK, and subsequently to pass the reply from the home GK back to the mobile entity.

In H.323, each home is managed by a single GK and, the said GK is the sole agent entity to perform all functions specified in the standard. Accordingly, the said GK will be able to perform services for both fixed and mobile entities. That is, the same GK, if needed, may also perform the functions of the home GK and foreign GK along with the services of the fixed users. Thus, if a mobile entity desires to receive its mobility related services, it must register with its designated home GK. Similarly, if a mobile entity moves to a foreign zone, it must register with the GK of the foreign zone, and communications with its home GK will be done via its foreign GK (or visiting GK) to update its location.

The information related to the target GK may be useful for planning purposes. For all GKs (target and/or home) may know a priori what may be expected from the mobile entity in the future. However, the transport addresses to be used in the target zone by the mobility entity may not be known until the mobile entity registers with the target GK. If the mobile entity a priori knows the transport addresses in the target zone, such addresses may be supplied.

The RRQ message is extended as follows:

The homeZone is set to TRUE to indicate that a mobile entity is seeking a registration in the home zone. The foreignZone is set to TRUE to indicate that a mobile entity is seeking a registration in a foreign zone. The homeGK is an optional message element that indicates that a gatekeeper is a home gatekeeper when the mobile entity enters into the foreign zone. However, if the foreignZone field is set to TRUE, the information related to the home GK is supplied. The structure of the home GK includes:

homeRASAddress—the transport address used for RAS signaling. This address is used as the home transport address for the mobile entity in its home zone.

homeCallSignalAddress—the transport address used for call signaling. This address is used as the home call signaling transport address for the mobile entity in its home zone.

homeGKIdentifier—an optional field that is used to identify the home gatekeeper. If the homeGKIdentifier is supplied it is included in future as messages sent to the home gatekeeper.

careOfRASAddress—an optional field that is used to identify when a mobile entity remains in its home zone, but in a subnetwork different from its home subnetwork. The care-of transport address is used for RAS signaling. This address will be used as the care-of home transport address for the mobile entity in its home zone.

care-OfCallSignalAddress—an optional field is used to identify when a mobile entity remains in its home zone, but in a different subnetwork other tan its home subnetwork. This is the care of transport address used for call signaling. This address will be used as the care-of home call signaling transport address for the mobile entity in its home zone.

The visitedZone is set to TRUE to indicate that the new home or foreign mobile GK needs to send the message for updating the location information of the registering mobile entity to its previously visited (foreign) GK. The visitedGK is an optional message element to indicate that the gatekeeper has been visited previously by the mobile before moving to its present location. However, if the visitedZone field is set to TRUE, the information related to the visitedGK field will be supplied. The structure of the visited GK includes:

visited RASAddress—the care-of transport address used by the mobile entity in the previously visited zone for RAS signaling.

visitedCallSignalAddress—the transport address used for call signaling. This address is used as the visited call signaling transport address for the mobile entity.

visitedGKIdentifier—an optional field that is used to identify the visited gatekeeper. If this field is supplied, it is included in future RAS messages sent,to the visited gatekeeper.

The targetZone is set to TRUE to indicate that the new home or foreign GK needs to send the message for updating the location information of the registering mobile entity to its targeted (foreign) GK. The targetGK is an optional message element that indicates to the gatekeeper that the mobile entity intends to visit after moving from its present location. However, if the targetZone field is set to true, the information related to the targetGK field is supplied. The structure of the targeted GK includes targetRASAdddress—an optional field. This field is the care-of transport address used by the mobile entity in the target zone RAS signaling.

targetCallSignalAddress—an optional field. This field is the transport address to be used for call signaling by the mobile entity in the target zone.

targetGIdentifier—an optional field that is used to identify the target gatekeeper that the mobile intends to visit. If it is supplied, the targetGKIdentifier is included in future RAS messages intended for the target gatekeeper.

The terminalType is an additional optional field. International Mobile Equipment Identity (IMEI), International Mobile Subscriber Identity (IMSI), and Temporary Mobile Subcriber identity (TMSI) alias addresses are also included.

The homeZone and foreignZone fields are not mutually exclusive. If the homeZone field is set to true, the foreignZone field cannot be set to true and vice versa. If the foreignZone field is set to TRUE, the time provided in the timeToLive field does not exceed the time provided in the advertisedTimeToLive field.

The visitedZone may be set independent of HomeZone, foreignZone, or targetZone fields. The targetZone field may also be set independent of homeZone, foreignZone, or visitedZone fields. If the homeZone, foreignZone, visitedZone and targetZone fields are set to FALSE or none of these extended message fields are used, it is the fixed H.323 entity that is seeking registration with the GK. If the homeZone field is set to TRUE, the GK with which the mobile entity wishes to register is the mobile entity's home GK. The RASAddress field of the RRQ message becomes the mobile entity's hoe RAS transport address in its home zone. Similarly, the gatekeeperIdentifier also provides the indication of the mobile entity's home gatekeeper in its home zone. The callSignalAddress field indicates that the home call signaling transport address of the mobile entity. The transport addresses of the alternateEndpoints become the alternate home transport addresses of the mobile entity.

If the foreignZone is set to TRUE, the information related to the homeGK field is also supplied. The mobile entity cannot provide any information regarding its home GK unless it declares that it is in a foreign zone. The RASAddress field of the RRQ message becomes the mobile entity' care-of transport address once the mobile entity indicates that it is in the foreign zone. Similarly, gatekeeperIdentifier also provides the indication of the mobile entity's (care-of) foreign GK in the foreign zone. The callSignalAddress field indicates the care-of call signaling transport address of the mobile entity. The transport addresses of the alternateEndpoints become the alternate care-of transport addresses of the mobile entity. Moreover, additional information about the homeRASAddresses and the homeCallSignalingAddress transport address will be supplied by the mobile entity for indicating to its mobile GK that these addresses are in its home zone. The mobile entity will supply its home gatekeeper identification in the homeGKIdentifier field.

If the visitedZone field is set to TRUE, the information related to the visitedGK field is also supplied. The home GK or foreign GK with which the mobile entity is registering then proceeds to update the location information about the mobile entity with the visited GK using the mobility unbinding update (UbRQ/UbCF/UbRJ) or mobility binding update (BuRQ/BuCF/BuRJ) messages as appropriate. However, additional information about the visitedRASAddress and the visitedCallSignalingAddress transport address will be supplied by the mobile entity to indicate to its mobile GK that these addresses had been in its visited zone. The mobile entity supplies its visited gatekeeper information in the visitedGKIdentifier field.

If the targetZone is set to TRUE, the information related to the targetGK field is also supplied. The home GK or foreign GK with which the mobile entity s registering then proceeds to update the location information about the mobile entity with the target GK using the mobility binding update messages (BuRQ/BuCF/BuRJ). The mobile entity supplies its visited gatekeeper information in the targetGKIdentifier field. Similarly, the transport addresses, if known, for the targetRASAddress and the targetCallSignalingAddress fields are also supplied by the mobile entity.

The RCF message is extended as follows:

homeZone is set to TRUE to indicate that a mobile entity is confirming in the home zone.

foreignZone is set to TRUE to indicate that a mobile entity is confirming in a foreign zone.

visitedZone is set to TRUE to confirm that the GK has informed the visited GK to update the location of the mobile entity.

targetZone is set to TRUE to confirm that the GK has informed the target GK to update the location of the mobile entity.

As with the RRQ, the homeZone and foreignZone fields are not mutually exclusive. If the homeZone field is set to TRUE, the foreignZone field cannot be set to TRUE, and vice versa.

If the homeZone, foreignZone and the visitedZone fields are set to FALSE or none of these extended message fields are used, it is the fixed H.323 entity's registration that has been confirmed with the GK.

The visitedZone field may be set independent of homeZone, foreignZone, or targetZone fields.

If the homeZone field is set to TRUE, the mobile entity has been registered with as its home GK and the RASAddress field sent with the RRQ message becomes the mobile entity's home transport address in its home zone. Similarly, the gatekeeperIdentifier of the RCF message also provides the indication as the mobile entity's home gatekeeper in its home zone. The callSignalAddress field of the RCF message indicates that the home transport address of the array of call signaling messages of the mobile entity. The transport addresses of the alternateGatekeepers of the RCF message become the alternate home transport addresses of the alternate home GKs of the mobile entity.

If the foreignZone field is set to TRUE, it confirms that the mobile entity has been registered with as its foreign GK. The RASAddress field of the RRQ message becomes the mobile entity's care-of transport. Similarly, the gatekeeperIdentifier also confirms the indication as the mobile entity's care-of foreign gatekeeper GK in the foreign zone. The callSignalAddress field provides the care-of call signaling-transport address of the mobile entity. The transport addresses of the alternateGatekeepers become the alternate care-of transport addresses of the alternate foreign GKs of the mobile entity.

If the visitedZone field is set to TRUE, it confirms that the visited GK has been informed by this GK (home or foreign), updating the location information about the mobile entity.

If the targetZone field is set to TRUE, it confirms that the target GK has been informed by this GK (home or foreign) updating the location information about the mobile entity.

The RRJ message is extended as follows:

exceededTimeToLive is an optional field which indicates whether the requested time-to-live parameter by the mobile entity exceeds the advertised time-to-live parameter of the mobile GK.

homeGKUnreachable is an optional field that indicates whether the home GK is unreachable. The foreign GK with which the mobile entity is trying to register may deny registration if it cannot reach the mobile's home GK.

visitedGKUnreachable is an optional field that indicates whether the visited GK is unreachable. The foreign or home GK with which the mobile entity is trying to register may deny registration if it cannot reach the mobile's previously visited GK.

targetGKUnreachable is an optional field that indicates whether a target Gk is unreachable. The foreign or home GK with which a mobile entity is trying to register may deny registration if it cannot reach the mobile's target GK.

Thus, selection of any or all of the message fields of the unreachability information may be decided by the particular implementation for sending the RRJ message.

The URQ (Unregistration ReQuest) message is extended as follows:

homeZone is set to TRUE to indicate that the association between the home GK and the mobile entity is to be broken.

foreignZone is set to TRUE to indicate that the association between the foreign GK and the mobile entity is to be broken.

As above, the homeZone and the foreignZone are not mutually exclusive for the mobile entity. If the homeZone field is set to TRUE, the foreignZone field cannot be set to TRUE and vice versa.

If both the homeZone and the foreignZone fields are set to FALSE or none of these extended message fields are used, it is the fixed H.323 entity's unregistration that has been requested with the GK.

If the homeZone field is set to TRUE, the gatekeeperIdentifier field of the URQ message provides the indication as the mobile entity's alternate home gatekeeper list in its home zone received in the RCF message from the gatekeeper when it registered or in a previous URJ message. This is used as a backup if the original GK did not respond or rejected the request. The callSignalAddress field of the URQ message indicates that the home transport address of the array of call signaling messages of the mobile entity.

If the foreignZone field is set to TRUE, the gatekeeperIdentifier field of the URQ provides the indication as the mobile entity's (care-of) foreign gatekeeper GK list in its foreign zone received in the RCF message from the gatekeeper when it registered or in a previous URJ message. The callSignalAddress field indicates the care-of transport address of the array of call signaling messages of the mobile entity.

The UCF (UnConFirmed) message also is extended as follows:

homeZone is set to TRUE to confirm that the association between the home GK and the mobile entity has been broken in the mobile entity's home zone.

foreignZone is set to TRUE to confirm that the association between the foreign GK and the mobile entity has been broken in the mobile entity's foreign zone.

As above, the homeZone and the foreignZone fields are not mutually exclusive for the mobile entity. If the homeZone field is set to TRUE, the foreignZone field cannot be set to TRUE and vice versa.

If both the homeZone and the foreignZone fields are set to FALSE or none of these extended message fields are used, it is the fixed H.323 entity's unregistration request that has been confirmed with the GK.

The URJ (Unregistration Request Rejection) is extended as follows:

homeZone is set to TRUE to indicate that the unregistration request has been rejected in the mobile's home zone.

foreignZone is set to TRUE to indicate that the unregistration request has been rejected in the mobile's foreign zone.

As above, the homeZone and the foreignZone fields are not mutually exclusive for the mobile entity. If the homeZone field is set to TRUE, the foreignZone field cannot be set to TRUE and vice versa. If both the homeZone field and the foreignZone field are set to FALSE or none of these extended message fields are used, it is the fixed H.323 entity's unregistration request that has been rejected with the GK.

As the mobile entity moves from one point of attachment to another, it is necessary to update the new point of attachment. The messages are binding update request (BuRQ), binding update confirm (BuCF) and binding update reject (BuRJ). These messages are sent between the GKs to update its location information as it changes its point of attachment. Upon receiving the RRQ messages from the mobile entity, a mobile GK sends the mobility binding update messages to the home and/or visited (foreign) GK as appropriate. The BuRQ requests that a gatekeeper update the location information related to the mobile entity. The gatekeeper responds with a BuCF confirming the update, or rejects the request with BuRJ.

The BuRQ message typically includes the following fields:

requestSeqNum is a field having a monotomically increasing number unique to the sender. It is returned by the receiver in any messages associated with the specific message sent.

nonStandardData is a field that carries information that s not defined, e.g., proprietary information.

endpointIdentifier is a field having an endpoint identifier that was assigned to the terminal by the RCF.

replyAddress is the field showing the transport address to which to send the BuCF/BuRQ.

sourceInfo is the field that indicates the sender of the BuRQ. The gatekeeper may use this information to decide how to respond to the BURQ.

callSignalAddress is the field showing the new call signaling transport address for the endpoint that needs to be updated because of the change of point of attachment. If multiple transports are supported, they must be updated all at once.

RASAddress is the field showing the new transport address for the endpoint that needs to be updated because of the change in the point of attachment.

homeZone is set to TRUE to indicate that the sender of the BuRQ is requesting the updating of the mobile entity's point of attachment in its home zone.

foreignZone is set to TRUE to indicate that the sender of the BuRQ is requesting the update of the mobile entity's point of attachment while it is currently visiting a foreign zone.

homeGK is an optional field that is used to indicate that the gatekeeper acts as its home gatekeeper when the mobile entity enters into this foreign zone. However, if the foreignZone field is set to TRUE, the information related to the homeGK field is supplied. The structure of the home GK contains:

homeRASAddress—the transport address used for RAS signaling. This address is used as the home transport address for the mobile entity in its home zone.

homeCallSignalAddress—is the transport address used for call signaling. This address is used as the home call signaling transport address for the mobile entity in its home zone.

homeGKIdentifier—is an optional field that may be used to identify the home gatekeeper. If its is supplied, it is included for the RAS messages sent to the home gatekeeper.

foreignGK—is an optional message element that indicates the foreign gatekeeper that the mobile entity is currently visiting. However, if the foreignZone field is set to TRUE, the information related to the foreignGK field is supplied. The structure of the visited GK contains:

foreignRASAddress—the care-of transport address used by the mobile entity in the presently visited (foreign) zone for RAS signaling.

foreignCallSignalingAddress—the transport address used by the mobile entity for call signaling in its currently visited (foreign) zone. This address is used as the visited call signaling transport address for the mobile entity.

foreignGKIdentifier—is the optional field used to identify the presently visited (foreign) gatekeeper. If it is supplied, it is included in future RAS messages sent to the visited gatekeeper.

visitedZone—is set to TRUE to indicate that the visiting GK has sent the message for updating the location information of the registering mobile entity to its previously visited (foreign) GK.

visitedGK—is an optional message element to indicate the gatekeeper that had been previously visited by the mobile entity before moving to its present location. However, if the visitedZone field is set to TRUE, the information related to the visitedGK field is supplied. The structure of the visited GK contains:

visitedRASAddress—the care-of transport address used by the mobile entity in the previously visited zone for RAS signaling.

visitedCallSignalAddress—the transport address used for call signaling. This address is used as the visited call signaling transport address for the mobile entity.

visited GKIdentifier is an optional field that is used to identify the visited gatekeeper. If it is supplied, it is included in further RAS messages sent to the visited gatekeeper.

targetZone is set to TRUE to indicate that he visiting GK has sent the message for updating the location information of the registering mobile entity to its targeted (foreign) GK.

TargetGK is an optional message element to indicate the gatekeeper that the mobile entity intends to visit after moving from its present location. However, if the targetZone field is set to TRUE, the information related to the targetGK field is supplied. The structure of the targeted GK contains:

targetRASAddress—an optional field that has the care-of transport address used by the mobile entity in the target zone RAS signaling.

targetCallSignalAddress—an optional field that has the transport address to be used for call signaling by the mobile entity in the target zone.

targetGKIdentifier—an optional field that is used to identify the target gatekeeper that the mobile entity intends to visit. If it is supplied, it is included in future RAS messages intended for the target gatekeeper.

terminalType is an optional field used for International Mobile Equipment Identity (IMEI), International Mobile Subscriber Identity(IMSI) and Temporary Mobile Subscriber Identity (TMSI) alias addresses.

advertisedTimeToLive is a field that indicates the duration of the validity of the registration with the currently visiting foreign GK, typically in seconds. After this time, the gatekeeper may consider the registration stale/no longer valid. The duration is set not to exceed the duration of the MGA or GCF messages.

The token field contains data which may be required to allow the operation. The data is inserted into the message if available.

The crytotoken field contains encrypted tokens.

interityCheckValue is a field used to provide improved message integrity/message authentication of the RAS messages. The cryptographically based integrity check value is computed by the sender applying a negotiated integrity algorithm and the secret key upon the entire message. Prior to the integrityCheckValue computation, this field is ignored and is empty. After computation, the sender puts the computed integrity check value in the integrity check value in the integrityCheckValue field and transmits the message.

The BuCF message typically includes the following fields:

requestSeqNum—a field having a monotomically increasing number unique to the sender. It is returned by the receiver in any messages associated with the specific message sent.

nonStandardData—a field that carries information not defined, e.g., proprietary data.

endpointIdentifier—a field having an endpoint identifier that was assigned to the terminal by the RCF.

TimeToLive—an optional field that provides the duration, typically in seconds, of the validity of the registration with the currently visiting foreign GK. This duration is authorized by the mobile entity's home GK. After this time, the visiting foreign gatekeeper may consider the registration stale/no longer valid. However, this duration is set not to exceed the duration of the advertisedTimeToLive field provided in the BuRQ.

homeZone—is set to TRUE to indicate that a mobile entity's location information has been updated by its home GK in its home zone.

visitedZone—is set to TRUE to indicate that a mobile entity's location information has been updated by a foreign GK that has been visited previously by the mobile entity.

The cryptotokens field is for cryptotokens, i.e., encrypted tokens.

integrityCheckValue—is a field that provides message integrity/message authentication of the RAS messages. The cryptographically based integrity check value is computed by the sender applying a negotiated integrity algorithm and the secretkey upon the entire message. Prior to integrityCheckValue computation, this field is ignored and is empty. After computation, the sender puts the computed integrity check value in the integrityCheckValue field and transmits the message.

The BuRJ message includes the fields:

requestSeqNum—a field for a monotonically increasing number unique to the sender.

nonStandardData—a field that carries information not defined, e.g., proprietary data.

endpointIdentifier—a field having the endpoint identifier that was assigned to the terminal by the RCF.

rejectReason—a field showing the reason that the binding update related to the location of the mobile was denied. The structure of the rejectReason is:

homeGKUnreachable—is an optional field that indicates whether the mobility binding for the location update of the mobile with its home GK was denied because the home GK could not be reached.

visitedGKUnreachable—is an optional field that indicates whether the visited foreign GK to which the mobility binding update message is to be sent cannot be reached.

targetGKUnreachable—is an optional field that indicates whether the target foreign GK to which the mobility binding update messages to be sent cannot be reached.

notRegistered—is a field used to indicate that the mobile entity is not registered.

invalidPermission—is a field used to indicate that exclusion is due to administrative or other related reasons.

undefinedReason—is a field used to indicate that the reason for denial is not defined.

securityDenial—is a field used to indicate that denial is due to a security reason.

The tokens field may be used to hold data that may be required to allow an operation. The data, if available, is inserted into the message.

The cryptotoken field is used for cryptotokens, i.e., encrypted tokens.

integrityCheckValue is a field that provides improved message integrity/message authentication of the RAS messages. The cryptographically based integrity check value is computed by the sender applying a negotiated integrity algorithm and the secret key upon the entire message.

As the mobile entity moves from one point of attachment to another, it is necessary to update the new point of attachment. The new mobility unbinding messages are unbinding request (UbRQ), unbinding confirm (UbCF) and unbinding reject (UbRJ). These messages are sent between the GKs to cancel the old location information about the mobile entity.

Upon receiving the unbinding request message (UbRQ), a mobile GK cancels the location about the mobile entity. The UbRQ message typically includes the following fields:

requestSeqNum is a field having a monotomically increasing number unique to the sender. It is returned by the receiver in any messages associated with the specific message sent.

nonStandardData is a field that carries information that s not defined, e.g., proprietary information.

endpointIdentifier is a field having an endpoint identifier that was assigned to the terminal by the RCF.

gatekeeperIdentifier is a field having a string to identify the gatekeeper that is required to cancel the location information of the mobile entity that had been in its zone.

homeGK is a field that indicates that the gatekeeper that acts as the home gatekeeper of the mobile entity whose location information needs to be canceled by the mobile GK. However, the structure of the home GK will typically contain the following to identify the mobile entity uniquely:

homeRASAddress—the transport address used for RAS signaling. This is the address that was used as the home transport address by the mobile entity while it had been in this mobile entity GK's zone.

HomeGKIdentifier—is an optionally included field that identifies the home gatekeeper of the mobile entity. If it is supplied, the identification of the home GK of the mobile entity is provided.

The tokens field may be used to hold data that may be required to allow an operation. The data, if available, is inserted into the message.

The cryptotoken field is used for cryptotokens, i.e., encrypted tokens.

integrityCheckValue—is a field that provides message integrity/message authentication of the RAS messages. The cryptographically based interity check value is computed by the sender applying a negotiated integrity algorithm and the secret key upon the entire message. Prior to integrityCheckValue computation, this field is ignored and is empty. After computation, the sender puts the computed integrity check value in the integrityCheckValue field and transmits the message.

The unbinding confirm message (UbCF) confirms that the mobile GK has cancelled the location information about the mobile entity. The UbCF message typically includes the following fields:

requestSeqNum is a field having a monotonically increasing number unique to the sender. It is returned by the receiver in any messages associated with the specific message sent.

nonStandardData is a field that carries information that s not defined, e.g., proprietary information.

endpointIdentifier is a field having an endpoint identifier that was assigned to the terminal by the RCF.

gatekeeperIdentifier is a field having a string to identify the gatekeeper that is required to cancel the location information of the mobile entity that had been in its zone.

The tokens field may be used to hold data that may be required to allow an operation. The data, if available, is inserted into the message.

The cryptotoken field is used for cryptotokens, i.e., encrypted tokens.

integrityCheckValue—is a field that provides message integrity/message authentication of the RAS messages. The cryptographically based integrity check value is computed by the sender applying a negotiated integrity algorithm and the secret key upon the entire message. Prior to integrityCheckValue computation, this field is ignored and is empty. After computation, the sender puts the computed integrity check value in the integrityCheckValue field and transmits the message.

The Unbinding Reject (UbRJ) message typically includes the following fields:

requestSeqNum—a field for a monotonically increasing number unique to the sender.

nonStandardData—a field that carries information not defined, e.g., proprietary data.

endpointIdentifier—a field having the endpoint identifier that was assigned to the terminal by the RCF.

rejectReason—a field showing the reason that the binding update related to the location of the mobile was denied. The structure of the rejectReason is:

> homeGKInconsistent—is an optional field that indicates whether the information related to the home GK of the mobile entity whose location information needs to be cancelled is inconsistent.
>
> GKUnreachable—is an optional field that indicates whether the GK to which the mobility binding update message is to be sent cannot be reached.
>
> notRegistered—is a field used to indicate that the mobile entity is not registered.
>
> invalidPermission—is a field used to indicate that exclusion is due to administrative or other related reasons.
>
> undefinedReason—is a field used to indicate that the reason for denial is not defined.
>
> securityDenial—is a field used to indicate that denial is due to a security reason.

The tokens field may be used to hold data that may be required to allow an operation. The data, if available, is inserted into the message.

The cryptotoken field is used for cryptotokens, i.e., encrypted tokens.

integrityCheckValue is a field that provides improved message integrity/message authentication of the RAS messages. The cryptographically based integrity check value is computed by the sender applying a negotiated integrity algorithm and the secret key upon the entire message.

With regard to other H.323/H.225 signaling messages, the LRQ does not need extensions. The LCF is generally extended as follows:

> homeZone—is an optional field and can be set to TRUE or FALSE as indicated in the following table.
>
> VisitingZone—is an optional field and can be set to TRUE or FALSE as indicated in the following table.

| Home Zone | Visiting (Foreign) Zone | Remarks |
|---|---|---|
| TRUE | FALSE | The mobile entity is providing information about its home zone and may be residing in its home zone or in a foreign zone. If it remains in a foreign zone and does not wish to disclose this information, calls will be directed to its home zone/GK. The callSignalAddress, RASAddress and alternateEndpoints fields become the address in the mobile entity's home subnetwork/zone/GK. However, if the mobile entity is in a different subnetwork of the home zone other than its home subnetwork, these addresses will be the care-of subnetwork address of its home zone/GK. A mobile entity may also use the home subnetwork address although it is in a care-of subnetwork. In this situation, all calls of the mobile entity will be delivered to the home subnetwork address, and it will then be delivered to the mobile entity's care-of subnetwork address. The home GK will take care of this. However, it may be a policy decision by the mobile entity how the call will be delivered by its home GK because a home GK will have all information available about its mobile entities it serves. |
| FALSE | TRUE | The mobile entity is in its currently visited zone and does not want to provide any information about its home zone. The callSignalAddress, RASaddress, and alternateEndpoints field become the address in the mobile entity's presently visiting subnetwork/zone/GK. |
| TRUE | TRUE | Not allowed. |
| FALSE | FALSE | Not allowed. |

If the entity is a fixed entity, neither the homeZone or the foreignZone is used.

The LRJ message field is typically extended as follows:
The rejectReason field includes:
invalidHomeVisitingZoneSet—if both homeZone and visitingZone are set either to FALSE or to TRUE.

H.323 mobility management enables multimedia communications over the packet networks for both connectionless and connection-oriented networks. The mobility management includes the following:

Discovery

Registration

Location Updates

Call Establishment

Roaming, and

Handover (Handoff).

In H.323, call establishment and termination are performed before and after a call. The extensions in H.323 will provide mobility services with the ability to roam and implement handover. However, the call establishment roaming and handover will be described in terms of the terminal-, user- and service-mobility.

A mobile entity may discover a mobile GK through the MGA message or sending the GRQ messages as it moves from one point of attachment to another. Once a GK is determined, an endpoint is registered to the GK for admission to system access through a RAS channel. However, in H.323, call establishment and termination are performed before and after a call, respectively. The extensions in H.323 in the present invention provide mobility services with the ability to roam and implement handover.

A mobile entity may discover a mobile GK through the MGA message or by sending the GRQ messages as it moves from one point of attachment to another. Once a GK is determined, an endpoint is registered to the GK for admission to system access through a RAS channel. When a connection has been established for an H.323 mobile entity and the H.323 entity roams from one place to another, the point of attachment (network (e.g., IP address) or H.323 (a zone or domain boundary)) may change. Mobile GKs make themselves known by sending MGA advertisement messages. The connections may be broken unless the connection is handed off If the registration lifetime expires, the entity is also considered to be logically disconnected. However, the discovery or detection of a new point of attachment can be done in one of the following ways:

Advertisement Lifetime: This method of detection is based on the lifetime field within the main body of the MGA message because the entity is not considered connected logically to the network if the lifetime for registration expires. A mobile entity records the lifetime received in any mobility gatekeeper advertisement (MGA) messages, until that lifetime expires. If the mobile entity has not maintained contact with its mobile GK, the mobile entity must attempt to solicit a new mobile GK.

Address Prefixes of the zone and the Network Point of Attachment: This method uses the transport address prefixes (e.g., IP subnetwork addresses or IP addresses) provided in the zoneRange field of the MGA message. A mobile entity can detect whether it is within a given zone or not by examining the address prefixes of the newly received MGA message. However, a mobile entity has to know whether it is in the same or different network point of attachment once it detects that it is in the same zone. To detect whether a mobile entity is in a given network point of attachment (e.g., IP address), or not, it has to know the network address in which it has moved currently. It is a matter of implementation in the network layer. For example, an entity in the network layer (e.g., hone/foreign agent of mobile IP) may advertise the network address prefix (e.g., IP address). If an H.323 mobile entity is in a given network of a given zone, it is expected that it will receive the advertisement message of the network by it network layer entity. In this way, a mobile entity can determine whether or not a newly received advertised network address was received on the same subnet as the mobile entity's home or current care-of transport address. If the addresses differ, the mobile entity can assume that it has moved. It can be clearly seen how a mobile entity can detect whether it has moved from a given zone to another. If it is in a given zone, it can also detect whether it has moved from its current network point of attachment or not.

After discovering that the mobile entity is on a foreign zone, it can obtain a new care-of transport address for this new subnetwork of a new zone from the prefix advertised by the new router and perform location update procedures. In mobile H.323 (like similar procedures in mobile IP), the mobile entity's registration messages trigger a mobility binding at the home agent, associating the mobile entity's home transport address with its new care-of transport address for the specified binding lifetime.

The same registration procedure as described in the H.323 standard, which is known to those skilled in the art, is used once a GK is discovered, except that the extended RRQ/RCF/RRJ messages described above are used. In H.323, registration is the process by which an endpoint joins a zone and informs the Gatekeeper of its Transport Address and alias addresses. As part of their configuration process, in the present invention, all endpoints register with the Gatekeeper identified through the discovery process. Registration occurs before any calls are attempted and may occur periodically as necessary (for example, at endpoint power-up). A Gateway or MCU may register a single Transport Address or multiple Transport Addresses. The use of multiple Transport Addresses may simplify the routing of calls to specific ports.

An endpoint sends a Registration Request (RRQ) to a Gatekeeper by sending it to the Gatekeeper's RAS Channel Transport Address. The endpoint has the Network Address of the Gatekeeper from the Gatekeeper discovery process and uses the well-known RAS Channel TSAP Identifier. The Gatekeeper shall respond with either a Registration Confirmation (RCF) or a Registration Reject (RRJ). An endpoint only registers with a single Gatekeeper.

The RRQ may be repeated periodically (i.e., at terminal power-up), so the Gatekeeper is able to handle multiple requests from the same endpoint. If a Gatekeeper receives an RRQ having the same alias address and the same Transport Address as an active registration, it responds with a RCF. If the Gatekeeper receives an RRQ having the same alias address as an active registration and a different Transport Address, it may confirm the request if it complies with the Gatekeeper's security policy. Otherwise, it rejects the registration indicating a duplicate registration. If the Gatekeeper receives an RRQ having the same Transport Address as an active registration and a different alias address, it should replace the translation table entries. The Gatekeeper may have a method to authenticate these changes.

The Gatekeeper ensures that each alias address translates uniquely to a single Transport Address. However, an endpoint may indicate a backup, redundant or alternate Transport Address using the alternateEndpoint structure within the RAS messages. This allows an endpoint to have a secondary network interface or a secondary H.323 endpoint as a backup. Ambiguous registrations are rejected by the Gatekeeper. The Gatekeeper may reject the registration for other reasons, such as changes in discovery or security issues.

If the endpoint does not include an alias address in the RRQ message, the Gatekeeper may assign one. The Gatekeeper shall return the assigned alias address to the terminal in the RCF message.

Each mobile entity has a finite registration life and requires a registration during roaming.

A mobile entity's location is updated using the registration (RRQ/RCF/RRJ) and mobility binding(BuRQ/BuCF/BuRJ) messages. The updating of the mobile's location as it moves from one subnet to another or from one zone to another, is known as the mobility management.

In one embodiment, a computer-readable medium 702 having computer-executable steps may be utilized for implementing, by a Mobile Terminal Node/Entity, an H.323-based mobility protocol for real-time mobile multimedia communications and conferencing over packet-based networks wherein a plurality of H.323 mobility gatekeepers provide notification of H.323 mobility services availability by periodically broadcasting/multicasting/unicasting a Mobility Gatekeeper Advertisement with a multicast address. As shown in FIG. 7, the computer-executable steps typically include: (1) where the Mobile Terminal/Node/Entity becomes mobile and initiates an H.323 communication that includes at least one of: audio, video and data, by the Mobile Terminal/Node/Entity, with respect to notification 704, one of providing, by at least one of a plurality of available H.323 Home/Foreign Mobility Gatekeepers, notification of H.323 mobility services availability by periodically broadcasting/multicasting/unicasting a Mobility Gatekeeper Advertisement with a multicast address; and where the Mobile Terminal/Node/Entity lacks notification of H.323 mobility services availability, sending, by the Mobile Terminal/Node/Entity, a message to the Home Gatekeeper/Home Location Database, which notifies H.323 Home/Foreign Mobility Gatekeepers in a preselected area local to the Mobile Terminal/Node/Entity that the Mobile Terminal/Node/Entity needs H.323 mobility services and notifying, by the H.323 Home/Foreign Mobility Gatekeepers, the Mobile Terminal/Node/Entity of available H.323 Home/Foreign Mobility Gatekeepers; (2) registering 706, by the Mobile Terminal/Node/Entity, with a H.323 Home/Foreign Mobility Gatekeeper of the available H.323 Home/Foreign Mobility Gatekeepers that support H.323 mobility services in a Location Area/Cell/Zone of the Mobile Terminal/Node/Entity; and (3) providing 708, for the Mobile Terminal/Node/Entity by the H.323 Home/Foreign Mobility Gatekeeper with which the Mobile Terminal/Node/Entity is registered, support for the H.323 communication that includes at least one of: audio, video and data.

Registering with the H.323 Home/Foreign Mobility Gatekeeper may include sending registration information for the Mobile Terminal/Node/Entity using a Base Station to Base Station Controller to Mobile Switching Center to H.323 Home/Foreign Gatekeeper system. Alternatively, registering with the at least one H.323 Home/Foreign Mobility Gatekeeper may include sending registration information for the Mobile Terminal/Node/Entity using a wireless/wire-line Local Area Network to Router/Switch to H.323 Home/Foreign Gatekeeper system.

In one embodiment, registering may include the steps of: broadcasting/multicasting/unicasting/sending, by the Home Gatekeeper, a Mobility Gatekeeper Advertisement (MGA) message periodically; broadcasting/multicasting/sending a registration request message (RRQ) to the Home Gatekeeper by the Mobile Terminal/Node/Entity; and sending, by the Home Gatekeeper, a registration confirmation/registration rejection (RCF/RRJ) to the Mobile Terminal/Node/Entity.

In another embodiment, registering may include the steps of upon determining, by the Mobile Terminal/Node/Entity, that a network point of attachment has changed/a foreign zone has been entered, broadcasting/multicasting/unicasting/sending, by the Mobile Terminal/Node/Entity, a registration request message (RRQ) to a Foreign/Visiting Gatekeeper; broadcasting/multicasting/unicasting/sending, by the Foreign/Visiting Gatekeeper, a binding update message (BuRQ) to the Home Gatekeeper; broadcasting/multicasting/unicasting/sending, by the Home Gatekeeper, a binding update confirmation/rejection (BuCF/BuRJ) to the Foreign/Visiting Gatekeeper; and broadcasting/multicasting/unicasting/sending, by the Foreign/Visiting Gatekeeper, the binding update confirmation/rejection to the Mobile Terminal/Node/Entity.

Where the Mobile Terminal/Node/Entity has already visited another foreign zone regulated by a Visited Gatekeeper, registering may include:
broadcasting/multicasting/unicasting/sending, by the Home Gatekeeper, a mobility unbinding message (UbRQ) to the Visited Gatekeeper; and
broadcasting/multicasting/unicasting/sending, by the Visited Gatekeeper, a mobility unbinding confirmation/rejection (UbCF/UbRJ) to the Home Gatekeeper.

Where the Mobile Terminal/Node/Entity has already visited another foreign zone regulated by a Visited Gatekeeper, registering may include:
broadcasting/multicasting/unicasting/sending, by the Mobile Terminal/Node/Entity, a registration request message (RRQ) to a Foreign/Visiting Gatekeeper;
broadcasting/multicasting/unicasting/sending, by the Foreign/Visiting Gatekeeper, a mobility unbinding update message (UbRQ) to the Visited Gatekeeper;
broadcasting/multicasting/unicasting/sending, by the Visited Gatekeeper, a mobility unbinding confirmation/rejection (UbCF/UbRJ) to the Foreign/Visiting Gatekeeper;
broadcasting/multicasting/unicasting/sending, by the Foreign/Visiting Gatekeeper, a provisional registration confirmation to the Mobile Terminal/Node/Terminal and broadcasting/multicasting/unicasting/sending, by the Foreign/Visiting Gatekeeper, a binding update message (BuRQ) to the Home Gatekeeper; and broadcasting/multicasting/unicasting/sending, by the Home Gatekeeper, a binding update confirmation/rejection (BuCF/BuRJ) to the Foreign/Visiting Gatekeeper.

Where the Mobile Terminal/Node/Entity has already visited another foreign zone regulated by a Visited Gatekeeper, registering may include:
broadcasting/multicasting/unicasting/sending, by the Mobile Terminal/Node/Entity, a registration request message (RRQ) to a Foreign/Visiting Gatekeeper;
broadcasting/multicasting/unicasting/sending, by the Visited Gatekeeper, a mobility unbinding confirmation/rejection (UbCF/UbRJ) to the Foreign/Visiting Gatekeeper;
broadcasting/multicasting/unicasting/sending, by the Foreign/Visiting Gatekeeper, a provisional registration confirmation to the Mobile Terminal/Node/Terminal and broadcasting/multicasting/unicasting/sending, by the Foreign/Visiting Gatekeeper, a binding update message (BuRQ) to the Home Gatekeeper;
broadcasting/multicasting/unicasting/sending, by the Home Gatekeeper, a binding update confirmation/rejection (BuCF/BuRJ) to the Foreign/Visiting Gatekeeper;
broadcasting/multicasting/unicasting/sending, by the Home Gatekeeper, a mobility unbinding update message (UbRQ) to the Visited Gatekeeper; and
broadcasting/multicasting/unicasting/sending, by the Visited Gatekeeper, a mobility unbinding confirmation/rejection (UbCF/UbRJ) to the Home Gatekeeper.

In one embodiment, at least one Home/Foreign Gatekeeper utilizes a combined Home/Visitor Location Database. In another embodiment, a plurality of Home/Foreign Gatekeepers each utilize an individual Visitor Location Database and share a Home Location Database.

Where the Mobile Terminal/Node/Entity is originally located in a First Administrative Domain and is moving in a Second Administrative Domain, registering may sending/sending a registration request message (RRQ), by the Mobile Terminal/Node/Entity to the Foreign/Visiting Gatekeeper; broadcasting/multicasting/unicasting/sending, by the Foreign/Visiting Gatekeeper, a mobility unbinding (UbRQ) message to a Visited Gatekeeper; broadcasting/multicasting/unicasting/sending, by the Visited Gatekeeper, an unbinding confirmation/rejection (UbCF/UbRJ) to the Visiting/Foreign Gatekeeper; broadcasting/multicasting/unicasting/sending, by the Visiting Gatekeeper, a provisional registration message to the Mobile Terminal/Node/Entity; broadcasting/multicasting/unicasting/sending, by the Foreign/Visiting Gatekeeper, a mobility binding message (BuRQ) to a Border Element of the Second Administrative Domain, which forwards the message to a Border Element of the First Administrative Domain which then forwards the message to the Home Gatekeeper; broadcasting/multicasting/unicasting/sending, by the Home Gatekeeper, a mobility binding confirmation/rejection (BuCF/BuRJ) message to the Border Element of the First Administrative Domain, which forwards the message to the Border Element of the Second Administrative Domain, which forwards the message to the Visiting Gatekeeper.

Figure 8:
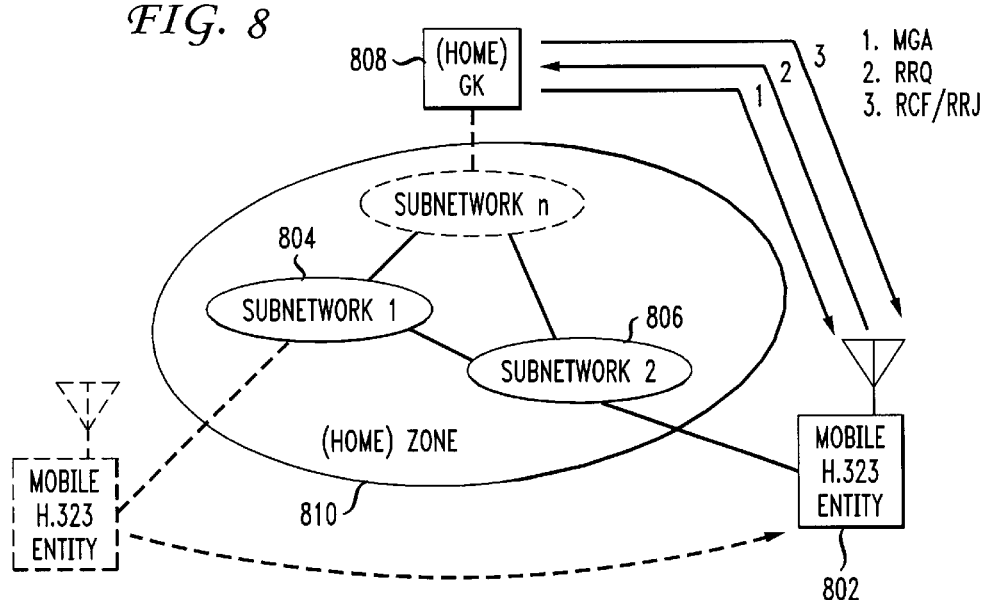
FIG. 8 is a block diagram showing one embodiment of an intra-zone mobility management system in accordance with the present invention.

As shown in FIG. 8, in one embodiment when a mobile H.323 entity performs intra-zone roaming, the location may be updated. Where the mobile H.323 entity 802 has moved from subnetwork 1 804 to subnetwork 2 806 within its Home Zone 810, it may detect its new network point of attachment in two ways, as described more fully above. The mobile H.323 entity acquires the new temporary care-of network address dynamically (e.g., DHCP in the case of an IP network). Although the mobile H.323 entity is still under the control of the same GK 808, the mobile H.323 entity's new network attachment needs to be updated with its home GK 808. The following steps may be taken to update the location of the mobile H.323 entity:

1: The MGA message advertised by the mobile (home) GK is received by the mobile entity. The mobile entity detects whether its network point of attachment has been changed (as described above).

2: The mobile entity then initiates the RRQ message with its present care-of network address for re-registration. A mobile entity may also detect the change in its subnetwork point of attachment without the help of the MGA message. If it has changed, it can also send the RRQ message to its home GK for re-registration. In the extreme situation, a mobile may also send the GRQ message to find its GK ad the usual GCF/GRJ messages will follow (not shown).

3: The usual RCF/RCF messages will follow.

In this way, the home GK may update the location information about the mobile entity. The mobility binding messages (BuRQ/BuCF/BuRJ) are typically not involved for this situation. In some instances, the mobile entity might have been communicating with an entity located within a foreign zone or the mobile has just returned from the foreign zone to its home zone. In those cases, the home GK needs to update those foreign GKs about the location of the mobile entity using the BuRQ/BuCF/BuRJ messages.

Figure 9:
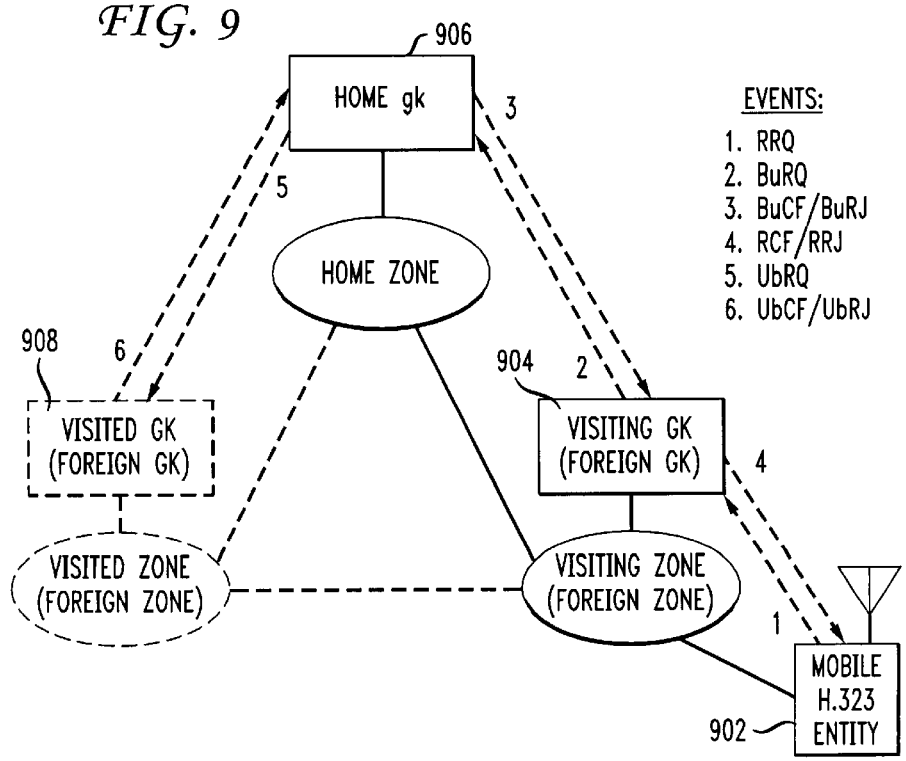
FIG. 9 is a block diagram showing one embodiment of an inter-zone mobility management system in accordance with the present invention.

As shown in FIG. 9, a mobile H.323 entity 902 may roam from zone to zone (inter-zone), and the system then updates the subscribed mobile H.323 entity's location. Upon crossing a zone boundary, the H.323 mobile entity may receive the MGA message broadcast/multicast/unicast by the foreign (visiting) GK 904. If the mobile H.323 entity receives the MGA message, it will send the RRQ message to the visiting GK 904. Alternatively, the mobile H.323 entity ma also send the GRQ message seeking a registration for the foreign GK if no MGA message is received, and the usual GCF/GRJ messages will be exchanged before sending the registration message (event 1). These steps are not shown in FIG. 9 for simplicity. The following events describe how the location update is done once the registration with the visiting GK is sought by the mobile H.323 entity:

Event 1: The RRQ message is sent by the mobile H.323 entity 902 to its visiting GK 904.

Event 2: The visiting GK 904 has no information about the entry of the mobile H.323 entity 902 because this new entity has moved in its serving zone recently. However, the visiting GK 904 needs to update the mobile H.323 entity's location to the home GK of the mobile H.323 entity 902. Receiving the RRQ message, a mobile/visiting GK 904 then knows where the mobility binding needs to be done. In this example, the visiting GK 904 sends the BuRQ message to the mobile H.323 entity's home GK 906. This message includes the identity of the mobile H.323 entity 902 as well as the identity of the visiting GK 904 that sent the message.

Event 3: Upon receiving the BuRQ message, the home GK 906 stores the mobile entity's new location at the visiting GK 904 and examines the mobile entity's information (e.g., user profiles, calling origination and termination services, authentication parameters, accounting information, subscriber services, etc.). The home GK 906 sends the confirmation (BuCF) or rejection (BuRJ) message with respect to the mobile H.323 entity's new location to the visiting GK 904.

Event 4: Accordingly, upon receiving this information (BuCF or BuRJ), the visiting GK 904 sends registration confirmation (RCF) or rejection (RRJ) message to the mobile H.323 entity 902.

Event 5: The mobile H.323 entity 902 may have already visited another foreign zone (visited zone) before moving to the visiting zone. The BuRQ message also indicates whether or not the updating message has been sent to the visited GK 908 by the visiting GK 904, and the home GK 906 sends the mobility unbinding message UbRQ for updating the location to the visited GK 908 related to the H.323 mobile entity's information in its database. In some situations, the mobility binding message (BuRQ) may also be sent for updating without deleting the previous information. It is a matter of implementation and will not be described here.

Event 6: In turn, the visited GK 908 sends the mobility unbinding confirmation (UbCF) or rejection (UbRJ) message to the home GK 906. The mobility binding confirmation (BuCF) or rejection (BuRJ) message is sent if the BuRQ message is sent in event 5.

The mobile subscriber entity (mobile H.323 entity) is known only to one foreign/visited GK at a time. In this example, when the mobile subscriber entity has roamed to another zone, the home GK 906 has had to be updated.

The home GK 906 is the master of the mobile H.323 entity's information base (may act as the master database of the motile entities) and therefore, coordinates changes to the visiting- and visited-GKs as the mobile subscriber entity roams through the zones. If needed, the information related to the targeted Gk (not shown in this example) may also be coordinated by the home GK.

As described above, as the mobile entities move from one point of attachment to the next between zones, location updates using the mobility binding messages is smooth. For example, a home GK may be too far away from the mobile H.323 entity's visiting- and visited-zone to respond in time. If the responses for the updates require a GK to wait for a hundred milliseconds, for example, the system's response time will increase significantly. In such cases, a smooth location update may be implemented by cooperation between the visiting- and visited-GK without the involvement of the home GK where the mobile H.323 entity authorizes the visiting GK to perform smooth location update handoffs before the new registration is completed with its home GK.

Figure 10:
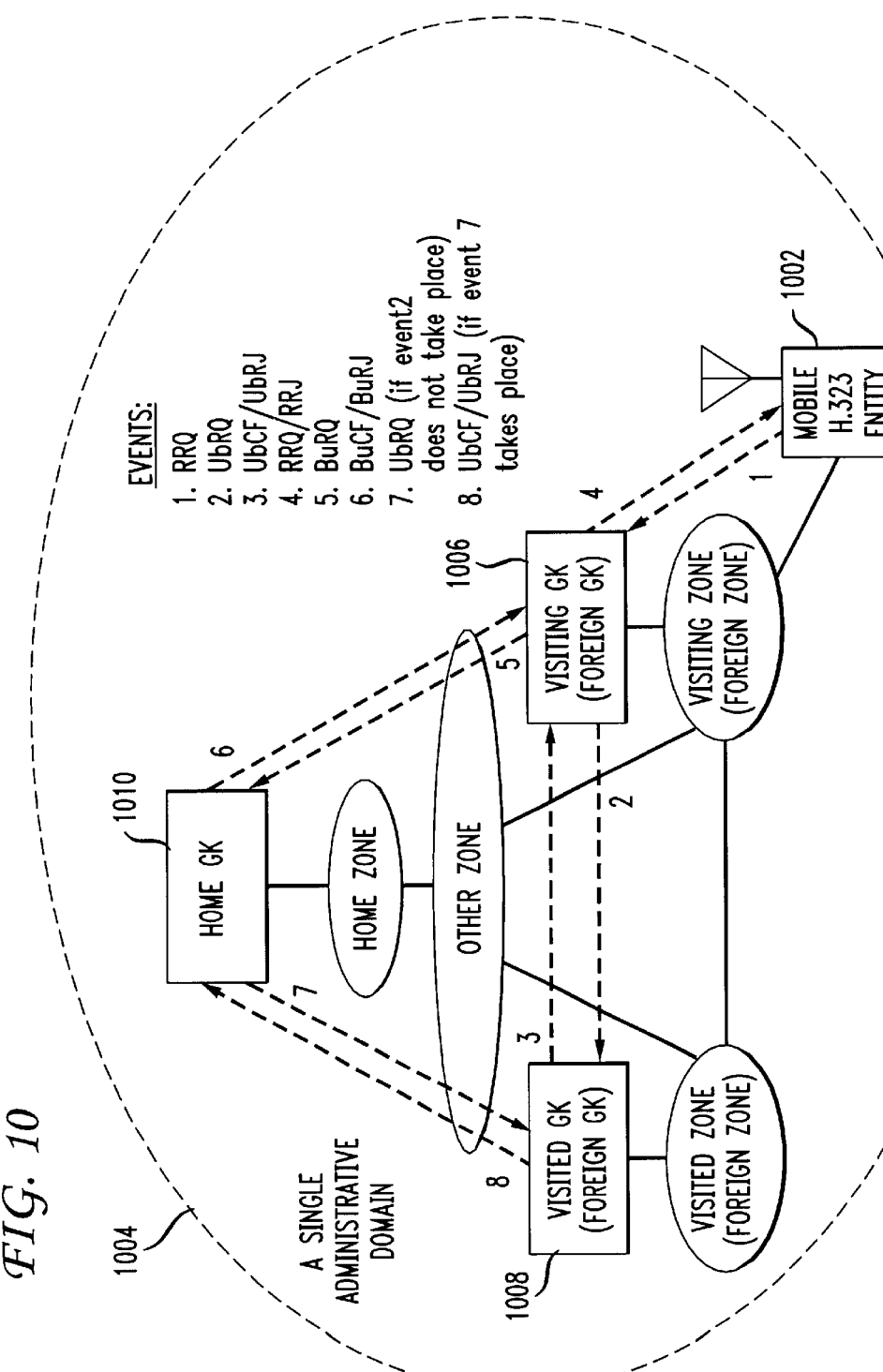
FIG. 10 is a block diagram showing one embodiment of location updating during registration for inter-zone communications in accordance with the present invention.

As shown in FIG. 10, smooth location updates are obtained during registration. A domain may consist of multiple zones. AN H.323 mobile entity 1002 may move between zones of a given administrative domain. FIG. 10 depicts smooth location updates using the mobility binding messages in a single administrative domain 1004. The MGA (or (GRQ/GCF/GRJ) messages that may be required before sending the RRQ messages is now shown here for simplicity. The sequence of events shown in FIG. 10 is as follows:

Event 1: The mobile H.323 entity 1002 sends the RRQ message to the visiting GK 1006 authorizing it to make smooth location updates through communicating with the previously visited GK 1008 before performing the location update with its home GK 1010.

Event 2: The visiting GK 1006 sends the mobility unbinding (UbRQ) message to the designated visited GK 1008 of the mobile H.323 entity 1002. This message includes the identity of the mobile H.323 entity 1002 as well as the identity of the visiting GK 1006 that sent the message.

Event 3: The previously visited GK 1008 of the mobile H.323 entity 1002 confirms or rejects the mobility unbinding update using the UbCF or UbRJ message.

Event 4: Upon receiving this information, the visiting GK 1006 confirms the mobility binding to the mobile H.323 entity 1002 so that a smooth location update takes place before the location update is completed with the home GK 1010. However, it is a provisional registration of the visiting mobile H.323 entity 1002 because the mobile H.323 entity's home GK 1010 also needs to confirm the binding.

Event 5: The visiting GK 1006 also sends the mobility binding update (BuRQ) message to the mobile H.323 entity's home GK 1010. This message includes the identity of the mobile entity as well as the identity of the visiting GK 1006 that sent the message. Events 2 and 5 may take place simultaneously.

Event 6: Upon receiving the mobility updating message (BuRQ) message, as before, the home GK 1010 stores the mobile H.323 entity's new location at the visiting GK 1006 and examines the mobile entity's information (e.g., user profiles, calling origination and termination services, authentication parameters, accounting information, subscriber services, etc.). The home GK 1010 sends the mobility binding information (BuCF) or rejection (BuRJ) message to the visiting GK 1006. In the case of conflicting messages from the home GK 1010 and the visited GK 1008, the home GK 1010 prevails. If the home GK 1010 determines that the visiting GK 1006 has sent the location update information to the visited GK 1008, it will update the information related to the visited GK 1008 and the events 6 and 7 will not take place.

Event 7: If event 2 does not take place, the home GK 1010 will send the mobility unbinding (UbRQ) message to the visited GK 1008.

Event 8: Accordingly, the visited GK 1008 will send the mobility unbinding confirmation (UbCF) or rejection (UbRJ) message. This event (8) will not take place if event 7 does not take place.

Figure 11:
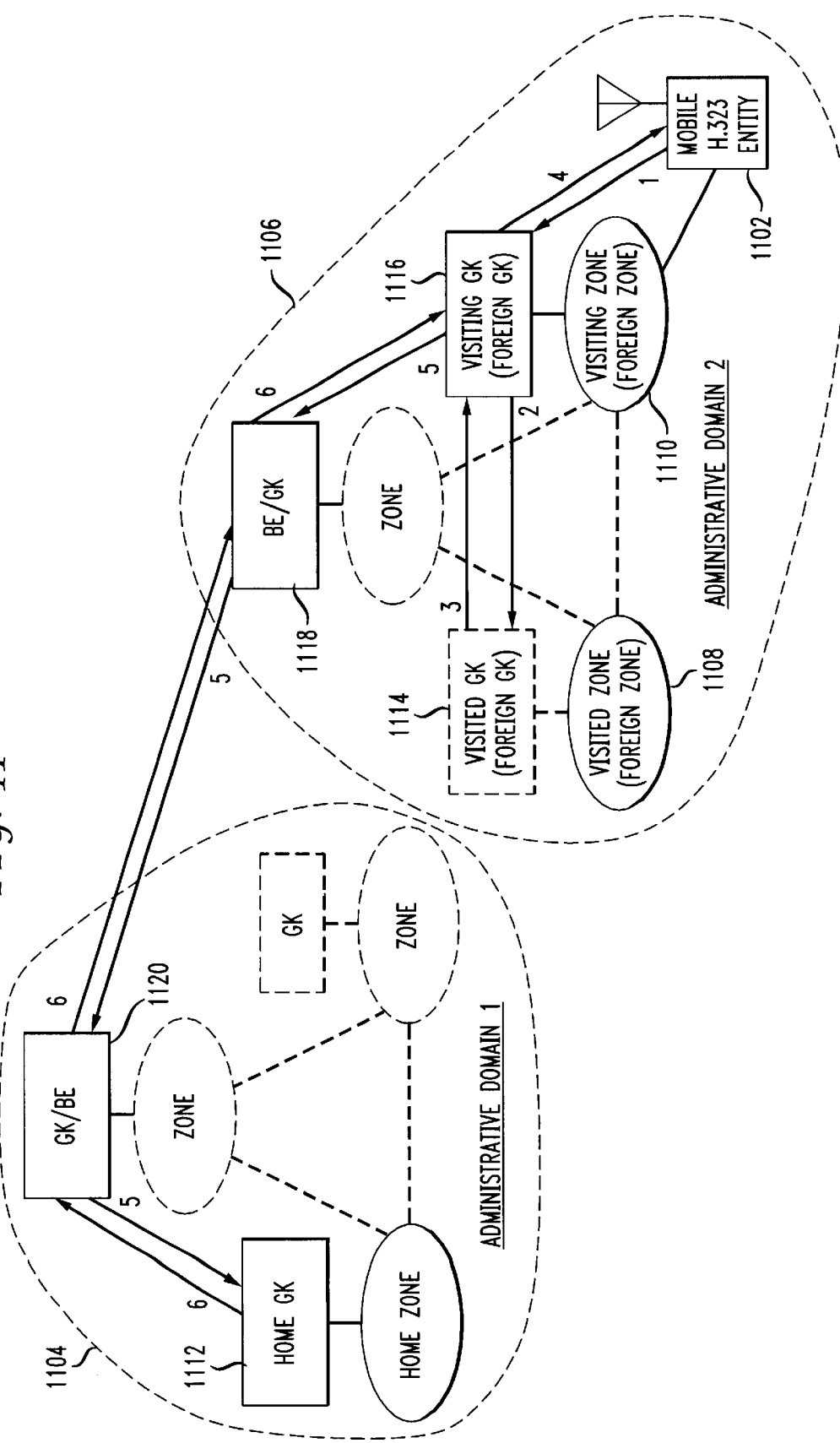
FIG. 11 is a block diagram showing one embodiment of location updating during registration for inter-domain communications in accordance with the present invention when a mobile entity is in an administrative domain other than its own.

A mobile H.323 entity may be moving in a separate administrative domain other than its own. FIG. 11 is a block diagram showing a high level implementation of events especially a related to location updates when a mobile H.323 entity 1102 moves from one administrative domain (Administrative Domain 1) 1104 to a next administrative domain (Administrative Domain 2) 1106 and smooth location updates are implemented during registration. The mobile H.323 entity 102 has moved from its visited zone 1108 to the visiting zone 1110 in Administrative Domain 21106 while its home zone remains in Administrative Domain 11104. For FIG. 11, the following events take place (event numbers are shown in FIG. 7):

Event 1: The mobile H.323 entity sends the RRQ message to the visiting GK 1110 authorizing it to make a smooth location update with the previously visited GK 1108 before performing the location update with its home GK 1112.

Event 2: The visiting GK 1116 sends the mobility unbinding (UbRQ) message to the designated visited GK 1114 of the mobile H.323 entity 1102. This message includes the identity of the mobile H.323 entity 1102 as well as the identity of the visiting GK 1116 that sent the message.

Event 3: The previously visited GK 1114 of the mobile H.323 entity 1002 confirms or rejects the mobility unbinding update using the UbCF or UbRJ message.

Event 4: Upon receiving this information, the visiting GK 1116 confirms the mobility binding to the mobile H.323 entity 1102 so that a smooth location update takes place before the location update is completed with the home GK 1112. However, it is a provisional registration of the visiting mobile H.323 entity 1102 because the mobile H.323 entity's home GK 1112 also needs to confirm the binding.

Event 5: The visiting GK 1116 sends a mobility binding message (BuRQ) to the Border Element (BE/GK) 1118 of the Administrative Domain 2 1106, which forwards the message to the Border Element (GK/BE) 1120 of the Administrative Domain 11104, which then forwards the message to the Home GK 1112.

Event 6: The Home GK 1112 sends the mobility binding information (BuCF) or rejection (BuRJ) message to the Border Element (GK/BE) 1120 of Administrative Domain 1 1104, which forwards the message to the Border Element (BE/GK) of Administrative Domain 2 1106, which forwards the message to the visiting GK 1116.

Figure 12:
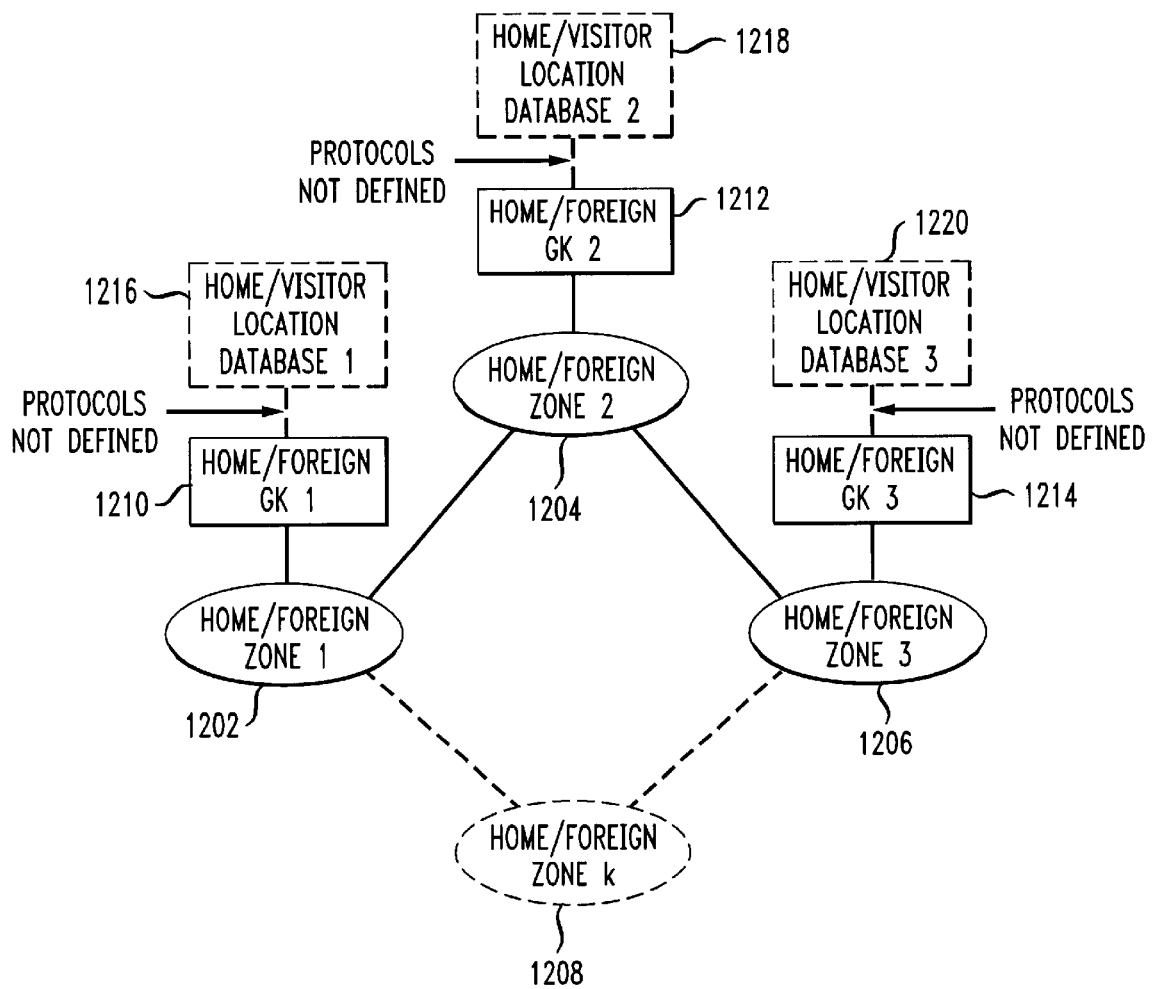
FIG. 12 is a block diagram showing one embodiment of an architecture for Zones, GateKeepers (GKs), and Home/Visitor Databases.

Each mobile H.323 entity needs to register with its home GK. The mobile H.323 entity designates its home GK to become the central controlling point to manage its mobility. Even if a mobile H.323 entity moves to a foreign zone, it needs to register with a foreign GK. As a result, a GK needs to manage the location information for both home and foreign visitors. Typically, a GK maintains databases (home/visitor location) for keeping the location information of both home and visitor location information. FIG. 12 is a block diagram showing one embodiment of a distributed architecture for home/foreign zones 1202, 1204, 1206, 1208; home/foreign GKs 1210, 1212, 1214; and home/visitor location databases 1216, 1218, 1220.

In H.323, the services between the GK and the location database are known as the backend services, and the protocol between these functional entities are known as the backend services protocol. Both the backend services and the protocol have not yet been standardized in H.323.

Figure 13:
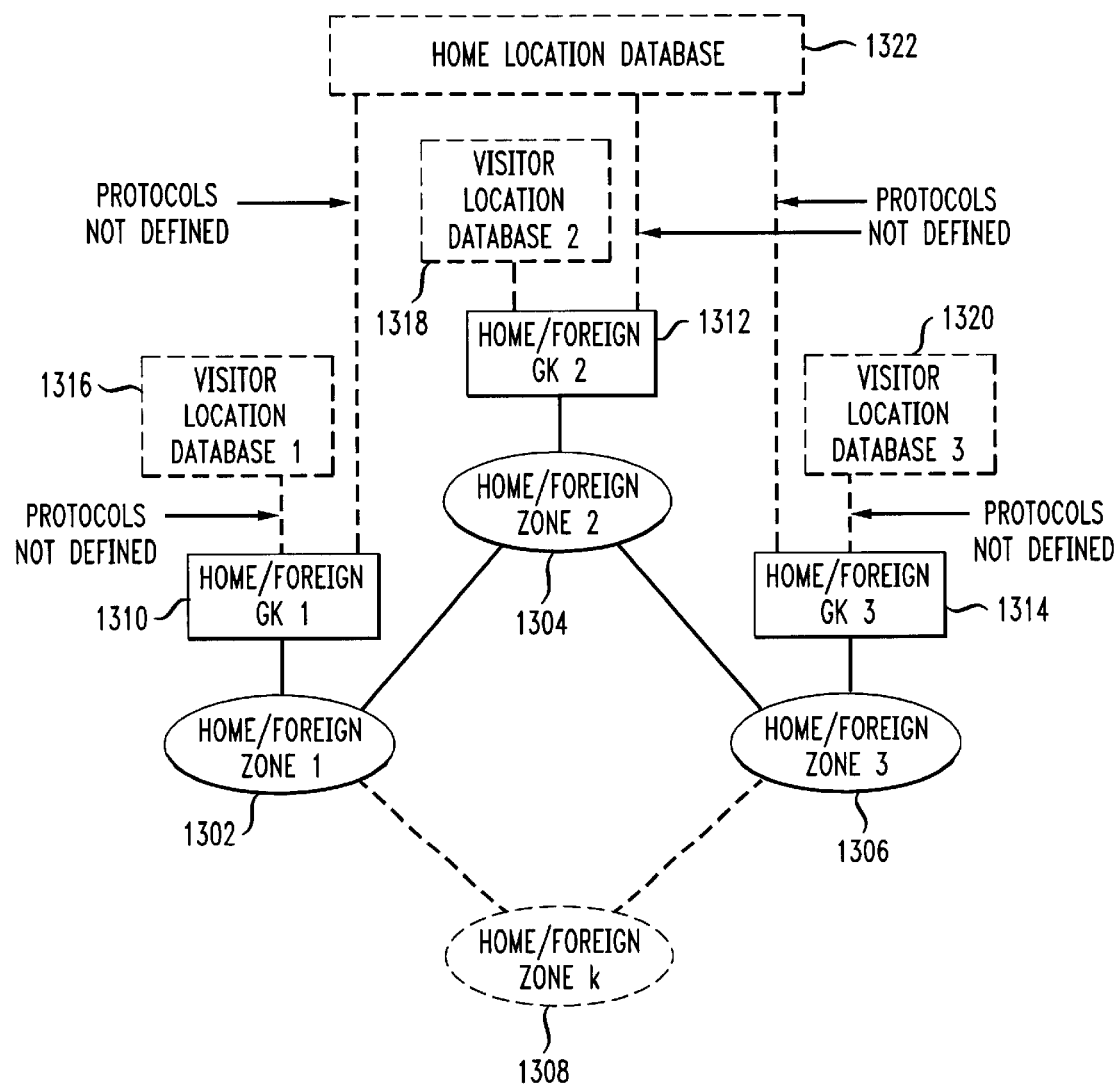
FIG. 13 is a block diagram showing one embodiment of a Centralized Home Location Database Architecture with GateKeepers(GKs) and Zones optimized in accordance with the present invention.

FIG. 13 is a block diagram showing one embodiment of an optimized distributed architecture for home/foreign zones 1302, 1304, 1306, 1308; home/foreign GKs 1310, 1312, 1314; visitor location databases 1316, 1318, 1320; and a home location database 1322 in accordance with the present invention. By separating the visitor location databases 1316, 1318, 1320 from the home location database and providing the home location database as a single, centralized home location database 1322 accessible by the home/foreign GKs 1310, 1312, 1314, management is simplified. Because the home location of a mobile H.323 entity remains the same, and this information may be kept in a central home location database. However, the scalability of such an optimization scheme may be examined, especially in the context of a large-scale IP network or the public Internet. There may also be hierarchical databases for managing the location information. The choice of a distributed vs. a centralized location management database is a matter of choice of implementation.

Location management involves the updating of location databases when current location information is available. During the call establishment, these databases are queried to determine the current location of the mobile entity. These can be costly processes especially when the mobile entity is located far away from its assigned home GK. So, the location management may need to be further optimized. Figure—shows one such example where the location of the home location information has been centralized.

In this centralized home location database architecture, the management may be little simpler because the home location of a mobile entity remains the same and this information may be kept in a central database. However, the scalability of this solution can be examined especially in the context of the large-scale IP network or the public Internet. There can also be hierarchical databases for managing the location information. The choice of a distributive vs. a centralized location management database is a matter of implementation.

The present invention provides the ability for a terminal to change its location. The change of location may be the network point of attachment or the H.323 point of attachment. Even if the terminal changes its location, an H.323 entity will still be able to communicate. The following description provides an example of how a terminal will make discrete changes of physical location (i.e., to change location while no media streams are active). In addition, a terminal will be able to change its location while media streams are active where handoffs need to be provided.

In both wireless and wire-line networking environment, terminal mobility may be provided with discrete changes of physical locations where no media streams are active. However, a terminal may change its location while media streams are active only for the wireless network.

In H.323, it is considered that there is a single GK in a zone and the said GK manages the information of the fixed (non-mobile)- and mobile-entity. So, the same GK can also perform the function of the fixed- and mobile (home/foreign/visiting/visited/target)-GK. An H.323 mobile terminal may roam within a zone, between the zones (inter-zone), or between domains (inter-domain). A call may have to be established between the fixed and mobile H.323 terminals. The terminals may located within the same zone, different zones and/or different A domains. However, handover (or handoff) management enables the H.323 system to maintain communications as the mobile terminal continues to move and change its point of attachment. The following steps are involved for the handover:

The process for handoff first involves initiation, where either the user/terminal, a GK, or changing system conditions (e.g., point of attachment) identify the need for handoff.

The next stage is the new connection generation, where the system must find new resources for handoff a connection and perform the connection to the new location (this may also involve additional routing operations at the lower transport layer).

The final stage is the media-flow control, where the delivery of the media from the old connection path to the new connection path (the term "connection" is used as an abstraction in the higher H.323 layer although the lower transport layer (e.g., IP, ATM) may or may not have the concept of connection) is maintained accordance to the agreed-upon service conditions.

It is important to note that the changeover between the old and new connection during the handoff requires these two connections to coexist for a brief period of time until the transition occurs successfully. This transition between the old and new connection during the handoff can be handled dynamically using the H.323's joining and leaving an ad hoc multipoint conference. In this way, creation of any new signaling messages to support handoff is avoided.

In H.323, an ad hoc conference may be created with the help of a multipoint controller (MC) or a multipoint controller unit (MCU) so that a new endpoint can join the conference: (request-to)-join (by requesting on its own) and invite-(to-join) (being invited by any participant). That is, the same mobile terminal will have two logical entities, one for the old point of attachment and the other for the new point of attachment for a brief period of time. As soon as the mobile entity finds that the transition has been completed successfully, the old point of attachment is terminated issuing the leave conference indication with endSessionCommand, while the communications with the new point of attachment will continue. Thus, the handovers can be provided dynamically using the mobile H.323 protocol of the present invention. An H.323 entity that needs to use this capability needs to have the MC capability. This feature may be realized within a GK, MCU, GW, or terminal.

Figure 14:
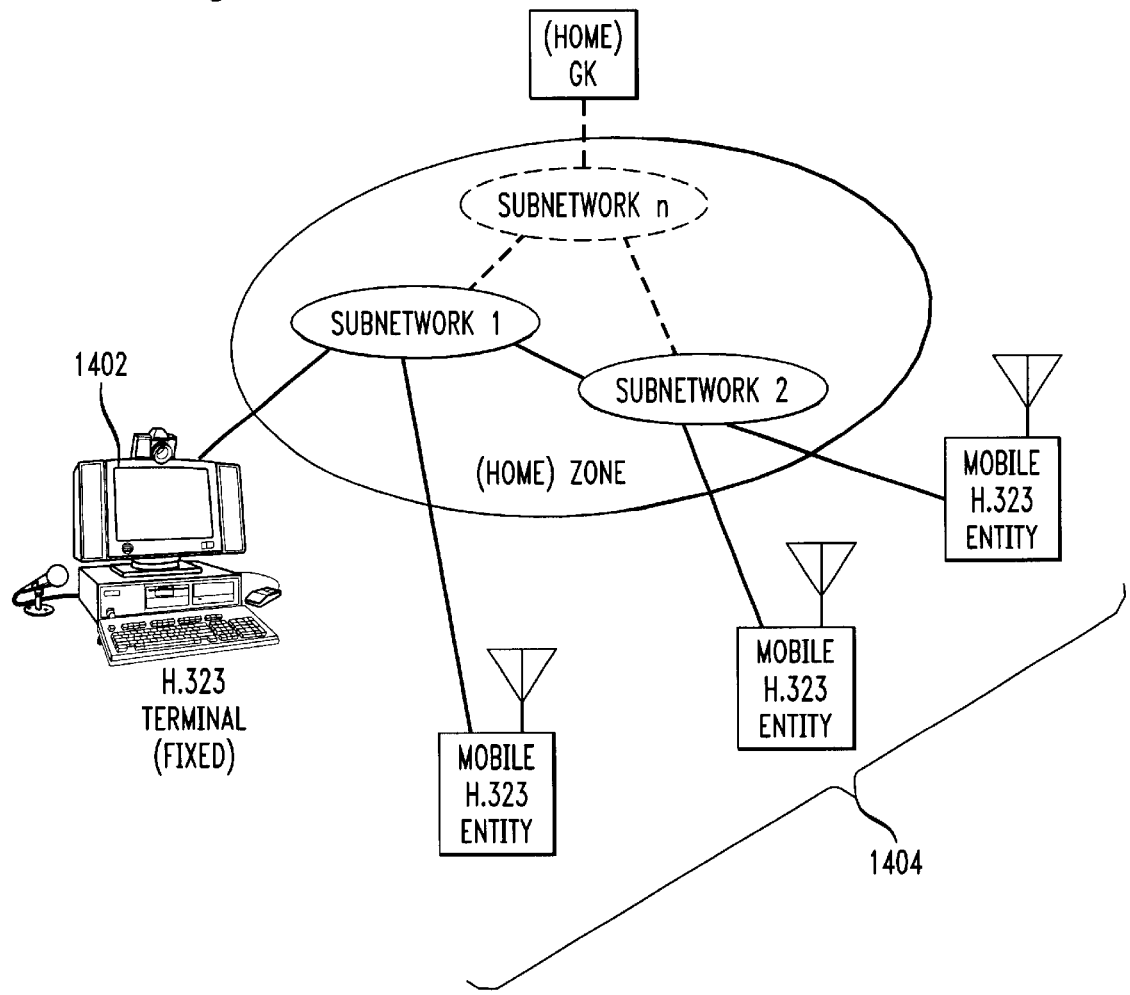
FIG. 14 shows all fixed 1402 and mobile 1404 H.323 entities residing within a single zone.

The call made between H.323 entities may be: fixed-to-mobile, mobile-to-fixed, or mobile-to-mobile. However, the call may be intra-zone, inter-zone, or inter-domain. FIG. 14 shows all fixed 1402 and mobile 1404 H.323 entities residing within a single zone. However, a zone may have many subnetworks. A call may take place between different H.323 entities using the new and/or extended H.323 signaling messages. The subsequent messages will describe various call scenarios.

Figure 15A:
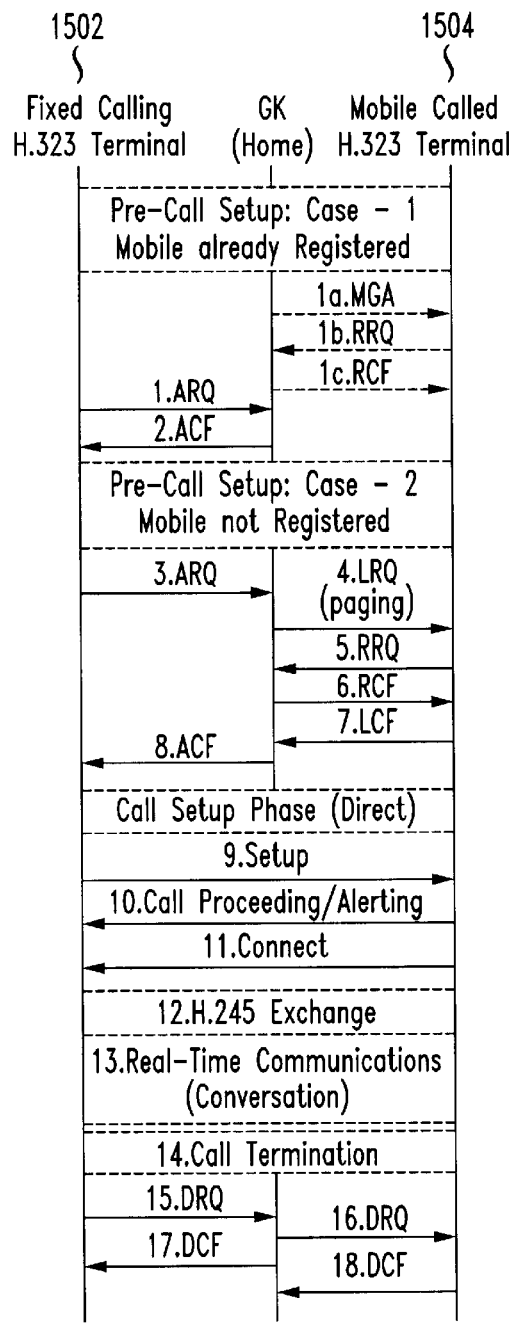
FIGS. 15(a)–(b) show the call flows where a fixed entity has called a mobile entity.
Figure 15B:
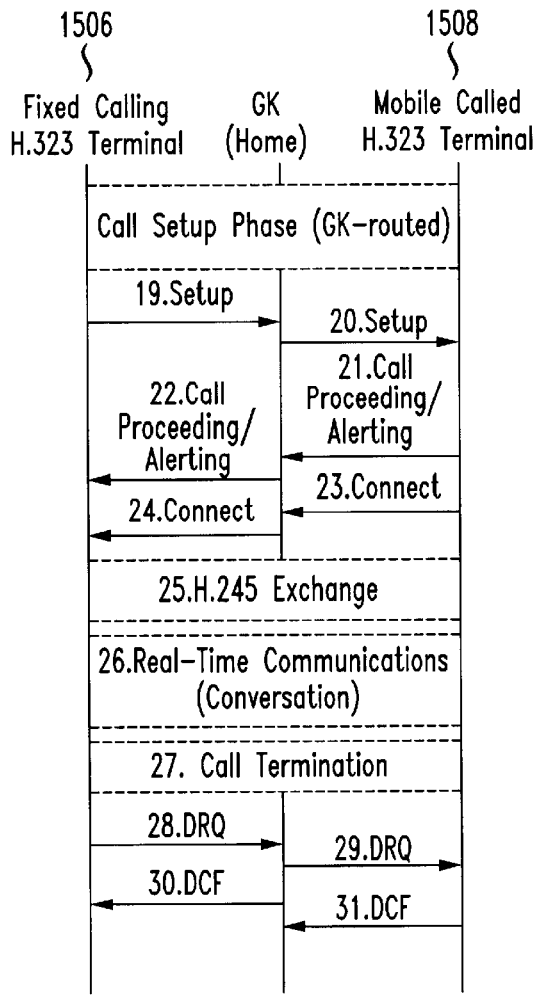

FIGS. 15(a)–(b) show the call flows where a fixed entity 1502, 1506 has called a mobile entity 1504, 1508. These entities are in the same zone, but they may be in the same subnetwork or in separate subnetworks (see FIG. 14). The flows are self-explanatory. There may be some differences in the pre-call setup scenarios depending whether or not the mobile is registered with its home GK. If the mobile is not registered with its home GK either due to expiration of the registered lifetime or due to change in the subnetwork point of attachment, the home GK needs to send the LRQ message using the paging in all subnetworks in its zone to locate the mobile because the GK will not have any idea where the mobile is residing. All other flows remain the same as in the case of the traditional fixed or non-mobile H.323 situations.

Figure 16A:
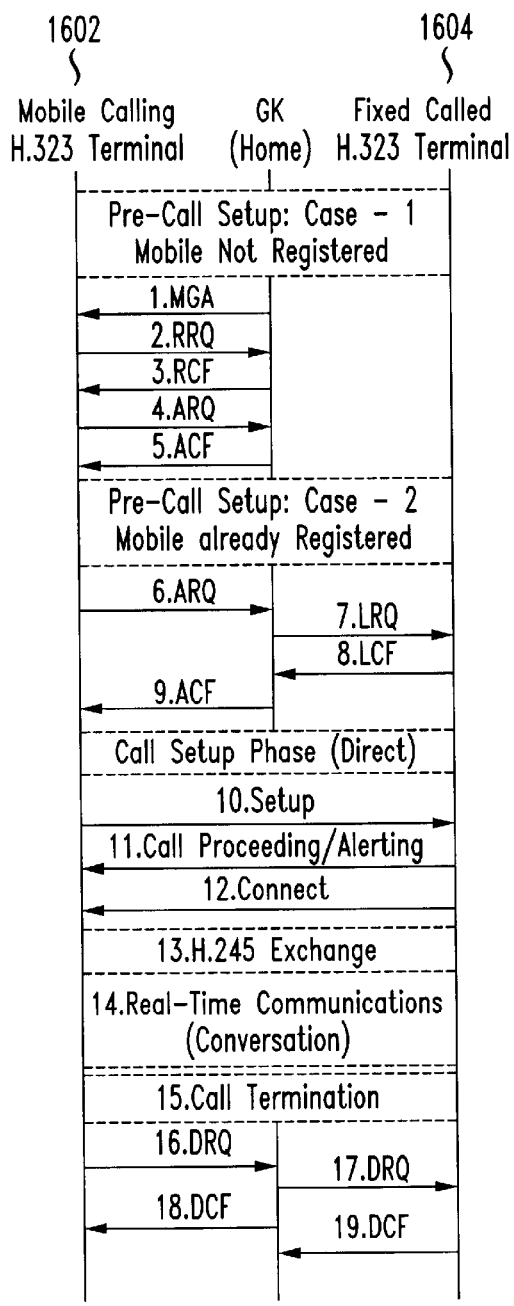
FIGS. 16(a)–(b) show the call flows where a mobile entity has called a fixed entity.
Figure 16B:
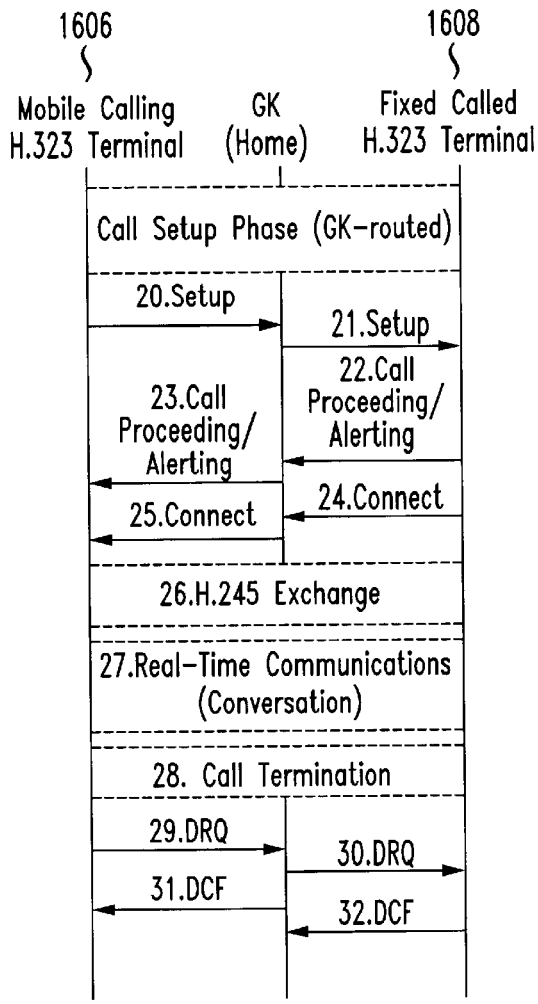

FIGS. 16(a)–(b) show the call flows where a mobile entity 1602, 1606 has called a fixed entity 1604, 1608. These entities are in the same zone, but they may be in the same subnetwork or in separate subnetworks (see FIG. 14). This situation is somewhat straightforward because the mobile needs to be registered with its home GK before a call is made. FIGS. 16(a)–(b) depict a situation that the mobile registers with the GK after receiving the MGA message. If the mobile does not receive the MGA message, it may also send the GRQ message to discover the mobile GK before registration. However, this situation is not shown for simplicity. All other signaling flows remain the same as in the case of the traditional fixed or non-mobile H.323 situation.

Figure 17A:
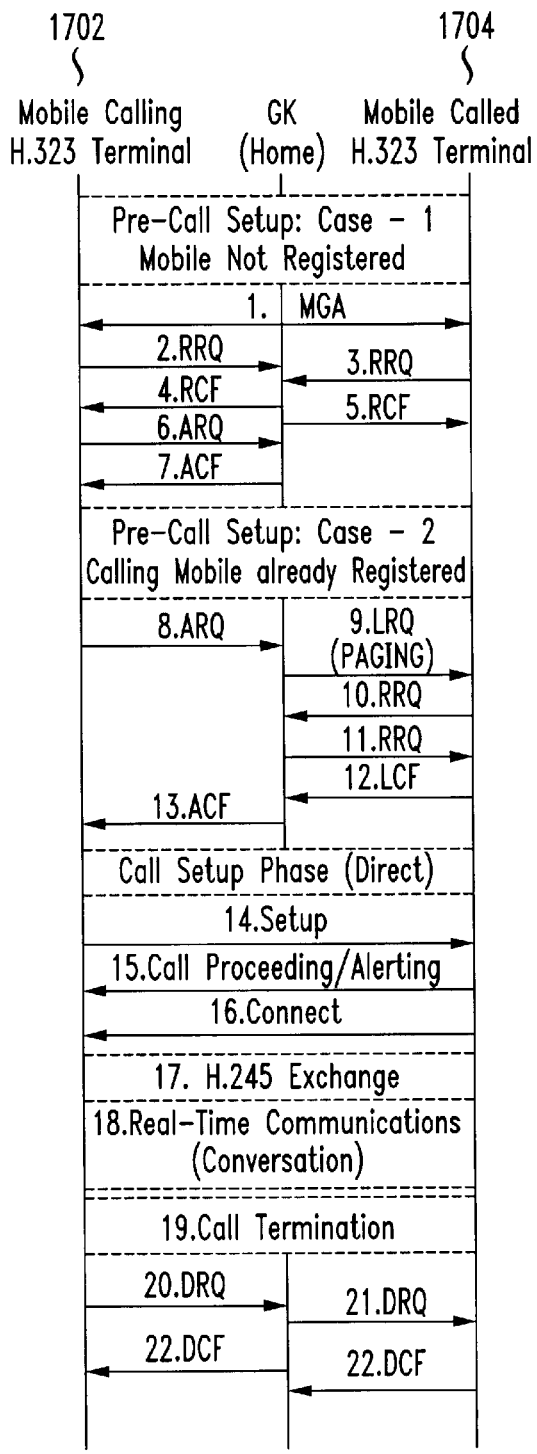
FIGS. 17(a)–(b) show the call flows where a mobile entity has called another mobile entity.
Figure 17B:
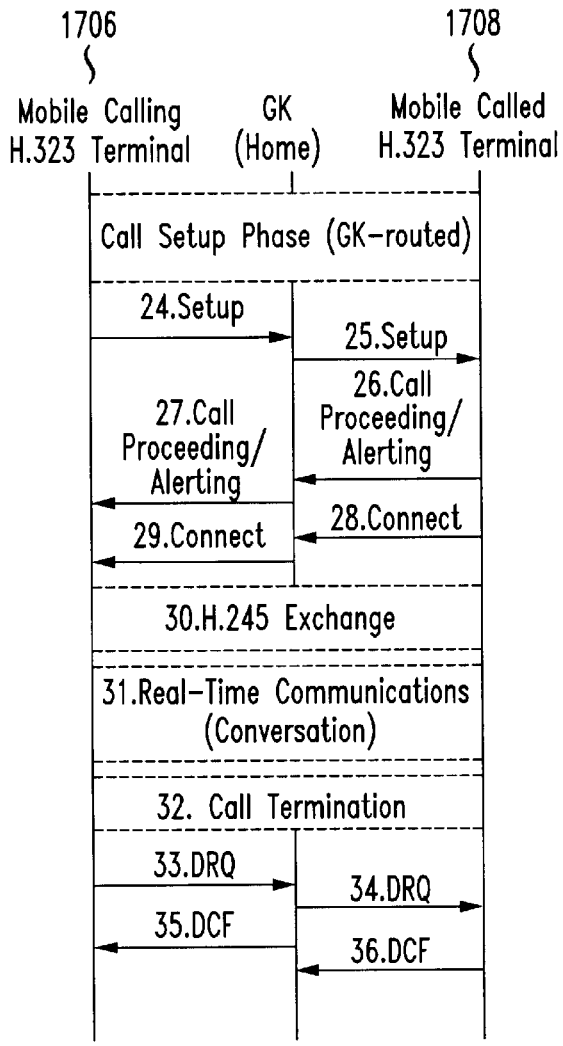

FIGS. 17(a)–(b) show the call flows where a mobile entity 1702, 1706 has called another mobile entity 1704, 1708. These entities are in the same zone, but they may also be in the same subnetwork or in separate subnetworks (see FIG. 14). The calling mobile entity needs to register with its home GK before the call is established. The called mobile entity may or may not be registered with the mobile (home) GK. Depending on these situations, the pre-call setup scenarios will vary. FIGS. 17(a)–(b) show the probable pre-call setup cases. The remaining call establishment flows remain the same as in the case of the traditional H.323 cases.

Figure 18:
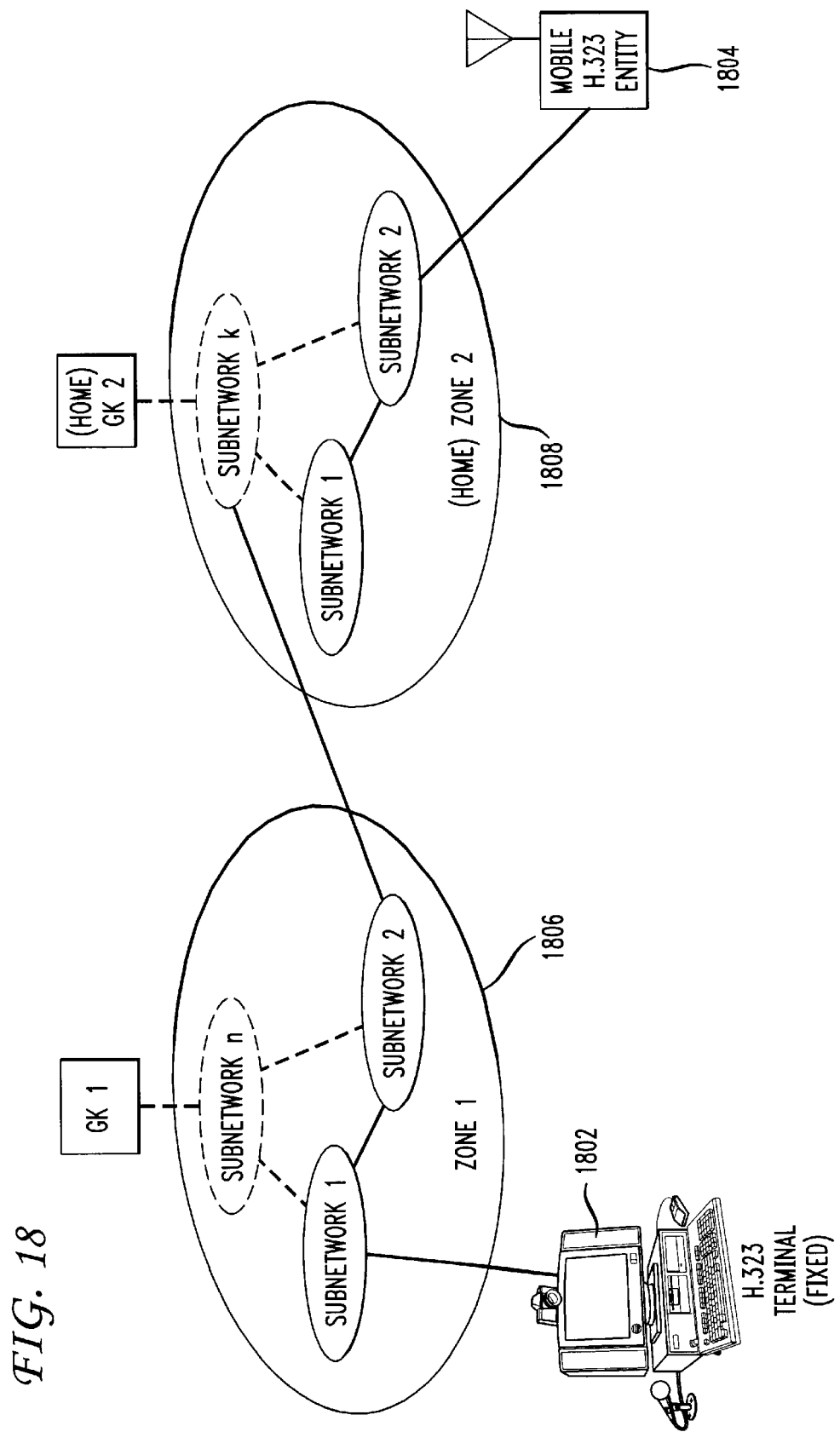
FIG. 18 shows inter-zone communication for fixed and mobile entities.

H.323 entities will remain in multiple zones while they will be communicating among themselves. FIG. 18 shows only two zones with fixed 1802 and mobile 1804 entities for simplicity. The two entities located in two different zones may communicate directly. However, the call can also be the GK-routed. In this example, it is assumed that the call will be routed via the calling party's GK. The fixed entity 1802 is located in zone 1 1806 while the mobile entity 1804 is situated in zone 2 1808. Zone 2 is also termed as the home GK of the mobile entity. It is considered that the mobile entity is in its home zone, and then the attempt is made to establish the call.

Figure 19A:
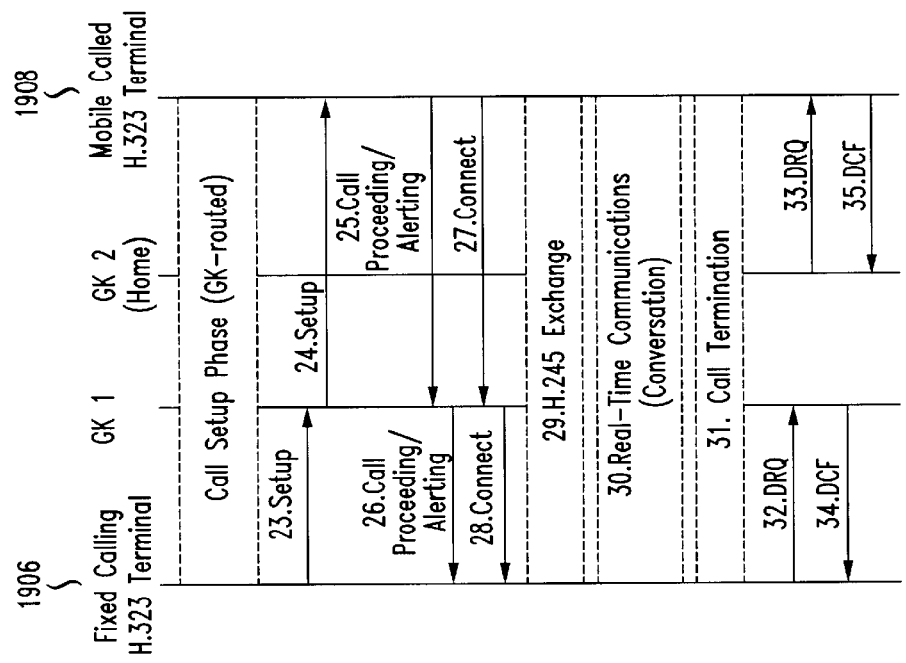
FIGS. 19(a)–(b) depict call signaling between the fixed and the mobile entity located in two different zones: (a) Direct and (b) GK-routed.
Figure 19B:
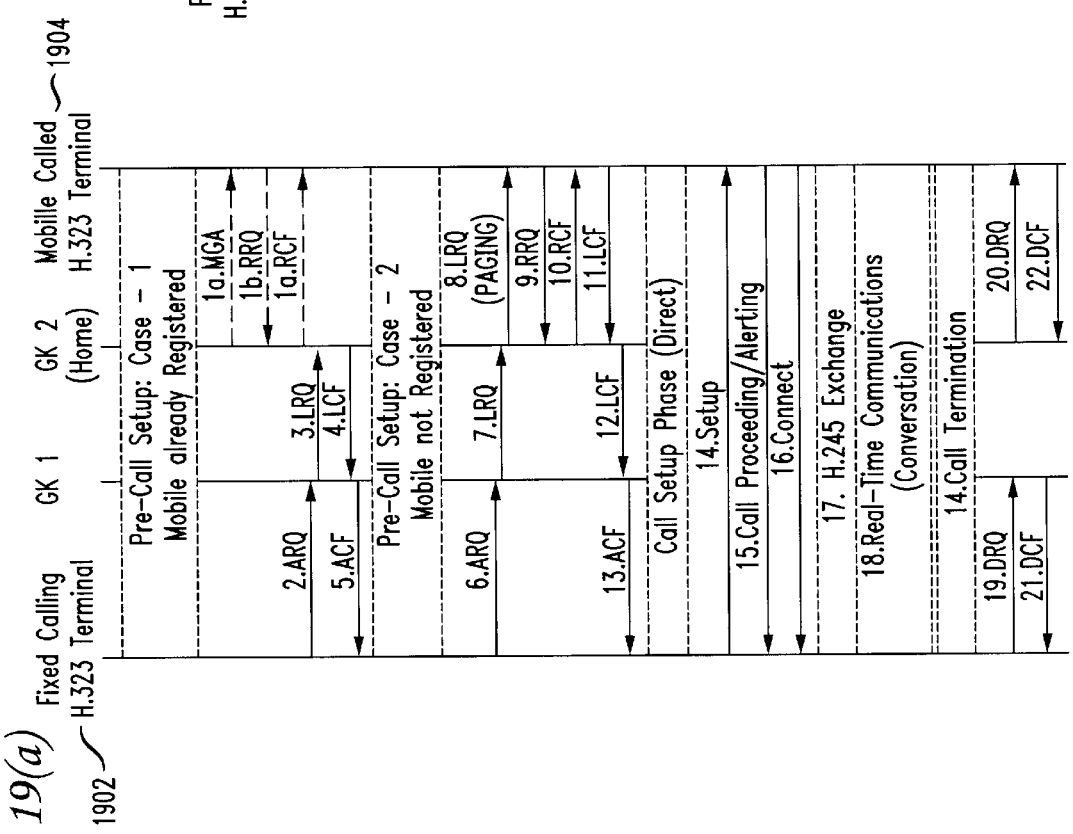

FIGS. 19(a)–(b) depict call signaling between the fixed 1902, 1906 and the mobile 1904, 1908 entity located in two different zones: (a) Direct and (b) GK-routed. There may be two scenarios for the pre-call setup. The mobile may or may not be registered with its home GK. Once the mobile is registered, the call establishment will proceed, as discussed earlier, in accordance to the traditional H.323 call flows (case-1). In case-2, where the mobile is not registered, GK 1 of the fixed entity will send the LRQ message to the mobile's home GK 2. GK 2 has no idea where the mobile entity is. So, GK 2 will page the LRQ message in its own zone. The mobile will then proceed to register with the home GK. The mobile will send the location confirmation (LCF) message once the registration is completed. The LCF message will then be relayed back to GK 1 by GK 2. The rest of the call flows is the same as that of the traditional H.323 call establishment.

Mobile to fixed transmission may be explained in a similar way that has been described in the case of the fixed-to-mobile situation.

Figure 20:
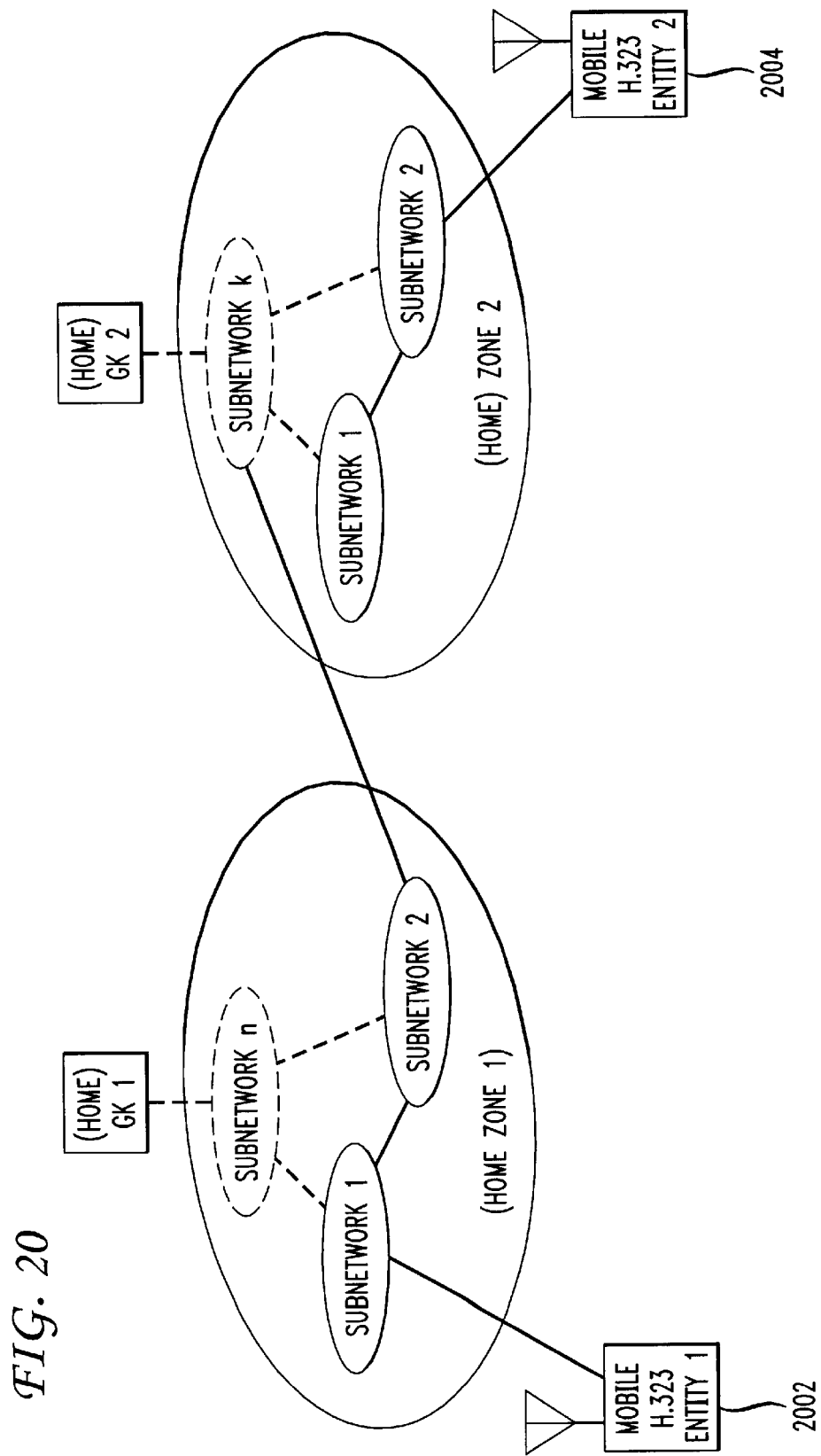
FIG. 20 shows two mobile entities that are located in two separate zones. It is assumed that these entities are located in their respective home zones.

FIG. 20 shows two mobile entities 2002, 2004 that are located in two separate zones. It is assumed that these entities are located in their respective home zones.

Figure 21B:
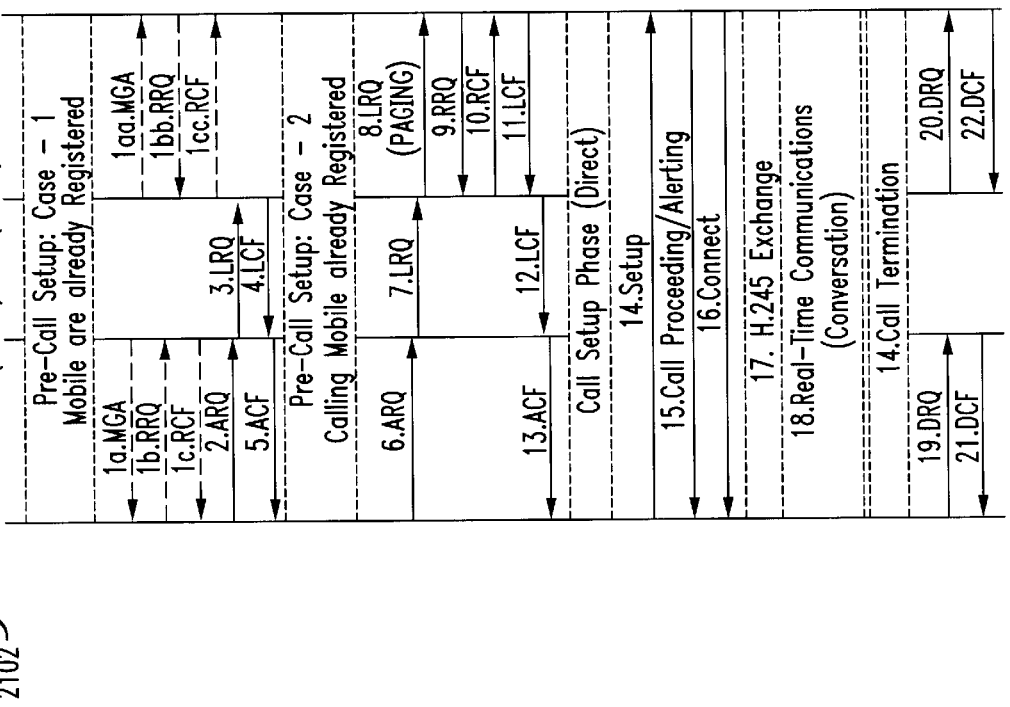
FIGS. 21(a)–(b) provide the call flow scenarios for the mobile-to-mobile communications while these entities are located in two separate zones: (a) Direct and (b) GK-routed.
Figure 21A:
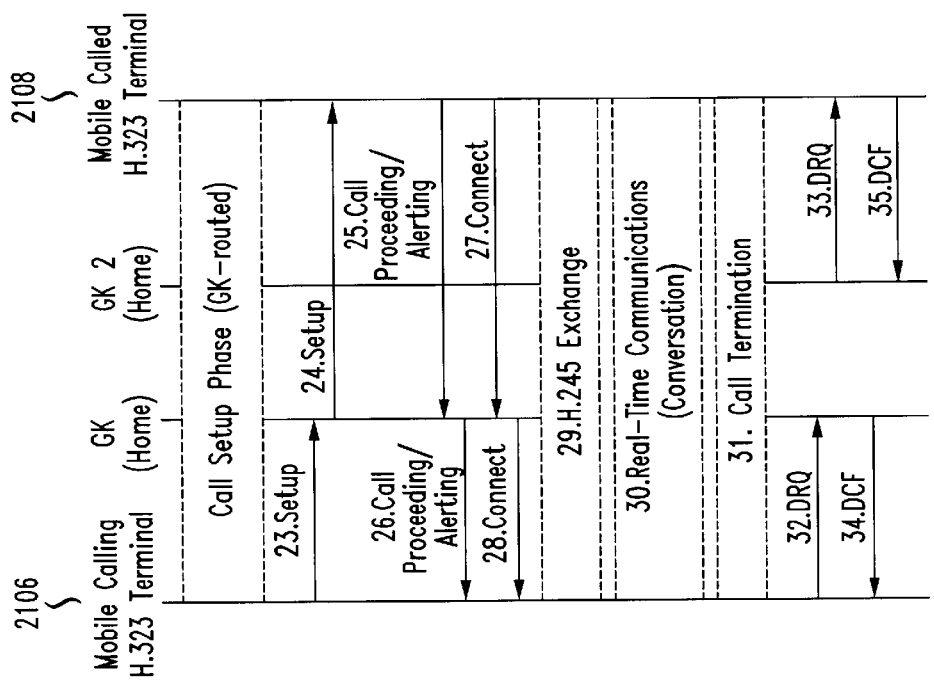

FIGS. 21(a)–(b) provide the call flow scenarios for the mobile-to-mobile communications while these entities are located in two separate zones: (a) Direct and (b) GK-routed. The calling mobile entity 2102, 2106 shall register with its home GK before the call is made to the called mobile entity 2104, 2108. The mobile GKs will advertise the MGA message in their respective zones. The registration can be made after receiving the MGA message as shown in FIG. 21. The mobile entity can also send the GRQ message to discover the mobile GK and the GCF/GRJ messages will also flow accordingly. This alternatively scenario has not been shown for simplicity. As before, there can be two scenarios for the pre-call setup. Once the mobile is registered, the call establishment will proceed, as discussed earlier, in accordance to the traditional H.323 call flows (case-1). In case-2, where the mobile is not registered, GK 1 of the fixed entity will send the LRQ message to the mobile's home GK 2. GK 2 has not idea where the mobile entity is. So, GK 2 will page the LRQ message in its own zone. The mobile will then proceed to register with the home GK. The mobile will send the location confirmation (LCF) message once the registration is completed. The LCF message will then be relayed back to GK 1 by GK 2. The rest of the call flows is the same as that of the traditional H.323 call establishment.

In the preceding examples, it was shown how the calls are established with the mobiles in many situations (e.g., fixed-to-mobile, mobile-to-fixed, or mobile-to-mobile). The conversations will go on after the call establishment while the mobile will move from one place to another (in wireless environment). The movement may cause the change in point of attachment (e.g., IF subnetwork address in a given zone or in a different zone). The detection in change of point of attachment will initiate a new connection to the new point of attachment (while keeping the old connection until the transition occurs to the new connection properly). As soon as the resources are allocated to the new connection, the old connection and the resources to the old connection is terminated.

As explained earlier, the transition from the old connection to the new connection during the handoff can be made via an H.323 communicating entity that can create ad hoc multipoint conferencing either from the point-to-point or from the multipoint call using the multipoint controller (MC). As a part of multipoint conference setup, an endpoint (H.323 entity) will become connected to an MC on its H.245 control channel.

Figure 22A:
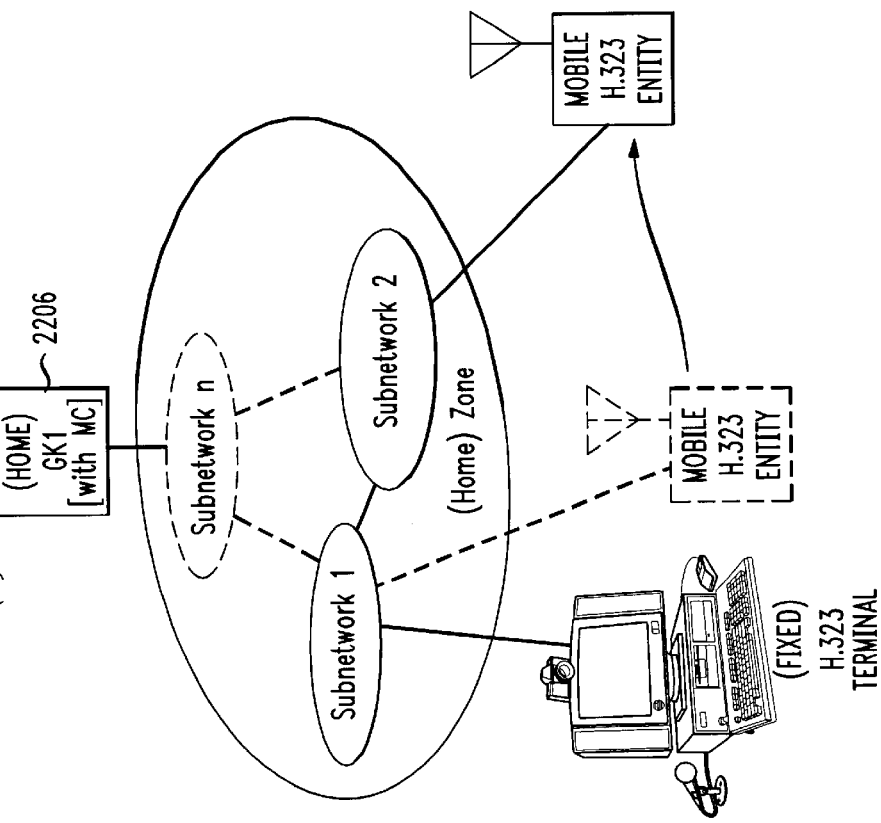
FIGS. 22(a)–(b) depict a situation for the intra-zone handover where a call can be either directly routed or GK routed.
Figure 22B:
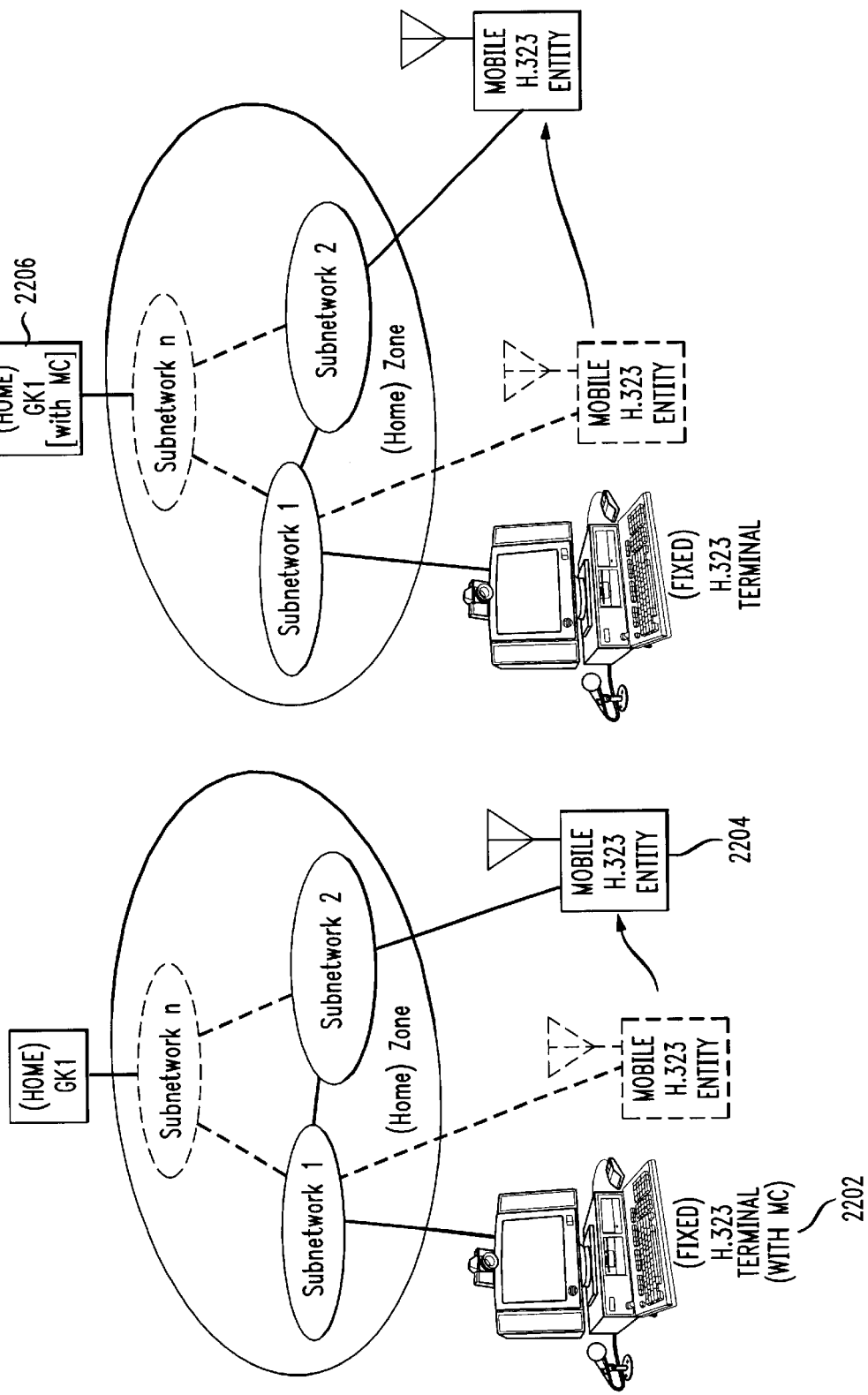

In the intra-zone call scenario, a mobile entity is communicating (audio, video, and/or data) with another H.323 entity (fixed or mobile) in the same zone. The call may be established either directly or via the GK. It is assumed that one of the communicating H.323 entities will have an MC that can create the ad hoc multipoint conferencing to provide transition from the old connection to the new one during handover. FIGS. 22(a)–(b) depict a situation for the intra-zone handover where a call can be either directly routed or GK routed.

FIG. 22(a) shows the directly routed call between a fixed 2202 and a mobile 2204 entity while the fixed entity has the MC capability. In FIG. 22(b), the call is routed via the GK 2206 and the GK has the MC capability. The subsequent sections describe the detail call signaling during handoffs. In this scenario (FIG. 22(a)), it is assumed that the conversations with audio, video, and/or data between the fixed and the mobile entity are going on while both entities are in the subnetwork 1 of (home) zone 1 and the mobile entity is moving from one place to another. Let us assume that the mobile terminal (MT) designates this connection as MT1 with the fixed terminal (FT). Now suppose that the mobile entity's network point of attachment (e.g., IP subnetwork address) changes as it moves from subnetwork 1 to subnetwork 2. The mobile can detect the change in the network point of attachment in one of the two ways as discussed earlier.

Figure 23:
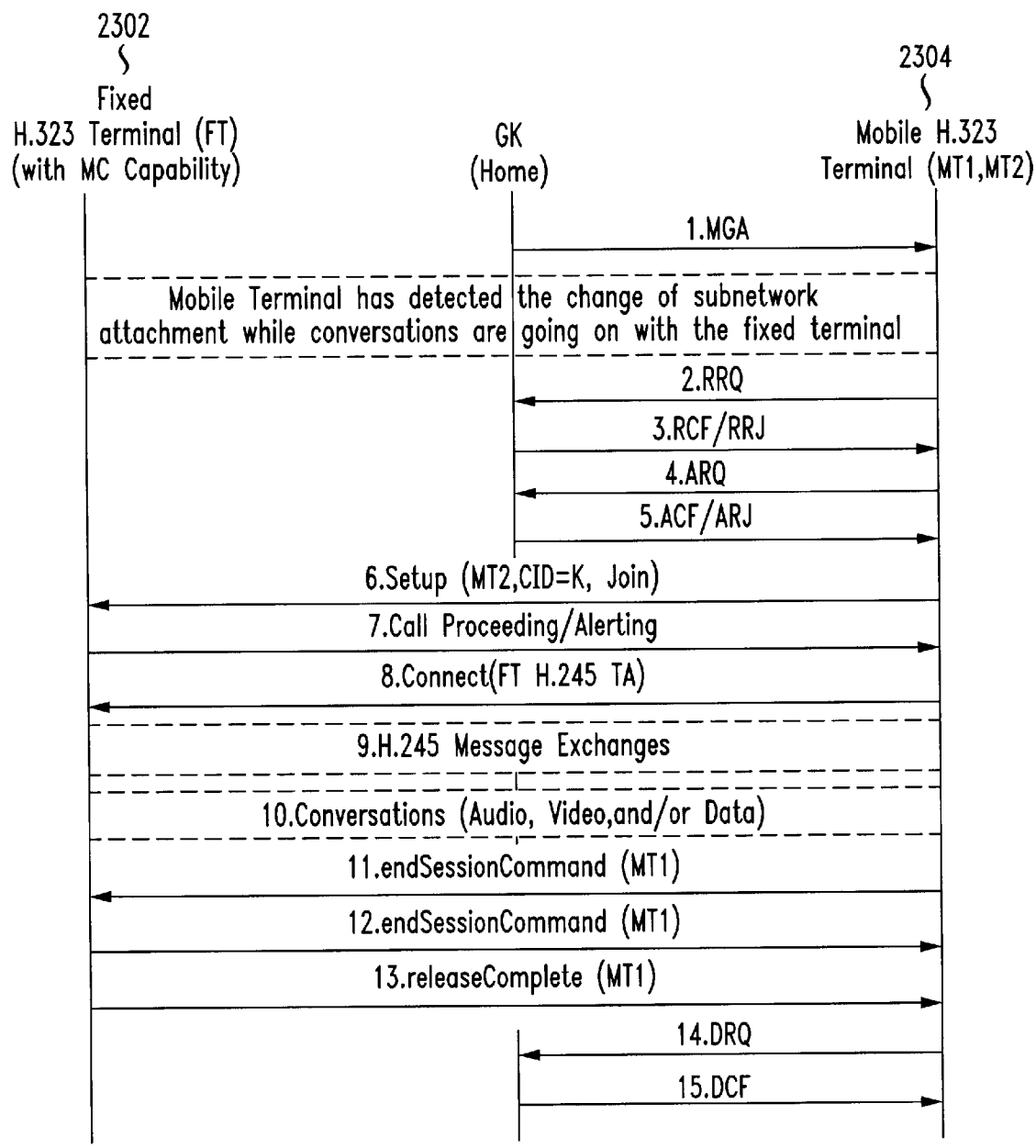
FIG. 23 shows the call flows that include the intra-zone handover from a fixed entity with MC capability for a directly routed call to a mobile entity as the mobile moves from subnetwork 1 to subnetwork 2.

FIG. 23 shows the call flows that include the intra-zone handover from a fixed entity 2302 with MC capability for a directly routed call to a mobile entity 2304 as the mobile moves from subnetwork 1 to subnetwork 2. The following steps describe the call signaling on how the handoff is provided as the new connection is established while the old connection is terminated:

Step 1: The MGA message is advertised by the (home) GK in its (home) zone. The mobile terminal receives the MGA message and confirms that it still in its home zone. (Then it also examines that the address of subnetwork 2 (e.g., IP address) in which it has moved presently. The subnetwork address is being advertised in the network layer (e.g., mobile IP's home/foreign agent). This is a matter of implementation in the network layer and, H.323 does not deal with the implementation in the network layer.) The mobile terminal confirms that it has moved to the new subnetwork and needs to re-register with its home GK. (In another scenario, the mobile terminal can also initiate the GRQ message to find the GK for registration should it not receive the MGA message. This possibility is not shown for simplicity.)

Step 2: The mobile terminal sends the RRQ message for registration with the home GK This message will contain the mobile terminal's home and care-of network addresses (e.g., IP addresses) in addition to other information.

Step 3: The (home) GK sends the registration confirmation (RCF) or rejection (RRJ) message.

Step 4: The mobile terminal sends the admission request (ARQ) message to its home GK as a precursor for establishment of a new connection in its new point of attachment after receiving the registration confirmation (RCF) message.

Step 5: The (home) GK sends the admission confirmation (ACF) or rejection (RRJ) message to the mobile terminal based on the fact whether the requirements for the admission can be met or not. In ACF, the GK returns a call signaling channel transport address of the fixed terminal (FT).

Step 6: The mobile terminal sends the Setup message to the fixed terminal for joining the same on-going conference (CID=K) after receiving the admission confirmation (ACF) message using that transport address of the fixed terminal. It is seeking a new connection (MT2) for the same conference (CID=K) that was used for the previously established conference between the mobile terminal (MT1) and the fixed terminal (FT).

Step 7: The fixed terminal sends the Call Proceeding/Alert message indicating that the called fixed terminal has been alerted with the new connection (MT2).

Step 8: The fixed terminal (FT) responds with the Connect message which contains an H.245 control channel transport address for use in H.245 signaling for the new connection (MT2). The fixed terminal with multipoint controller (MC) will associate this new call of the new connection (MT2) for the same conference (CID=K).

Step 9: H.245 message exchanges take place between the fixed and the mobile terminal and the detail has not been shown for simplicity. Media channels (audio, video, and/or data) for communications between the fixed terminal (FT) terminal (having the MC capability) and the mobile terminal's new connection (MT2) are opened.

Step 10: Conversations (audio, video, and/or data) between the FT (fixed terminal) and the MT2 (mobile terminal's new connection) take place.

Step 11: The mobile terminal issues the H.245 endSessionCommand message in the H.245 control channel, indicating to the fixed terminal that it wishes to disconnect the old call (for the old connection MT1) and then discontinues the H.245 message transmission.

Step 12: The fixed terminal responds with the H.245 endSessionCommand message in the H.245 control channel for termination of the old call (for the old connection MT1).

Step 13: Then the fixed terminal sends the releaseComplete message indicating the old call (for the old connection MT1) has been terminated. (It may be noted that the conference (CID=K) between the fixed terminal (FT) and the mobile terminal's new connection (MT2) is still going on although the old connection MT1 has been released.)

Step 14: The mobile terminal sends the H.225.0 disengage request (DRQ) message to its home GK to release the resources used for the old connection (MT1).

Step 15: The (home) GK responds with the H.225.0 disengage confirm (DCF) message after releasing the resources used for the old connection (MT1).

In this way, a new connection is established with the fixed terminal and the mobile terminal (MT2). The handover is provided form the old (MT1) to the new connection (MT2) via the MC located within the fixed terminal. It is expected that there might be a situation where both the old and the new connection might co-exist for a very brief period of time before the successful handoff is made.

FIG. 22(b) shows the intra-zone communications where the call is routed via the GK that has the MC capability. This case is similar to that of the scenario for the directly routed call with the fixed terminal having the MC capability. The exception is that the GK with its MC that is controlling the call is priori involved in the beginning of the conference. The point-to-point call between the fixed and mobile entity is being made via the GK (with its MC) and H.245 control channels are also being established via the GK before the handover is made.

Figure 24:
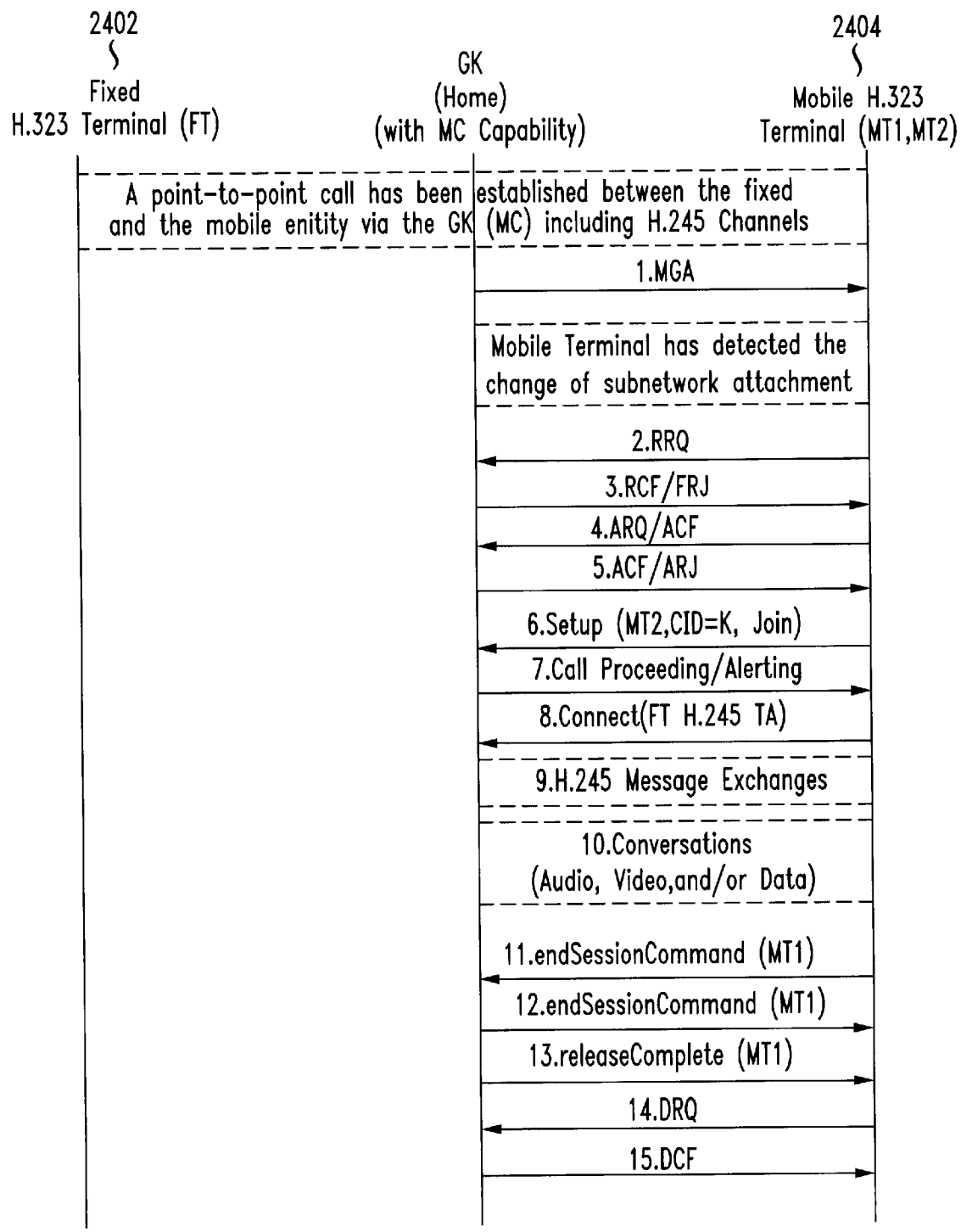
FIG. 24 shows the call signaling for the GK-routed handover from a fixed H.323 terminal to a mobile H.323 terminal where the GK has MC capability.

FIG. 24 shows the call signaling for the GK-routed handover from a fixed H.323 terminal 2402 to a mobile H.323 terminal where the GK has MC capability. It is assumed that a point-to-point call has been established between the fixed and the mobile entity via the GK (with MC). This also means that H.245 control channels have also been established via the GK. The steps 1 through 15 are similar to those that have been shown as in the case of the directly routed call. The exception is that the GK (with MC) will be involved to provide the handover from the old connection (MT1) to the new connection (MT2) instead of the fixed terminal (with MC).

Figure 25A:
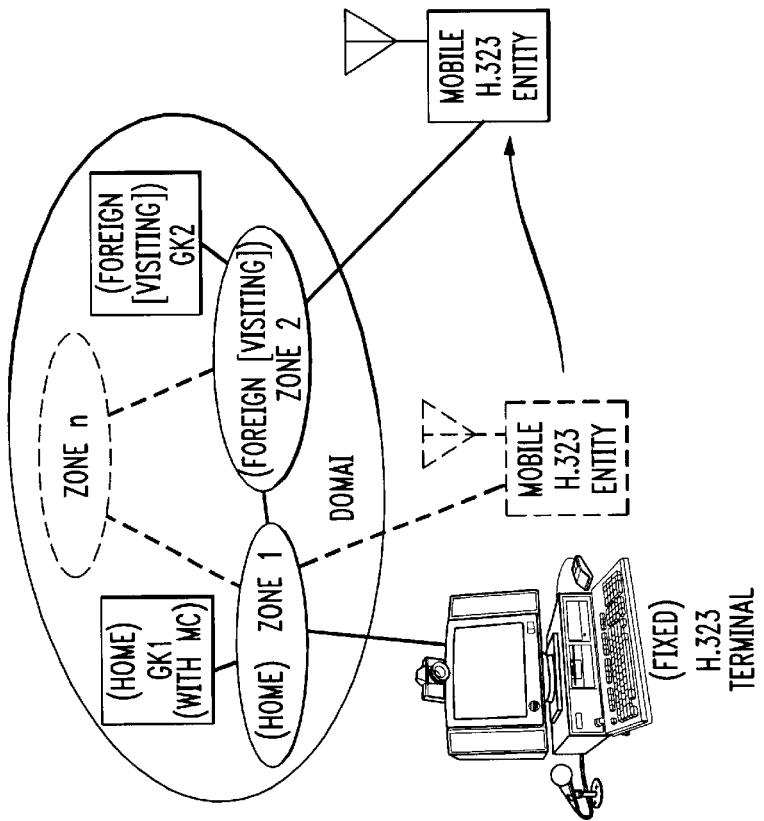
FIGS. 25(a)–(b) show inter-zone handoffs that are needed for a (a) Directly Routed Call and a (b) GK-Routed Call because the mobile entity moves out of the zone boundary.
Figure 25B:
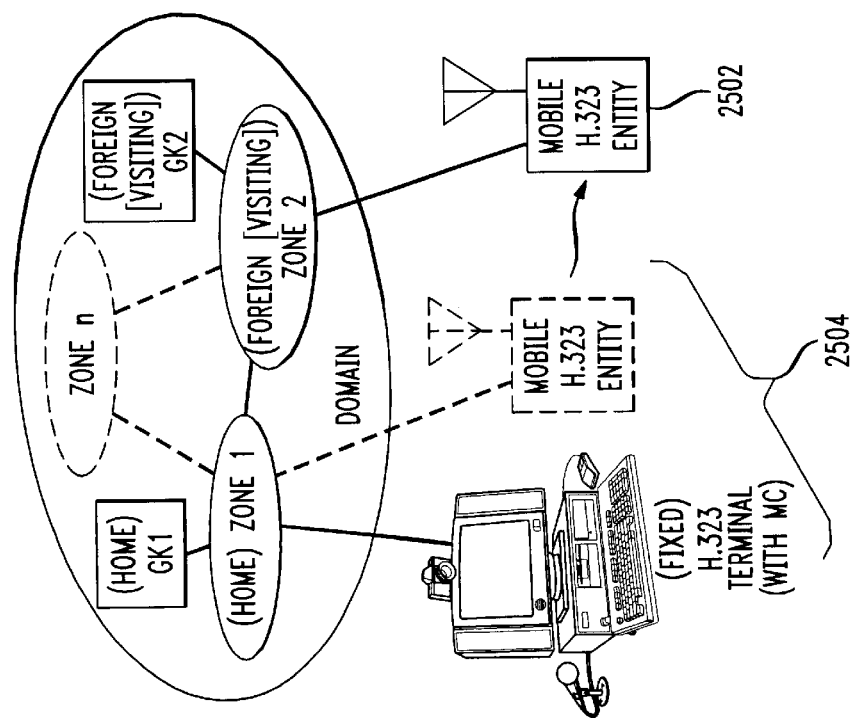

FIGS. 25(a)–(b) show inter-zone handoffs that are needed for a (a) Directly Routed Call and a (b) GK-Routed Call because the mobile entity moves out of the zone boundary. It is assumed that the call has already been established between the fixed and mobile entity before the handoff. The inter-zone handoff is needed as the mobile terminal moves from one zone to another. Initially, a mobile entity 2502 is communicating (audio, video, and/or data) with another H.323 entity (fixed or mobile) 2504 in the same zone. The call is established either directly or via the GK. It is assumed that one of the communicating H.323 entities will have an MC that can create the ad hoc multipoint conferencing to provide transition from the old connection to the new one during handover. The MC will also be connected using H.245 channels.

The subsequent descriptions provide for the inter-zone handoffs for the directly- and GK-routed call. Again, it may be noted that an MC is needed to provide the handoff.

In FIG. 25(a), it is assumed that the conversations (with audio, video, and/or data) are going on between the fixed and the mobile entity while both entities are in zone 1 and, the mobile entity is moving from one place to another. However, it is considered that the fixed entity has the MC capability to create the ad hoc multipoint conferencing. As before, let us assume that the mobile terminal (MT) designates this connection as MT1 with the fixed terminal (FT). Now consider that the mobile entity's zone point of attachment (e.g., a group of IP subnetwork addresses in a given zone) changes as it moves from zone 1 to zone 2. The mobile can detect the change in the zone point of attachment directly through examining the MGA message (e.g., zoneRange) received from the mobile GK in a given zone.

Figure 26:
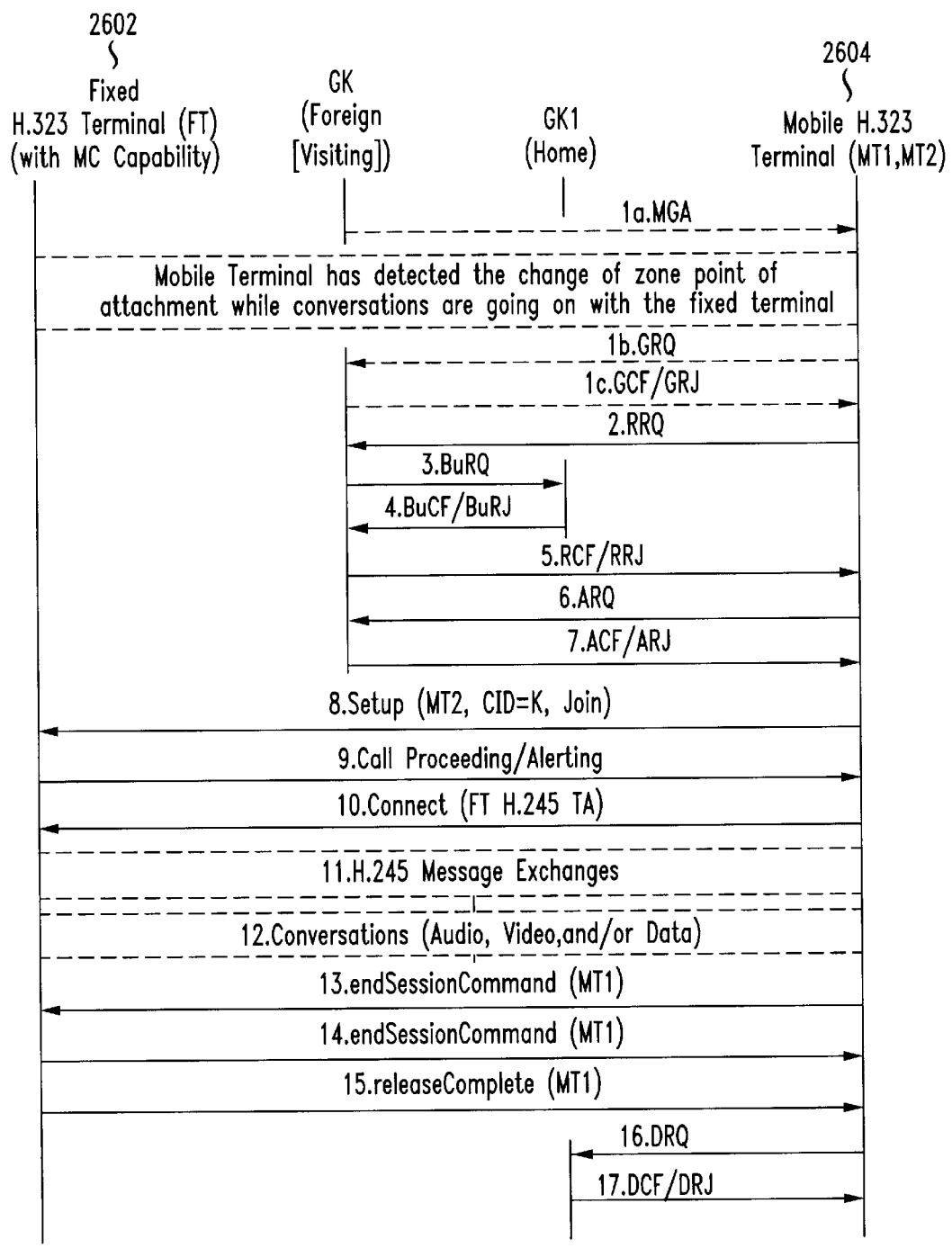
FIG. 26 shows the call flows that includes the handover as the mobile moves from (its home) zone 1 to visiting/foreign zone 2, i.e., call signaling for inter-zone handovers: fixed entity with MC capability for the directly routed Call.

FIG. 26 shows the call flows that includes the handover as the mobile moves from (its home)zone 1 to visiting/foreign zone 2, i.e., call signaling for inter-zone handovers: fixed entity 2602 with MC capability for the directly routed Call to the mobile terminal 2604. The following steps describe the call signaling for the inter-zone handoff that is provided as the new connection established while the old connection is terminated:

Step 1a: The MGA message is advertised by the (visiting/foreign) GK by (mobile visiting/foreign GK 2. The mobile terminal receives the MGA message and confirms that it has moved to a foreign zone. The mobile terminal confirms that it has moved to a new foreign zone and needs to register with visiting/foreign GK 2.

Step 1b: In another scenario, the mobile terminal can also initiate the GRQ message to find the GK for registration should it not receive the MGA message.

Step 1c: In response, GK 2 sends gatekeeper confirmation (GCF) or rejection (GRJ) message.

Steps 1b and 1c are an alternative to step to if the MGA message is not received by the mobile entity.

Step 2: The mobile terminal sends the RRQ message for registration with (visiting/foreign) GK 2. This message will contain the mobile terminal's home and care-of network addresses (e.g., IP addresses) in addition to other information.

Step 3: (Visiting/Foreign) GK 2 sends the mobility binding update request (BURQ) message to the mobile entity's (home) GK 1.

Step 4: In response, (Home) GK 1 sends the mobility binding confirmation (BuCF) or rejection (BuRJ) message.

Step 5: (Visiting/foreign) GK 2 sends the registration confirmation (RCF) or rejection (RRJ) message to the mobile terminal.

Step 6: The mobile terminal sends the admission request (ARQ) message to (Visiting/Foreign) GK 2 as a precursor for establishment of a new connection in its new point of attachment after receiving the registration confirmation (RCF) message.

Step 7: (Visiting/Foreign) GK 2 sends the admission confirmation (ACF) or rejection (RRJ) message to the mobile terminal based on the fact whether the requirements for the admission can be met or not. In ACF, the GK returns a call signaling channel transport address of the fixed terminal (FT).

Step 8: The mobile terminal sends the Setup message to the fixed terminal for joining the same on-going conference (CID=K) after receiving the admission confirmation (ACF) message using that transport address of the fixed terminal. It is seeking a new connection (MT2) for the same conference (CID=K) that was used for the previously established conference between the mobile terminal (MT1) and the fixed terminal (FT).

Step 9: The fixed terminal sends the Call Proceeding/Alert message indicating that the called fixed terminal has been alerted with the new connection (MT2).

Step 10: The fixed terminal (FT) responds with the Connect message which contains an H.245 control channel transport address for use in H.245 signaling for the new connection (MT2). The fixed terminal with multipoint controller (MC) will associate this new call of the new connection (MT2) for the same conference (CID=K).

Step 11: H.245 message exchanges take place between the fixed and the mobile terminal and the detail has not been shown for simplicity. Media channels (audio, video, and/or data) for communications between the fixed terminal (FT) terminal (having the MC capability) and the mobile terminal's new connection (MT2) are opened.

Step 12: Conversations (audio, video, and/or data) between the FT (fixed terminal) and the MT2 (mobile terminal's new connection) take place.

Step 13: The mobile terminal issues the H.245 endSessionCommand message in the H.245 control channel, indicating to the fixed terminal that it wishes to disconnect the old call (for the old connection MT1) and then discontinues the H.245 message transmission.

Step 14: The fixed terminal responds with the H.245 endSessionCommand message in the H.245 control channel for termination of the old call (for the old connection MT1).

Step 15: Then the fixed terminal sends the releaseComplete message indicating the old call (for the old connection MT1) has been terminated. (It may be noted that the conference (CID=K) between the fixed terminal (FT) and the mobile terminal's new connection (MT2) is still going on although the old connection MT1 has been released.)

Step 16: The mobile terminal sends the H.225.0 disengage request (DRQ) message to (home) GK 1 to release the resources used for the old connection (MT1).

Step 17: (Home) GK 1 responds with the H.225.0 disengage confirm (DCF) or reject (DRJ) message after releasing the resources used for the old connection (MT1).

Similar to the case of the intra-zone scenario, a new connection is established with the fixed terminal and the mobile terminal (MT2) across zones 1 and 2. The handover is provided form the old (MT1) to the new connection (MT2) using the MC capability of the fixed terminal. It is expected that there might be a situation where both the old and the new connection might co-exist for a very brief period of time before the successful handoff is made.

Figure 27:
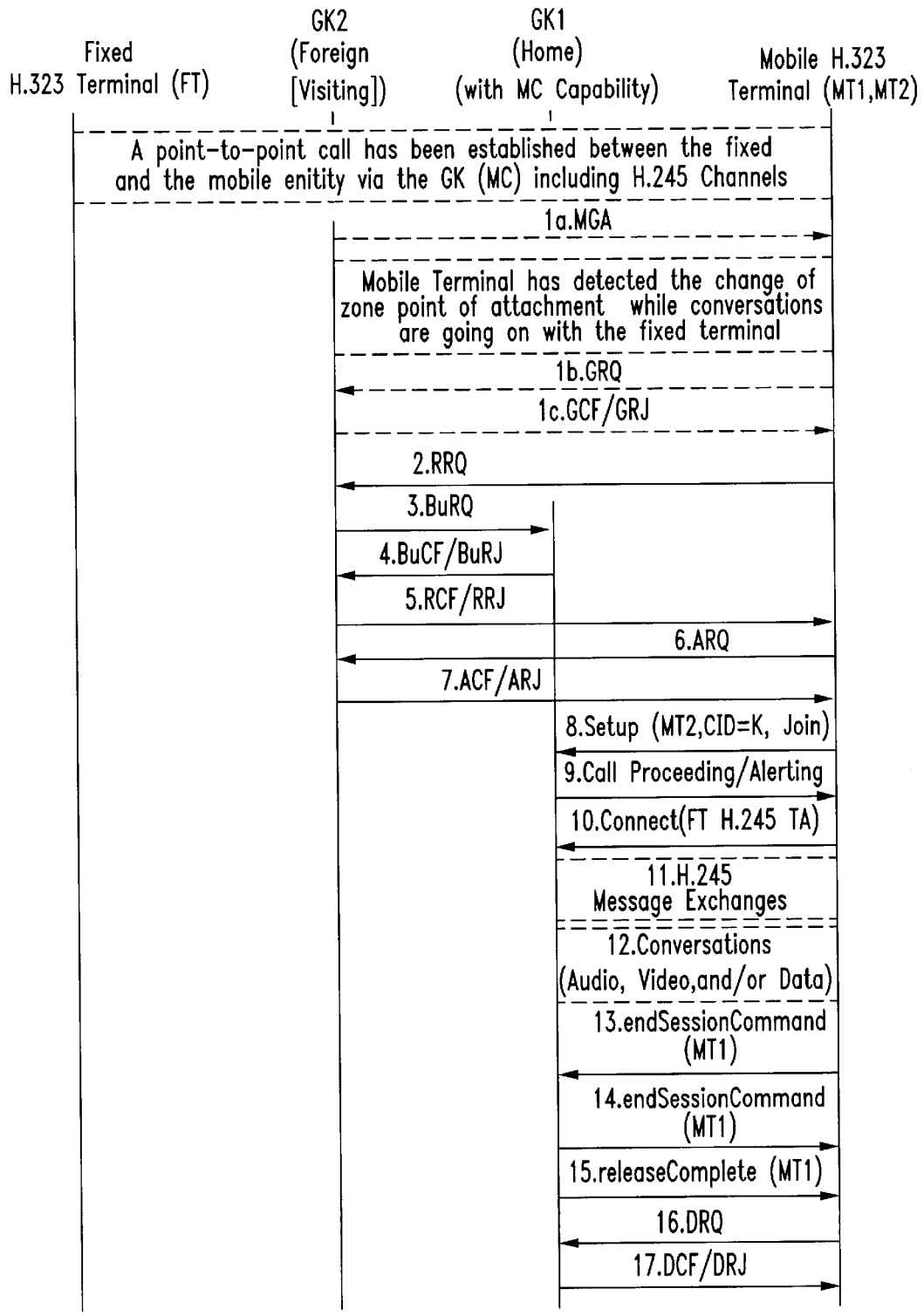
FIG. 27 shows the inter-zone communications where the call is routed via GK 1 that has the MC capability.

FIG. 27 shows the inter-zone communications where the call is routed via GK 1 that has the MC capability. This case is similar to that of the scenario for the directly routed call with the fixed terminal having the MC capability. The exception is that the GK with its MC that is controlling the call is priori involved in the beginning of the conference. The point-to-point call between the fixed and mobile entity is being made via GK 1 (with its MC) and H.245 control channels are also being established via GK 1 before the handover is made.

FIG. 27 illustrates the call signaling for the GK-routed handover. It is assumed that a point-to-point call has been established between the fixed and the mobile entity via the GK (with MC). This also implies that H.245 control channels have also been established via GK 1. The steps 1 through 15 are similar those have been shown as in the case of the directly routed call (FIG. 22). The exception is that GK 1 (with MC) will be involved to provide the handover from the old connection (MT1) to the new connection (MT2) instead of the fixed terminal (with MC).

Although the present invention has been described in relation to particular preferred embodiments thereof, many variations, equivalents, modifications and other uses will become apparent to those skilled in the art. It is preferred, therefore, that the present invention be limited not by the specific disclosure herein, but only by the appended claims.

What is claimed is:

1. An H.323-based mobility protocol for real-time mobile multimedia communications and conferencing over packet-based networks by a Mobile Terminal/Node/Entity having a Home Gatekeeper/Home Location Database, comprising the steps of:

upon becoming mobile and initiating by the Mobile Terminal/Node/Entity an H.323 communication that includes at least one of: audio, video and data, with respect to notification of available support services, one of the following:

providing, by at least one of a plurality of available H.323 Home/Foreign Mobility Gatekeepers, notification of H.323 mobility services availability by periodically broadcasting/multicasting/unicasting a Mobility Gatekeeper Advertisement with a multicast address; and where the Mobile Terminal/Node/Entity lacks notification of H.323 mobility services availability, broadcasting/multicasting/unicasting/sending, by the Mobile Terminal/Node/Entity, a message to the Home Gatekeeper/Home Location Database, which notifies H.323 Home/Foreign Mobility Gatekeepers in a preselected area local to the Mobile Terminal/Node/Entity that the Mobile Terminal/Node/Entity needs H.323 mobility services and notifying, by the H.323 Home/Foreign Mobility Gatekeepers, the Mobile Terminal/Node/Entity of available H.323 Home/Foreign Mobility Gatekeepers; and thereafter registering, by the Mobile Terminal/Node Entity, with a H.323 Home/Foreign Mobility Gatekeeper of the available H.323 Home/Foreign Mobility Gatekeepers that support H.323 mobility services in a Location Area/Cell/zone of the Mobile Terminal/Node/Entity; and providing, for the Mobile Terminal/Node/Entity by the H.323 Home/Foreign Mobility Gatekeeper with which the Mobile Terminal/Node/Entity is registered, support for the H.323 communication that includes at least one of: audio, video and data.

2. The H.323-based mobility protocol of claim 1 wherein registering with the H.323 Home/Foreign Mobility Gatekeeper includes sending registration information for the Mobile Terminal/Node/Entity using a Base Station to Base Station Controller to Mobile Switching Center to H.323 Home/Foreign Gatekeeper system.

3. The H.323-based mobility protocol of claim 1 wherein registering with the at least one H.323 Home/Foreign Mobility Gatekeeper includes sending registration information for the Mobile Terminal/Node/Entity using a wireless/wire-line Local Area Network to Router/Switch to H.323 Home/Foreign Gatekeeper system.

4. The H.323-based mobility protocol of claim 1 wherein registering includes the steps of:
- broadcasting/multicasting/unicasting/sending, by the Home Gatekeeper, a Mobility Gatekeeper Advertisement (MGA) message periodically;
- broadcasting/multicasting/unicasting/sending a registration request message (RRQ) to the Home Gatekeeper by the Mobile Terminal/Node/Entity; and
- sending, by the Home Gatekeeper, a registration confirmation/registration rejection (RCF/RRJ) to the Mobile Terminal/Node/Entity.

5. The H.323-based mobility protocol of claim 1 wherein registering includes the steps of:
- upon determining, by the Mobile Terminal/Node/Entity, that a network point of attachment has changed/a foreign zone has been entered,
  - broadcasting/multicasting/unicasting/sending, by the Mobile Terminal/Node/Entity, a registration request message (RRQ) to a Foreign/Visiting Gatekeeper;
  - broadcasting/multicasting/unicasting/sending, by the Foreign/Visiting Gatekeeper, a binding update message (BuRQ) to the Home Gatekeeper;
  - broadcasting/multicasting/unicasting/sending, by the Home Gatekeeper, a binding update confirmation/rejection (BuCF/BuRJ) to the Foreign/Visiting Gatekeeper; and
  - broadcasting/multicasting/unicasting/sending, by the Foreign/Visiting Gatekeeper, the binding update confirmation/rejection to the Mobile Terminal/Node/entity.

6. The H.323-based mobility protocol of claim 5 wherein, where the Mobile Terminal/Node/Entity has already visited another foreign zone regulated by a Visited Gatekeeper, registering includes:
- broadcasting/multicasting/unicasting/sending, by the Home Gatekeeper, a mobility unbinding message (UbRQ) to the Visited Gatekeeper; and
- broadcasting/multicasting/unicasting/sending, by the Visited Gatekeeper, a mobility unbinding confirmation/rejection (UbCF/UbRJ) to the Home Gatekeeper.

7. The H.323-based mobility protocol of claim 1 wherein, where the Mobile Terminal/Node/Entity has already visited another foreign zone regulated by a Visited Gatekeeper, registering includes:
- broadcasting/multicasting/unicasting/sending, by the Mobile Terminal/Node/Entity, a registration request message (RRQ) to a Foreign/Visiting Gatekeeper;
- broadcasting/multicasting/unicasting/sending, by the Foreign/Visiting Gatekeeper, a mobility unbinding update message (UbRQ) to the Visited Gatekeeper;
- broadcasting/multicasting/unicasting/sending, by the Visited Gatekeeper, a mobility unbinding confirmation/rejection (UbCF/UbRJ) to the Foreign/Visiting Gatekeeper;
- broadcasting/multicasting/unicasting/sending, by the Foreign/Visiting Gatekeeper, a provisional registration confirmation to the Mobile Terminal/Node/Terminal and broadcasting/multicasting/unicasting/sending, by the Foreign/Visiting Gatekeeper, a binding update message (BURQ) to the Home Gatekeeper; and
- broadcasting/multicasting/unicasting/sending, by the Home Gatekeeper, a binding update confirmation/rejection (BuCF/BuRJ) to the Foreign/Visiting Gatekeeper.

8. The H.323-based mobility protocol of claim 1 wherein, where the Mobile Terminal/Node/Entity has already visited another foreign zone regulated by a Visited Gatekeeper, registering includes:
- broadcasting/multicasting/unicasting/sending, by the Mobile Terminal/Node/Entity, a registration request (RRQ) to a Foreign/Visiting Gatekeeper;
- broadcasting/multicasting/unicasting/sending, by the Visited Gatekeeper, a mobility unbinding confirmation/rejection (UbCF/UbRJ) to the Foreign/Visiting Gatekeeper;
- broadcasting/multicasting/unicasting/sending, by the Foreign/Visiting Gatekeeper, a provisional registration confirmation to the Mobile Terminal/Node/Terminal and broadcasting/multicasting/unicasting/sending, by the Foreign/Visiting Gatekeeper, a binding update message (BURQ) to the Home Gatekeeper;
- broadcasting/multicasting/unicasting/sending, by the Home Gatekeeper, a binding update confirmation/rejection (BuCF/BuRJ) to the Foreign/Visiting Gatekeeper;
- broadcasting/multicasting/unicasting/sending, by the Home Gatekeeper, a mobility unbinding update message (UbRQ) to the Visited Gatekeeper, and
- broadcasting/multicasting/unicasting/sending, by the Visited Gatekeeper, a mobility unbinding confirmation/rejection (UbCF/UbRJ) to the Home Gatekeeper.

9. The H.323-based mobility protocol of claim 1 wherein at least one Home/Foreign Gatekeeper utilizes a combined Home/Visitor Location Database.

10. The H.323-based mobility protocol of claim 1 wherein a plurality of Home/Foreign Gatekeepers each utilize an individual Visitor Location Database and share a Home Location Database.

11. The H.323-based mobility protocol of claim 1 wherein, where the Mobile Terminal/Node/Entity is originally located in a First Administrative Domain and is moving in a Second Administrative Domain, registering includes:
- broadcasting/multicasting/unicasting/sending a registration request message (RRQ), by the Mobile Terminal/Node/Entity to the Foreign/Visiting Gatekeeper;
- broadcasting/multicasting/unicasting/sending, by the Foreign/Visiting Gatekeeper, a mobility unbinding (UbRQ) message to a Visited Gatekeeper;
- broadcasting/multicasting/unicasting/sending, by the Visited Gatekeeper, an unbinding confirmation/rejection (UbCF/UbRJ) to the Visiting/Foreign Gatekeeper;
- broadcasting/multicasting/unicasting/sending, by the Visiting Gatekeeper, a provisional registration message to the Mobile Terminal/Node/Entity;
- broadcasting/multicasting/unicasting/sending, by the Foreign/Visiting Gatekeeper, a mobility binding message (BuRQ) to a Border Element of the Second Administrative Domain, which forwards the message to a Border Element of the First Administrative Domain which then forwards the message to the Home Gatekeeper; and
- broadcasting/multicasting/unicasting/sending, by the Home Gatekeeper, a mobility binding confirmation/rejection (BuCF/BuRJ) message to the Border Element of the First Administrative Domain, which forwards the message to the Border Element of the Second Administrative Domain, which forwards the message to the Visiting Gatekeeper.

* * * * *